(12) United States Patent
     Polidori

(10) Patent No.: US 11,996,665 B2
(45) Date of Patent: May 28, 2024

(54) ELECTRICAL CONNECTOR BOLT RETAINER

(71) Applicant: Burndy, LLC, Manchester, NH (US)

(72) Inventor: Nicholas Polidori, Medford, NJ (US)

(73) Assignee: Burndy, LLC, Manchester, NH (US)

( * ) Notice: Subject to any disclaimer, the term of this patent is extended or adjusted under 35 U.S.C. 154(b) by 242 days.

(21) Appl. No.: 17/414,745

(22) PCT Filed: Dec. 18, 2019

(86) PCT No.: PCT/US2019/067202
     § 371 (c)(1),
     (2) Date: Jun. 16, 2021

(87) PCT Pub. No.: WO2020/132083
     PCT Pub. Date: Jun. 25, 2020

(65) Prior Publication Data
     US 2022/0069485 A1    Mar. 3, 2022

Related U.S. Application Data

(60) Provisional application No. 62/783,922, filed on Dec. 21, 2018.

(51) Int. Cl.
     *H01R 4/50*    (2006.01)
(52) U.S. Cl.
     CPC ................ *H01R 4/5091* (2013.01)
(58) Field of Classification Search
     CPC ........... H01R 4/5091; F16B 19/02; F16B 2/14
     See application file for complete search history.

(56) References Cited

U.S. PATENT DOCUMENTS

| 4,415,222 A | 11/1983 | Polidori |
| 4,600,264 A | 7/1986 | Counsel |

(Continued)

FOREIGN PATENT DOCUMENTS

| CN | 106654618 | 5/2017 |
| DE | 4007942 | 9/1990 |
| GB | 451427 | 8/1936 |

OTHER PUBLICATIONS

Extended European Search Report dated Jul. 22, 2022 in corresponding European Application No. 19899483.2 (13 pages).

(Continued)

*Primary Examiner* — Jean F Duverne
(74) *Attorney, Agent, or Firm* — Wissing Miller LLP

(57) ABSTRACT

A wedge assembly may include a recess, a first tab, a second tab, and/or a retainer. The recess may be configured to receive a main conductor or a tap conductor when the wedge assembly is installed in an electrical connector. The first tab may be configured to be received by a cavity defined in a bottom portion of a body member of the electrical connector. The first tab and the second tab may define respective apertures therethrough that are configured to receive a bolt of the electrical connector. The bolt may be configured to drive the wedge assembly into the electrical connector such that the main conductor and the tap conductor are electrically connected. The retainer may be configured to releasably secure the bolt within the wedge assembly. The retainer may be configured to be removed to enable removal of the bolt from the wedge assembly.

20 Claims, 32 Drawing Sheets

(56) References Cited

U.S. PATENT DOCUMENTS

| | | | |
|---|---|---|---|
| 4,775,260 A | | 10/1988 | Kecmer |
| 4,813,894 A | | 3/1989 | Mixon, Jr. |
| 5,092,797 A | | 3/1992 | Cole |
| 5,423,699 A | * | 6/1995 | Johnson .............. H01R 4/5091 |
| | | | 439/783 |
| 5,692,930 A | * | 12/1997 | Garver ................. H01R 4/44 |
| | | | 439/781 |
| 7,823,342 B1 | * | 11/2010 | Van Horn Steel ....... E06B 9/02 |
| | | | 49/141 |
| 8,176,625 B2 | | 5/2012 | Copper |
| 2016/0141846 A1 | | 5/2016 | Atchley |
| 2018/0258975 A1 | | 9/2018 | Polidori |
| 2018/0331435 A1 | | 11/2018 | Murugiah |

OTHER PUBLICATIONS

Office Action mailed in CN application 201980089822.2 dated Feb. 23, 2023 (10 pages).
Office Action mailed in IN Application 202127027739 dated Jan. 13, 2023 (5 pages).
International Search Report and Written Opinion mailed in corresponding PCT/US19/67202 dated Jun. 16, 2020 (12 pages).
International Preliminary Report on Patentability mailed in PCT/US2019/067202 dated Jul. 1, 2021 (9 pages).
Second Office Action mailed in corresponding Chinese application 201980089822.2 mailed Dec. 27, 2023 (7 pages).

* cited by examiner

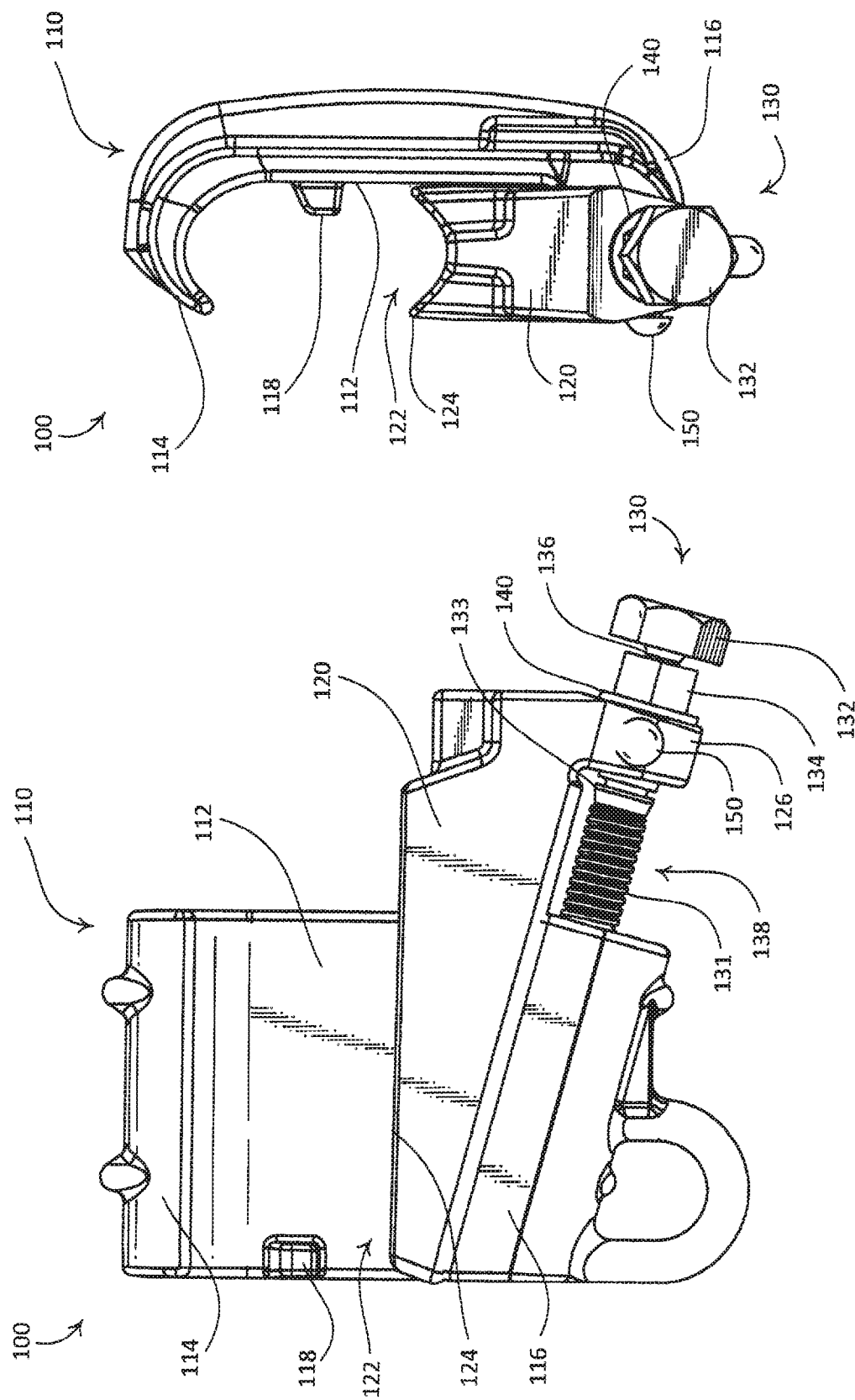

ELECTRICAL CONNECTOR BOLT RETAINER

CROSS-REFERENCE TO RELATED APPLICATIONS

This application is a 371 of PCT/US2019/067202 filed on Dec. 18, 2019, published on Jun. 25, 2020 under publication number WO 2020/132083 A2, which claims priority benefits from U.S. Provisional Patent Application No. 62/783,922 filed Dec. 21, 2018, both of which are incorporated herein in their entirety by reference.

BACKGROUND

Electrical connector assemblies are well known. An electrical connector assembly may be adapted to electrically and mechanically connect conductors within a transmission or distribution circuit. For example, a typical electrical connector assembly may be used to connect a main conductor to a tap or run conductor. An electrical connector assembly adapted to connect a transmission conductor or a tap conductor to another conductor may be referred to as an electrical connector. An electrical connector may include a C-shaped body having a curved top wall adapted to fit over a main conductor (e.g., such as a transmission conductor). A bolt-operated wedge may be carried by the bottom of the C-shaped body and may include an elongated recess in the top for supporting the tap conductor (e.g., such as a distribution conductor). A bolt may be operated to positively move the wedge both in and out so that the clamping action of the connector can be tightened or loosened as desired.

The use of shear bolts in electrical connectors is well known. For example, a shear bolt may be used to tighten the clamping action of the connector such that a tap conductor is captively engaged within the electrical connector.

SUMMARY

As described herein, a wedge assembly may include a recess, a first tab, a second tab, and/or a retainer (e.g., bolt retainer). The recess may be defined along an elongated upper surface of the wedge assembly. The recess may be configured to receive a main conductor or a tap conductor when the wedge assembly is installed in an electrical connector. The first tab may extend downward distal from the elongated upper surface. The first tab may be configured to be received by a cavity defined in a bottom portion of a body member of the electrical connector. The first tab may define a first aperture therethrough. The first aperture may be configured to receive a bolt of the electrical connector. The second tab may define a second aperture therethrough. The second aperture may be configured to receive the bolt of the electrical connector. The second tab may define a front surface. The front surface of the second tab may be configured to abut a head of the bolt when the bolt is received by the first tab and the second tab. The bolt may be configured to drive the wedge assembly into the electrical connector such that the main conductor and the tap conductor are electrically connected. The retainer may be configured to releasably secure the bolt within the wedge assembly. The retainer may be configured to be removed to enable removal of the bolt from the wedge assembly.

The retainer may be a fastener (e.g., such as a screw) configured to engage the bolt. The second tab may include a first hole configured to receive the fastener. The bolt may include a second hole configured to align with the first hole. The second hole may be configured to receive the fastener such that the bolt is releasably secured within the wedge assembly.

The retainer may be a pin. For example, the pin may be a press-fit pin. The bolt may define a hole configured to receive the pin. The pin may be configured to abut the second tab, for example, to prevent removal of the bolt from the wedge assembly. The pin may include a hole that is accessible when the pin is installed within the hole defined by the bolt. The hole in the pin may be configured to receive a fastener configured to prevent removal of the press-fit pin from the second hole. The pin may be configured to prevent rotation of the bolt. The second tab may define a hole configured to receive the pin therethrough. The pin may be configured to be received by a groove defined by a shoulder of the bolt.

The retainer may be a retaining clip. The retaining clip may be configured to be received by a groove defined by an end portion of the bolt. The retaining clip may be configured to abut the first tab when the bolt is rotated for removal such that removal of the bolt from the wedge assembly is prevented. The retaining clip may be configured to be received by the bolt between the second tab and the first tab. A rear surface of the second tab may define a cavity. The retaining clip may be configured to abut the cavity when the bolt is rotated for removal such that removal of the bolt from the wedge assembly is prevented. The retaining clip may be configured to be received by a groove defined by a shoulder of the bolt. The retaining clip may be configured to abut the second tab (e.g., the rear surface) when the bolt is rotated for removal such that removal of the bolt from the wedge assembly is prevented.

The retainer may be a retainer assembly that includes a washer and a retaining clip. The retainer assembly may be configured to receive the bolt. The washer may define a chamber configured to receive the retaining clip. The retainer assembly may be configured to prevent removal of the bolt from the wedge assembly.

The retainer may be a retaining nut. The retaining nut may be configured to be received by the bolt. For example, the retaining nut may be configured to be received between the first tab and the second tab. The retaining nut may be configured to abut the second tab when the bolt is rotated for removal such that removal of the bolt from the wedge assembly is prevented. As another example, the retaining nut may be configured to be received by an end portion of the bolt within the cavity. The retaining nut may define internal threads that are complementary to external threads defined by the end portion of the bolt. The retaining nut may be configured to abut the first tab when the bolt is rotated for removal such that removal of the bolt from the wedge assembly is prevented.

As described herein, the wedge assembly may be configured to be used in an electrical connector that is configured to electrically connect a main conductor (e.g., such as a transmission conductor) to a tap conductor (e.g., such as a distribution conductor). The electrical connector may be referred to as an electrical connector. The electrical connector may include a captive shear bolt assembly. The electrical connector may include a body member, for example, a substantially C-shaped body member. The body member may have a curved top wall configured to receive a main conductor. The electrical connector may include a wedge assembly configured to be received by the body member.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 1B is a front view of the electrical connector shown in FIG. 1A;

FIG. 1C is a side view of the electrical connector shown in FIG. 1A;

DETAILED DESCRIPTION

Figure 1A:
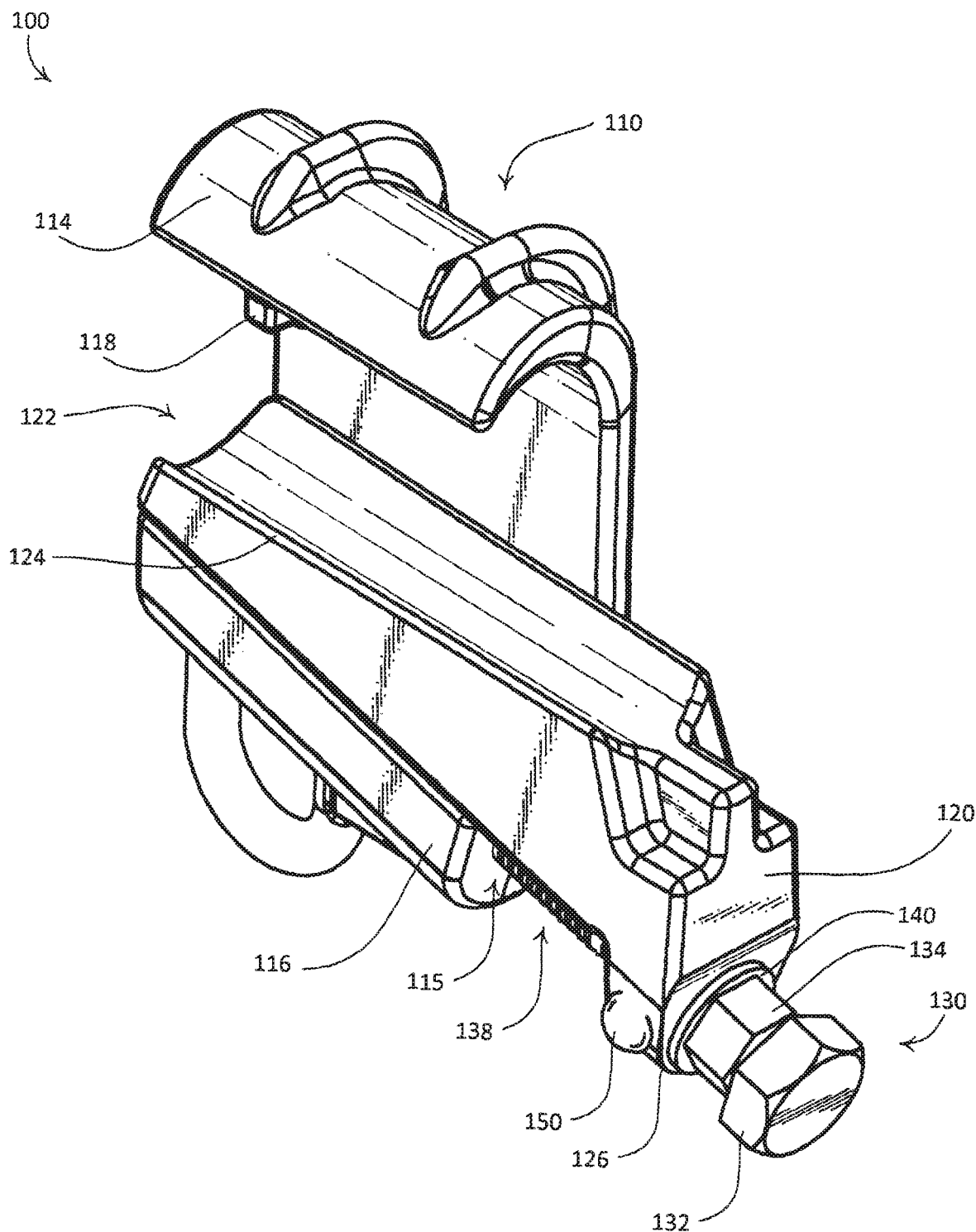
FIG. 1A is an isometric view of an example wedge assembly installed within an electrical connector.
Figure 1D:
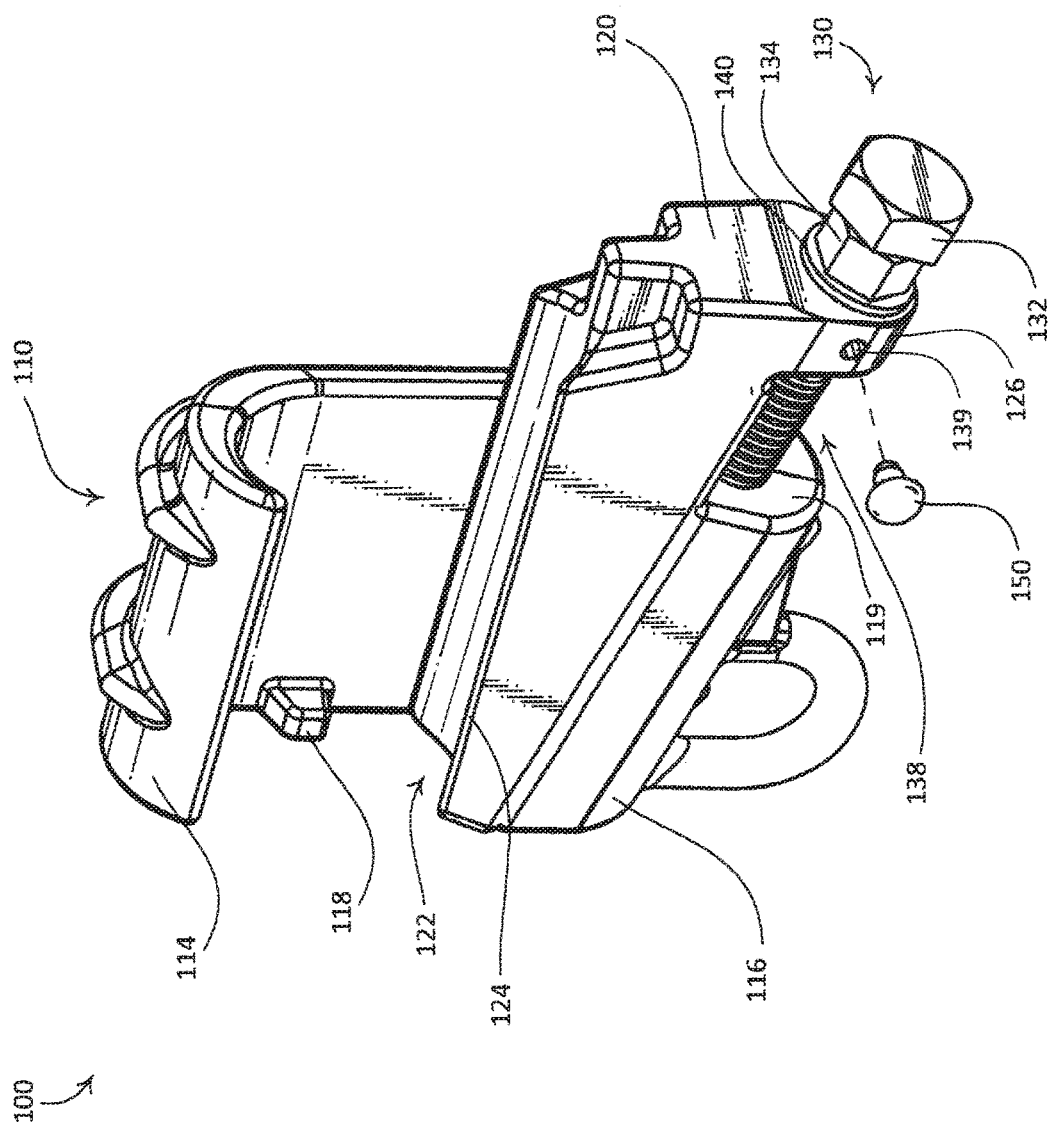
FIG. 1D is a partially exploded view of the electrical connector shown in FIG. 1A.
Figure 1E:
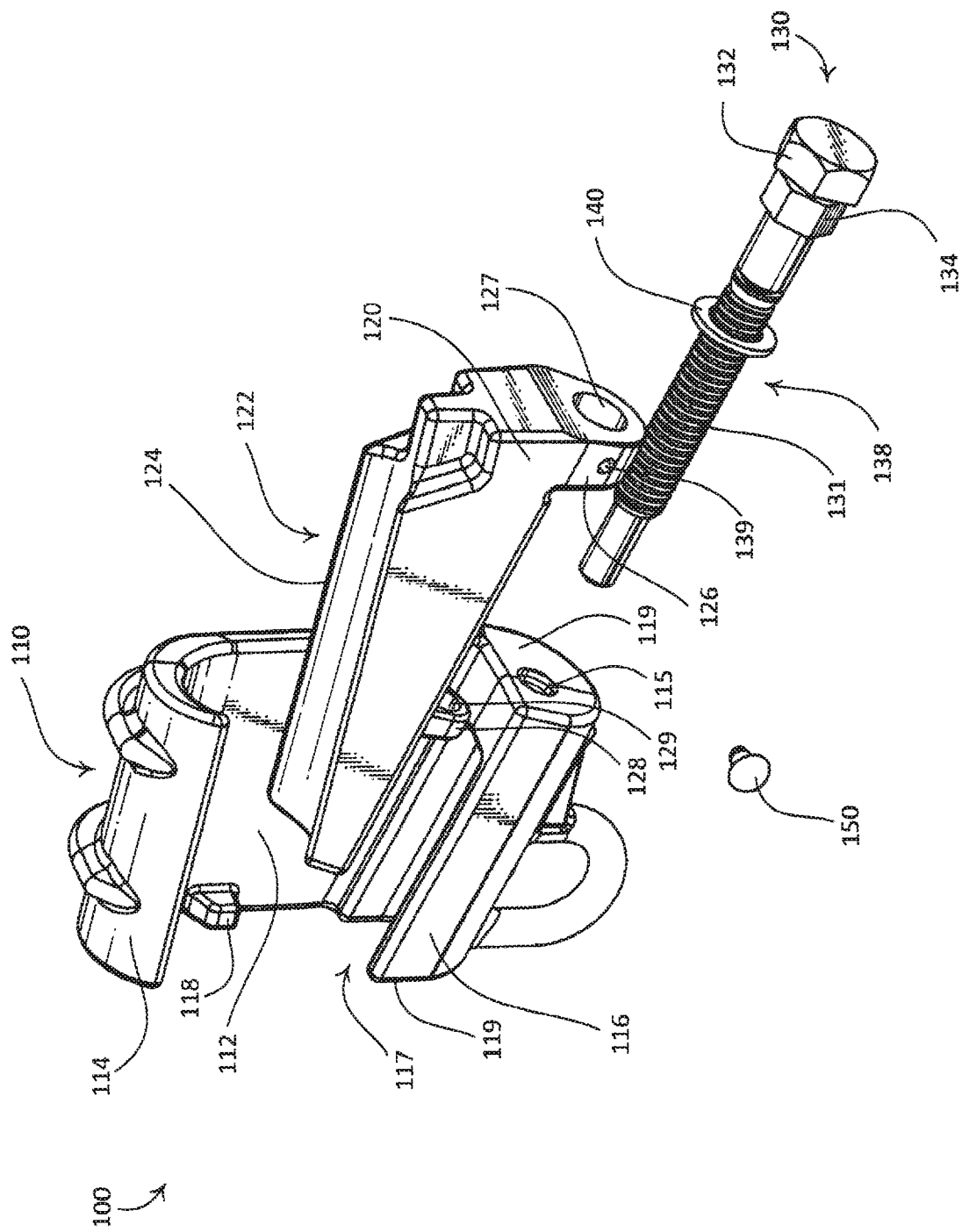
FIG. 1E is an exploded view of the electrical connector shown in FIG. 1A.
Figure 2A:
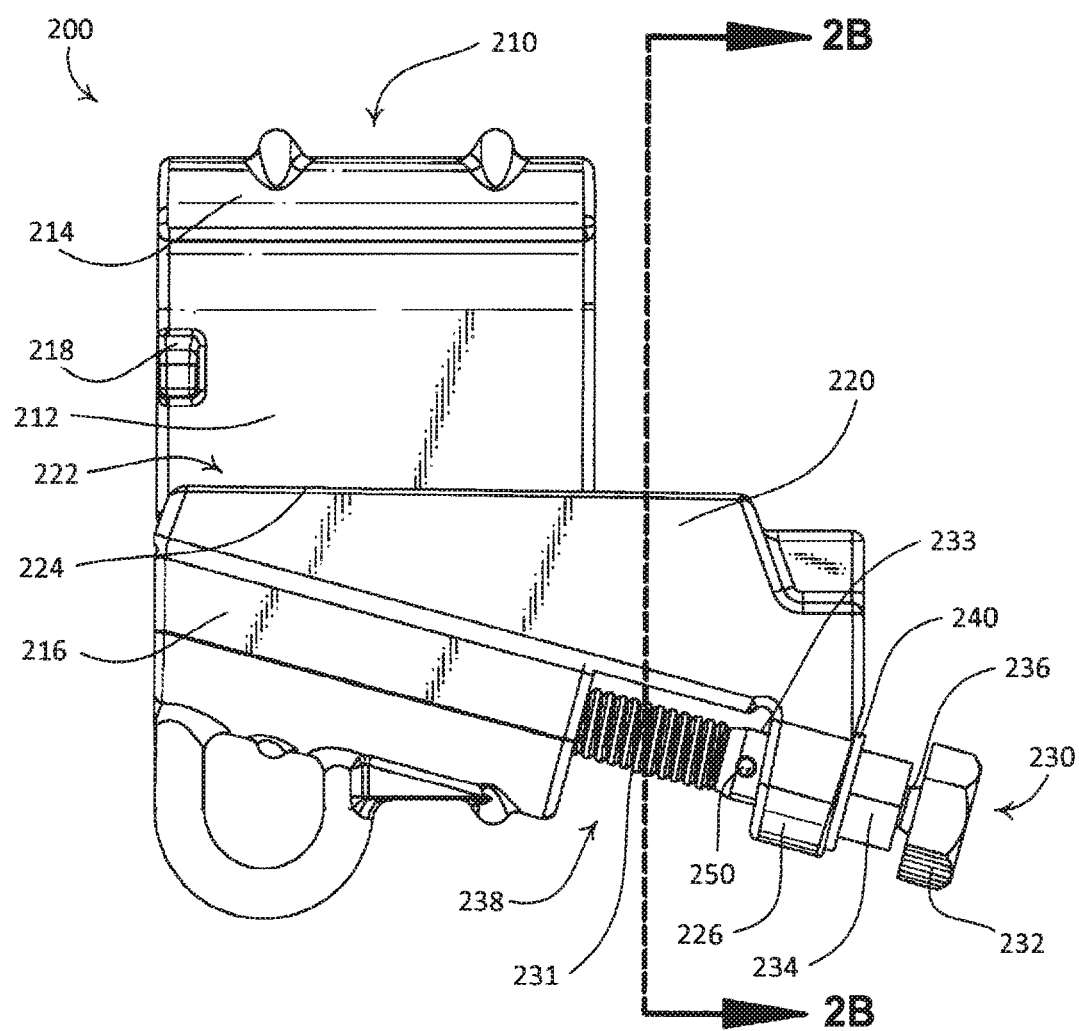
FIG. 2A is a front view of another example wedge assembly installed within an electrical connector.
Figure 2C:
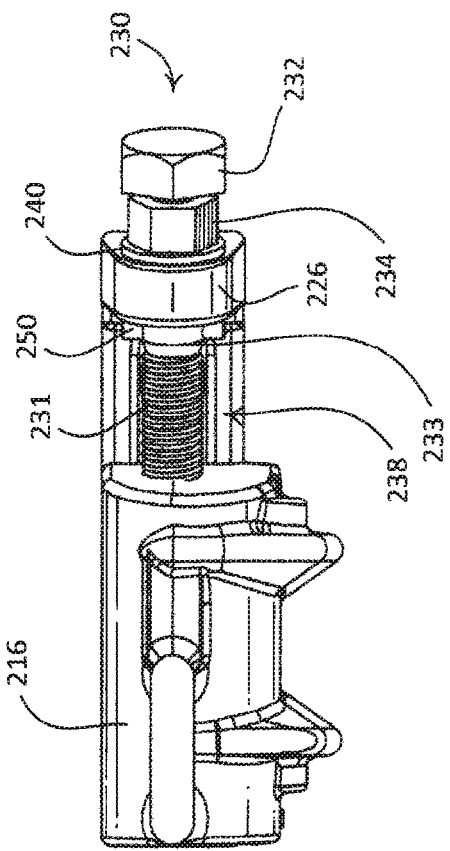
FIG. 2C is a bottom view of the electrical connector shown in FIG. 2A.
Figure 2B:
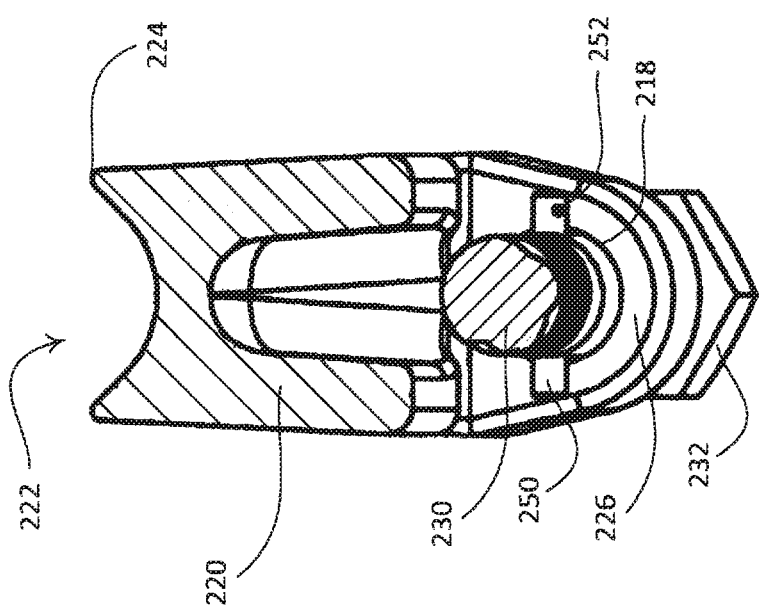
FIG. 2B is a cross-section view of the example wedge assembly installed within the electrical connector shown in FIG. 2A taken along line 2B-2B.
Figure 2D:
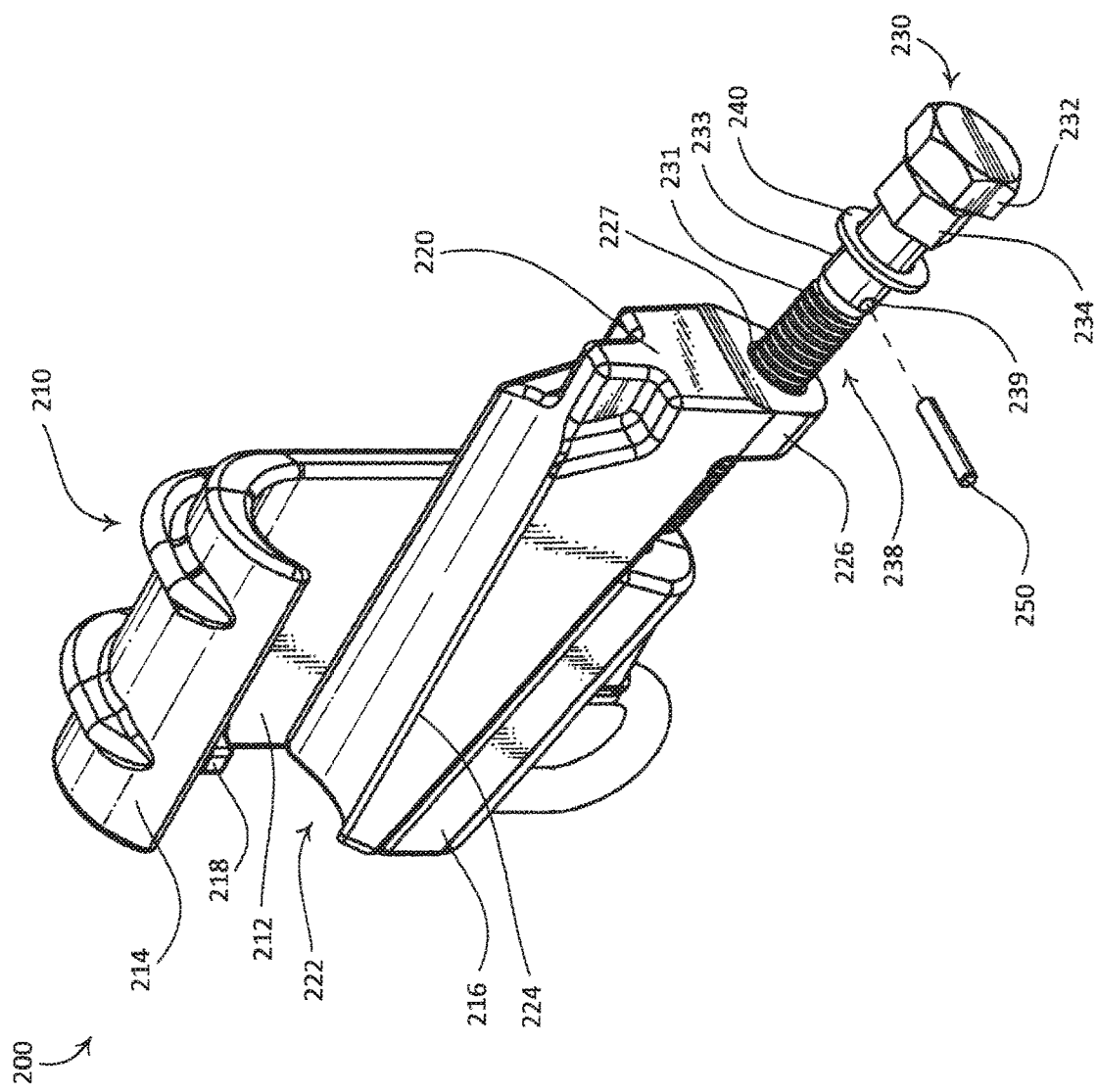
FIG. 2D is a partially exploded view of the electrical connector shown in FIG. 2A.
Figure 2E:
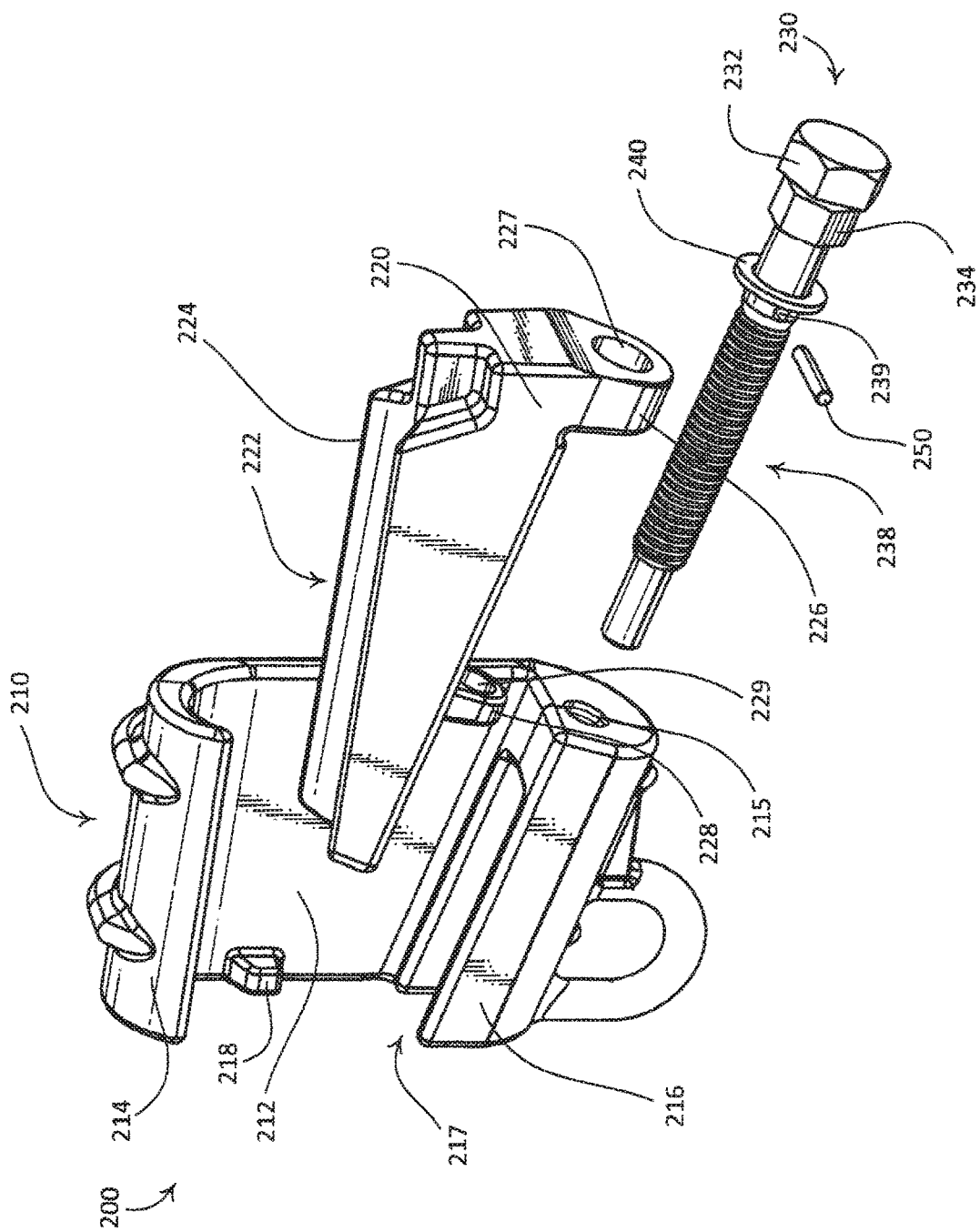
FIG. 2E is an exploded view of the electrical connector shown in FIG. 2A.

FIGS. 1A-1E depict an example electrical connector 100 (e.g., a tap connector). The electrical connector 100 may include a body member 110, a wedge 120, and a bolt 130. The bolt 130 may be a bolt assembly (e.g., such as a shear bolt assembly). The electrical connector 100 may be configured to electrically and mechanically connect a main conductor (e.g., such as a transmission conductor, not shown) to a tap conductor (e.g., such as a distribution conductor, not shown). The electrical connector 100 may include a conductor interface insert (not shown) configured to be located between the main conductor and the tap conductor within the electrical connector 100.

The body member 110 may be substantially C-shaped. For example, the body member 110 may have a rear wall 112, a curved top portion 114 and a curved bottom portion 116. The curved top portion 114 may be configured to receive the distribution connector. For example, the curved top portion 114 of the electrical connector 100 may fit partially around the main conductor. The curved bottom portion 116 may be configured to receive the wedge 120. The rear wall 112 may be substantially flat, for example, between the curved top portion 114 and the curved bottom portion 116. The rear wall 112 may define a stop 118 that extends away from the rear wall 112.

The wedge 120 may be a wedge assembly. The wedge 120 may include a recess 122 along an elongated upper surface 124. The recess 122 may be configured to receive the distribution conductor and/or the transmission conductor. For example, the recess 122 may cooperate with a bottom surface of the tap conductor.

The wedge 120 may be received within the curved bottom portion 116 of the body member 110. For example, the wedge 120 may define a first tab 128. The first tab 128 may extend (e.g., downwardly) from the wedge 120. The first tab 128 may define an aperture 129 passing therethrough. The aperture 129 may be threaded. The aperture 129 may be configured to receive the bolt 130 (e.g., a distal end of the bolt 130). The aperture 129 may define threads that are complementary to the threads of the bolt 130. The wedge 120 may be configured to be driven by the bolt 130. The curved bottom portion 116 may define a cavity 117. The cavity 117 may be configured to receive the first tab 128. For example, the cavity 117 may receive the first tab 128 as the wedge 120 is driven by the bolt 130.

The wedge 120 may define a second tab 126. The second tab 126 may extend (e.g., downwardly) from the wedge 120.

The second tab 126 may define an aperture 127 passing therethrough. The aperture 127 may be threaded. The aperture 127 may be configured to receive the bolt 130. The aperture 127 may define threads (e.g., internal threads) that are complementary to the threads of the bolt 130.

The body member 110 may define a hole 115 configured to receive the bolt 130. The hole 115 may be defined through the curved bottom portion 116 of the body member 110. For example, the hole 115 may be defined through the body member 110 from a front surface 119 defined by the body member 110 to the cavity 117. The hole 115 may be threaded. For example, the hole 115 may define threads (e.g., internal threads) that are complementary to the threads of the bolt 130.

The electrical connector 100 may be configured to secure (e.g., releasably secure) the bolt 130 therein. The electrical connector 100 may be configured to enable removal of the bolt 130 from the body member 110 and the wedge 120.

The bolt 130 may define an upper head 132, a lower head 134, a shear section 136, and a shank 138. The shank 138 may define a threaded portion 131 and a non-threaded portion 133. The bolt 130 may be received by the aperture 127 and the hole 115. For example, the shank 138 of the bolt 130 may be received by the aperture 127 and the hole 115. The bolt 130 may be configured to drive the wedge 120 into the electrical connector 100. The bolt 130 may be configured to be driven at the upper head 132. As torque is applied to the upper head 132, the bolt 130 may rotate as the threaded portion 131 engages complementary threads (e.g., in the aperture 127 and/or the hole 115). When the applied torque exceeds a threshold torque, the shear section 136 may shear such that the upper head 132 is mechanically decoupled from the shank 138 (e.g., the threaded portion 131) of the bolt 130. For example, when the shear section 136 shears, the upper head 132 may no longer drive the threaded portion 131 of the bolt 130. When the shear section 136 shears, the bolt 130 may captively secure the upper head 132 thereto. For example, the bolt 130 may be configured such that the upper head 132 remains coupled to the bolt 130 when the shear section 136 has sheared. A washer 140 may be received by the shank 138 such that when installed, the washer 140 is in contact with the wedge 120 and the lower head 134.

When the bolt 130 is rotated in a clockwise direction, the bolt 130 may be threaded into the hole 115 of the body member 110 and the lower head 134 may apply a force to the second tab 126 such that the entire wedge 120 is moved within the body member 110. For example, the wedge 120 may be moved within the curved bottom portion 116 of the body member 110. When the wedge 120 is moved within the body member 110, the upper surface 124 of the wedge 120 may move (e.g., upwardly) toward the curved top portion 114. When the bolt 130 is rotated in a counter-clockwise direction, the wedge 120 may move away from the body member 110. When the wedge 120 is moved away from the body member 110, the upper surface 124 of the wedge 120 may move (e.g., downwardly) away from the curved top portion 114. The threaded portion 131 may be configured with a predetermined amount (e.g., length) of threads. The predetermined amount of threads may be configured such that the bolt 130 spins freely when the wedge 120 is extracted (e.g., fully extracted) from the body member 110.

The electrical connector 100 may be configured such that it is assembled without the conductor interface insert (not shown). The bolt 130 may be in a position such that the wedge 120 is substantially withdrawn from the body member 110. The electrical connector 100 may be suspended from a main conductor (not shown) by resting the curved top portion 114 of the body member 110 around the main conductor. A tap conductor (not shown) may be laid across the upper surface 124 of the wedge 120. The electrical conductor 100 includes a conductor interface insert (not shown). The conductor interface insert may be positioned between the transmission and tap conductors (not shown), for example, outside of the body member 110. The conductor interface insert may be moved toward the interior of the body member 110, for example, using the conductors as a guide. The conductor interface insert may be moved until a leading surface of the conductor interface insert contacts the stop 118.

With the conductor interface insert in place, the bolt 130 may be rotated such that the wedge 120 is moved toward the interior of the body member 110. The bolt 130 may be rotated via the upper head 132. As the wedge 120 is moved into the interior of the body member 110, the recess 122 may be moved into contact with the tap conductor which in turn is forced against the conductor interface insert. The conductor interface insert may be forced into contact with the main conductor which in turn is forced into contact with the curved top portion 114 of the body member 110. The bolt 130 (e.g., the shear section 136) may be configured to shear at a threshold torque. For example, the threshold torque may be determined such that it corresponds to the wedge 120 being in its proper position and sufficient pressure being placed on the conductors so as to provide a proper connection. The bolt 130 may shear at the shear section 136. The shear section 136 may be located between the upper head 132 and the lower head 134.

The electrical connector 100 may be configured to retain the bolt 130. For example, the electrical connector 100 may include a retainer 150 (e.g., such as screw). The retainer 150 may be a part of the wedge 120 (e.g., a wedge assembly). The retainer 150 may be a self-tapping screw (e.g., such as a u-drive screw and/or hammer drive screw). In the exemplary embodiment shown, the retainer 150 is a screw such that the retainer 150 may also be referred to as the screw 150. The wedge 120 may be configured to receive the retainer 150. For example, the second tab 126 may be configured to receive the screw 150. The second tab 126 may define a hole 139 that is configured to receive the screw 150. The bolt 130 may be configured to receive the screw 150. For example, the bolt 130 may define a hole 137 in the shank 138. The hole 137 may be located between the lower head 134 and the threads of the shank 138. The hole 137 may extend partially into the bolt 130. When the bolt 130 is received by the wedge 120 and body member 110, the hole 137 in the bolt 130 may be configured to align with the hole 139 in the second tab 126. For example, the screw 150 may be inserted into the hole 137 when the wedge 120 is in its proper position and sufficient pressure is being placed on the conductors so as to provide a proper connection. The screw 150 may be configured to retain the bolt 130 within the wedge 120 (e.g., in the proper position). The screw 150 may be configured to be removed such that the bolt 130 can be removed from the wedge 120. For example, the lower head 134 may be driven (e.g., counter-clockwise) to remove the bolt 130 from the wedge 120. Although the screw 150 may be received by the hole 137 (e.g., as shown in FIGS. 1A-1E), it should be appreciated that the screw 150 may engage a groove defined by the bolt 130. The groove may extend around the circumference of the shank 138 of the bolt 130. The screw 150 may be configured to engage the groove such that the bolt 130 is retained within the electrical connector 100. The groove may be located between the lower head 134 and the threads of the shank 138. The groove may extend partially into the bolt 130.

The wedge 120, the bolt 130, and/or the screw 150 may be configured to be reused, for example, after being installed and removed from the electrical connector 100. For example, when the wedge 120, the bolt 130, and the screw 150 are removed from the electrical connector 100, they may be reinstalled in the electrical connector 100 or another electrical connector.

FIGS. 2A-2E depict another example electrical connector 200 (e.g., such as electrical connector 100). The electrical connector 200 may include a body member 210, a wedge 220, and a bolt 230. The bolt 230 may be a bolt assembly (e.g., such as a shear bolt assembly). The electrical connector 200 may be configured to electrically and mechanically connect a main conductor (e.g., such as a transmission conductor, not shown) to a tap conductor (e.g., such as a distribution conductor, not shown). The electrical connector 200 may include a conductor interface insert (not shown) configured to be located between the main conductor (not shown) and the tap conductor (not shown) within the electrical connector 200.

The body member 210 may be substantially C-shaped. For example, the body member 210 may have a rear wall 212, a curved top portion 214 and a curved bottom portion 216. The curved top portion 214 may be configured to receive the distribution connector. For example, the curved top portion 214 of the electrical connector 200 may fit partially around the main conductor. The curved bottom portion 216 may be configured to receive the wedge 220. The rear wall 212 may be substantially flat, for example, between the curved top portion 214 and the curved bottom portion 216. The rear wall 212 may define a stop 218 that extends away from the rear wall 212.

The wedge 220 may be a wedge assembly. The wedge 220 may include a recess 222 along an elongated upper surface 224. The recess 222 may be configured to receive the distribution conductor and/or the transmission conductor. For example, the recess 222 may cooperate with a bottom surface of the tap conductor.

The wedge 220 may be received within the curved bottom portion 216 of the body member 210. For example, the wedge 220 may define a first tab 228. The first tab 228 may extend (e.g., downwardly) from the wedge 220. The first tab 228 may define an aperture 229 passing therethrough. The aperture 229 may be threaded. The aperture 229 may be configured to receive the bolt 230 (e.g., a distal end of the bolt 230). The aperture 229 may define threads that are complementary to the threads of the bolt 230. The wedge 220 may be configured to be driven by the bolt 230. The curved bottom portion 216 may define a cavity 217. The cavity 217 may be configured to receive the first tab 228. For example, the cavity 217 may receive the first tab 228 as the wedge 220 is driven by the bolt 230.

The wedge 220 may define a second tab 226. The second tab 226 may extend (e.g., downwardly) from the wedge 220. The second tab 226 may define an aperture 227 passing therethrough. The aperture 227 may be threaded. The aperture 227 may be configured to receive the bolt 230. The aperture 227 may define threads that are complementary to the threads of the bolt 230.

The body member 210 may define a hole 215 configured to receive the bolt 230. The hole 215 may be defined through the curved bottom portion 216 of the body member 210. The hole 215 may be threaded. For example, the hole 215 may define threads that are complementary to the threads of the bolt 230.

The electrical connector 200 may be configured to secure (e.g., releasably secure) the bolt 230 therein. The electrical connector 200 may be configured to enable removal of the bolt 230 from the body member 210 and the wedge 220.

The bolt 230 may define an upper head 232, a lower head 234, a shear section 236, and a shank 238. The shank 238 may define a threaded portion 231 and a non-threaded portion 233. The bolt 230 may be received by the aperture 227 and the hole 215. For example, the shank 238 of the bolt 230 may be received by the aperture 227 and the hole 215. The bolt 230 may be configured to drive the wedge 220 into the electrical connector 200. The bolt 230 may be configured to be driven at the upper head 232. As torque is applied to the upper head 232, the bolt 230 may rotate as the threaded portion 231 engages complementary threads (e.g., in the aperture 227 and/or the hole 215). When the applied torque exceeds a threshold torque, the shear section 236 may shear such that the upper head 232 is mechanically decoupled from the shank 238 (e.g., the threaded portion 231) of the bolt 230. For example, when the shear section 236 shears, the upper head 232 may no longer drive the threaded portion 231 of the bolt 230. When the shear section 236 shears, the bolt 230 may captively secure the upper head 232 thereto. For example, the bolt 230 may be configured such that the upper head 232 remains coupled to the bolt 230 when the shear section 236 has sheared. A washer 240 may be received by the shank 238 such that when installed, the washer 240 is in contact with the wedge 220 and the lower head 234.

When the bolt 230 is rotated in a clockwise direction, the bolt 230 may be threaded into the hole 215 of the body member 210 and the lower head 234 may apply a force upon the second tab 226 such that the entire wedge 220 is moved within the body member 210. For example, the wedge 220 may be moved within the curved bottom portion 216 of the body member 210. When the wedge 220 is moved within the body member 210, the upper surface 224 of the wedge 220 may move (e.g., upwardly) toward the curved top portion 214. When the bolt 230 is rotated in a counter-clockwise direction, the wedge 220 may move away from the body member 210. When the wedge 220 is moved away from the body member 210, the upper surface 224 of the wedge 220 may move (e.g., downwardly) away from the curved top portion 214. The threaded portion 231 may be configured with a predetermined amount (e.g., length) of threads. The predetermined amount of threads may be configured such that the bolt 230 spins freely when the wedge 220 is extracted (e.g., fully extracted) from the body member 210.

The electrical connector 200 may be configured such that it is assembled without the conductor interface insert (not shown). The bolt 230 may be in a position such that the wedge 220 is substantially withdrawn from the body member 210. The electrical connector 200 may be suspended from a main conductor (not shown) by resting the curved top portion 214 of the body member 210 around the main conductor. A tap conductor (not shown) may be laid across the upper surface 224 of the wedge 220. The electrical connector 200 includes a conductor interface insert (not shown). The conductor interface insert may be positioned between the transmission and tap conductors (not shown), for example, outside of the body member 210. The conductor interface insert may be moved toward the interior of the body member 210, for example, using the conductors as a guide. The conductor interface insert may be moved until a leading surface of the conductor interface insert contacts the stop 218.

With the conductor interface insert in place, the bolt 230 may be rotated such that the wedge 220 is moved toward the interior of the body member 210. The bolt 230 may be rotated via the upper head 232. As the wedge 220 is moved into the interior of the body member 210, the recess 222 may be moved into contact with the tap conductor which in turn is forced against the conductor interface insert. The conductor interface insert may be forced into contact with the main conductor which in turn is forced into contact with the curved top portion 214 of the body member 210. The bolt 230 (e.g., the shear section 236) may be configured to shear at a threshold torque. For example, the threshold torque may be determined such that it corresponds to the wedge 220 being in its proper position and sufficient pressure being placed on the conductors so as to provide a proper connection. The bolt 230 may shear at the shear section 236. The shear section 236 may be located between the upper head 232 and the lower head 234.

The electrical connector 200 may be configured to retain the bolt 230. For example, the electrical connector 200 may include a retainer 250 (e.g., such as a pin). The retainer 250 may be a part of the wedge 220 (e.g., wedge assembly). In the exemplary embodiment shown, the retainer 250 is a pin such that the retainer 250 may also be referred to as the pin 250. The pin 250 may be a solid cylindrical shaped component having a length that is greater than a diameter of the shank 238. For example, the bolt 230 may define a hole 239 in the shank 238. The hole 239 may be located between the lower head 234 and the threads of the shank 238 (e.g., proximate to the threads of the shank 238). The hole 239 may extend through the bolt 230. The pin 250 may be a press-fit pin having a solid press-in zone or an elastic press-in zone. A solid press-in zone may be configured to engage the inner surface of the hole 239. An elastic press-fit zone may be configured to deform when inserted into the hole 239. The elastic press-fit zone of the pin 250 may be configured to apply a force normal to the hole 239. The bolt 230 may be configured to receive the pin 250. When the bolt 230 is received by the wedge 220 and body member 210, the hole 239 in the bolt 230 may be configured to be between the second tab 226 and the curved bottom portion 216 of the body member 210.

The pin 250 may be configured to retain the bolt 230 within the wedge 220. For example, the pin 250 may be inserted into the hole 239 when the wedge 220 is in its proper position and sufficient pressure is being placed on the conductors so as to provide a proper connection. The pin 250 may be configured to be retained within the hole 239. When the bolt 230 is rotated in a direction (e.g., counter-clockwise) to remove the bolt 230 from the wedge 220, the pin 250 may engage the second tab 226 and prevent further removal of the bolt 230 from the wedge 220. The pin 250 may define an aperture 252 therethrough. The aperture 252 may be located proximate to an end of the pin 250. When the pin 250 is received within the hole 239, the aperture 252 may be configured to receive a fastener (not shown). The fastener may be a cotter pin, for example. The pin 250 may be configured to be removed such that the bolt 230 can be removed from the wedge 220. For example, the fastener may be removed from the aperture 252 such that the pin 250 can be removed from the bolt 230. When the pin 250 is removed from the hole 239, the bolt 230 may be removed from the wedge 220. For example, the lower head 234 may be driven (e.g., counter-clockwise) to remove the bolt 230 from the wedge 220. Although the hole 239 may fully extend through the bolt 230, it should be appreciated that the hole 239 may extend partially through the bolt 230 such that one end of the pin 250 is configured to be received therein.

The wedge 220, the bolt 230, and/or the pin 250 may be configured to be reused, for example, after being installed and removed from the electrical connector 200. For example, when the wedge 220, the bolt 230, and the pin 250 are removed from the electrical connector 200, they may be reinstalled in the electrical connector 200 or another electrical connector.

FIGS. 3A-3E depict another example electrical connector 300 (e.g., such as the electrical connectors 100, 200). The electrical connector 300 may include a body member 310, a wedge 320, and a bolt 330. The bolt 330 may be a bolt assembly (e.g., such as a shear bolt assembly). The electrical connector 300 may be configured to electrically and mechanically connect a main conductor (e.g., such as a transmission conductor, not shown) to a tap conductor (e.g., such as a distribution conductor, not shown). The electrical connector 300 may include a conductor interface insert (not shown) configured to be located between the main conductor and the tap conductor within the electrical connector 300.

The body member 310 may be substantially C-shaped. For example, the body member 310 may have a rear wall 312, a curved top portion 314 and a curved bottom portion 316. The curved top portion 314 may be configured to receive the distribution connector. For example, the curved top portion 314 of the electrical connector 300 may fit partially around the main conductor. The curved bottom portion 316 may be configured to receive the wedge 320. The rear wall 312 may be substantially flat, for example, between the curved top portion 314 and the curved bottom portion 316. The rear wall 312 may define a stop 318 that extends away from the rear wall 312.

The wedge 320 may be a wedge assembly. The wedge 320 may include a recess 322 along an elongated upper surface 324. The recess 322 may be configured to receive the distribution conductor and/or the transmission conductor. For example, the recess 322 may cooperate with a bottom surface of the tap conductor. The wedge 320 may be received within the curved bottom portion 316 of the body member 310. For example, the wedge 320 may define a first tab 328. The first tab 328 may extend (e.g., downwardly) from the wedge 320. The first tab 328 may define an aperture 329 passing therethrough. The aperture 329 may be threaded. The aperture 329 may be configured to receive the bolt 330 (e.g., a distal end of the bolt 330). The aperture 329 may define threads that are complementary to the threads of the bolt 330. The wedge 320 may be configured to be driven by the bolt 330. The curved bottom portion 316 may define a cavity 317. The cavity 317 may be configured to receive the first tab 328. For example, the cavity 317 may receive the first tab 328 as the wedge 320 is driven by the bolt 330.

The wedge 320 may define a second tab 326. The second tab 326 may extend (e.g., downwardly) from the wedge 320. The second tab 326 may define an aperture 327 passing therethrough. The aperture 327 may be threaded. The aperture 327 may be configured to receive the bolt 330. The aperture 327 may define threads that are complementary to the threads of the bolt 330.

The body member 310 may define a hole 315 configured to receive the bolt 330. The hole 315 may be defined through the curved bottom portion 316 of the body member 310. For example, the hole 315 may extend from a front surface 319 defined by the body member 310 to the cavity 317. The hole 315 may be threaded. For example, the hole 315 may define threads that are complementary to the threads of the bolt 330.

The electrical connector 300 may be configured to secure (e.g., releasably secure) the bolt 330 therein. The electrical connector 300 may be configured to enable removal of the bolt 330 from the body member 310 and the wedge 320.

The bolt 330 may define an upper head 332, a lower head 334, a shear section 336, and a shank 338. The shank 338 may define a threaded portion 331 and a non-threaded portion 333. The bolt 330 may be received by the aperture 327 and the hole 315. For example, the shank 338 of the bolt 330 may be received by the aperture 327 and the hole 315. The bolt 330 may be configured to drive the wedge 320 into the electrical connector 300. The bolt 330 may be configured to be driven at the upper head 332. As torque is applied to the upper head 332, the bolt 330 may rotate as the threaded portion 331 engages complementary threads (e.g., in the aperture 327 and/or the hole 315). When the applied torque exceeds a threshold torque, the shear section 336 may shear such that the upper head 332 is mechanically decoupled from the shank 338 (e.g., the threaded portion 331) of the bolt 330. For example, when the shear section 336 shears, the upper head 332 may no longer drive the threaded portion 331 of the bolt 330. When the shear section 336 shears, the bolt 330 may captively secure the upper head 332 thereto. For example, the bolt 330 may be configured such that the upper head 332 remains coupled to the bolt 330 when the shear section 336 has sheared. A washer 340 may be received by the shank 338 such that when installed, the washer 340 is in contact with the wedge 320 and the lower head 334.

When the bolt 330 is rotated in a clockwise direction, the bolt 330 may be threaded into the hole 315 of the body member 310 and the lower head 334 may apply a force upon the second tab 326 such that the entire wedge 320 is moved within the body member 310. For example, the wedge 320 may be moved within the curved bottom portion 316 of the body member 310. When the wedge 320 is moved within the body member 310, the upper surface 324 of the wedge 320 may move (e.g., upwardly) toward the curved top portion 314. When the bolt 330 is rotated in a counter-clockwise direction, the wedge 320 may move away from the body member 310. When the wedge 320 is moved away from the body member 310, the upper surface 324 of the wedge 320 may move (e.g., downwardly) away from the curved top portion 314. The threaded portion 331 may be configured with a predetermined amount (e.g., length) of threads. The predetermined amount of threads may be configured such that the bolt 330 spins freely when the wedge 320 is extracted (e.g., fully extracted) from the body member 310.

The electrical connector 300 may be configured such that it is assembled without the conductor interface insert (not shown). The bolt 330 may be in a position such that the wedge 320 is substantially withdrawn from the body member 310. The electrical connector 300 may be suspended from a main conductor by resting the curved top portion 314 of the body member 310 around the main conductor. A tap conductor may be laid across the upper surface 324 of the wedge 320. The electrical conductor 300 includes a conductor interface insert (not shown). The conductor interface insert may be positioned between the transmission and tap conductors, for example, outside of the body member 310. The conductor interface insert may be moved toward the interior of the body member 310, for example, using the conductors (not shown) as a guide. The conductor interface insert may be moved until a leading surface of the conductor interface insert contacts the stop 318.

With the conductor interface insert in place, the bolt 330 may be rotated such that the wedge 320 is moved toward the interior of the body member 310. The bolt 330 may be rotated via the upper head 332. As the wedge 320 is moved into the interior of the body member 310, the recess 322 may be moved into contact with the tap conductor which in turn is forced against the conductor interface insert. The conductor interface insert may be forced into contact with the main conductor which in turn is forced into contact with the curved top portion 314 of the body member 310. The bolt 330 (e.g., the shear section 336) may be configured to shear at a threshold torque. For example, the threshold torque may be determined such that it corresponds to the wedge 320 being in its proper position and sufficient pressure being placed on the conductors so as to provide a proper connection. The bolt 330 may shear at the shear section 336. The shear section 336 may be located between the upper head 332 and the lower head 334.

The electrical connector 300 may be configured to retain the bolt 330. For example, the electrical connector 300 may include a retainer 350 (e.g., such as a pin). The retainer 350 may be a part of the wedge 320 (e.g., wedge assembly). In the exemplary embodiment shown, the retainer 350 is a pin such that the retainer 350 may also be referred to as the pin 350. The pin 350 may be a cylindrically-shaped component having a length that is greater than a diameter of the shank 338. For example, the second tab 326 may define a hole 339. The hole 339 may extend from a side of the second tab 326 to the aperture 327. The bolt 330 may be configured to receive the pin 350. For example, the bolt 330 may define a groove 337 around its circumference. The groove 337 may define a portion of the bolt 330, between the lower head 334 and the threads, having a reduced cross-section. The pin 350 may be a press-fit pin having a solid press-in zone or an elastic press-in zone. A solid press-in zone may be configured to engage the inner surface of the hole 339 and/or the groove 337. An elastic press-fit zone may be configured to deform when inserted into the hole 339. The elastic press-fit zone of the pin 350 may be configured to apply a force normal to the hole 339 and/or the groove 337. When the bolt 330 is received by the wedge 320 and body member 310, the groove 337 may be configured to align with the hole 339 in the second tab 326.

Figure 3A:
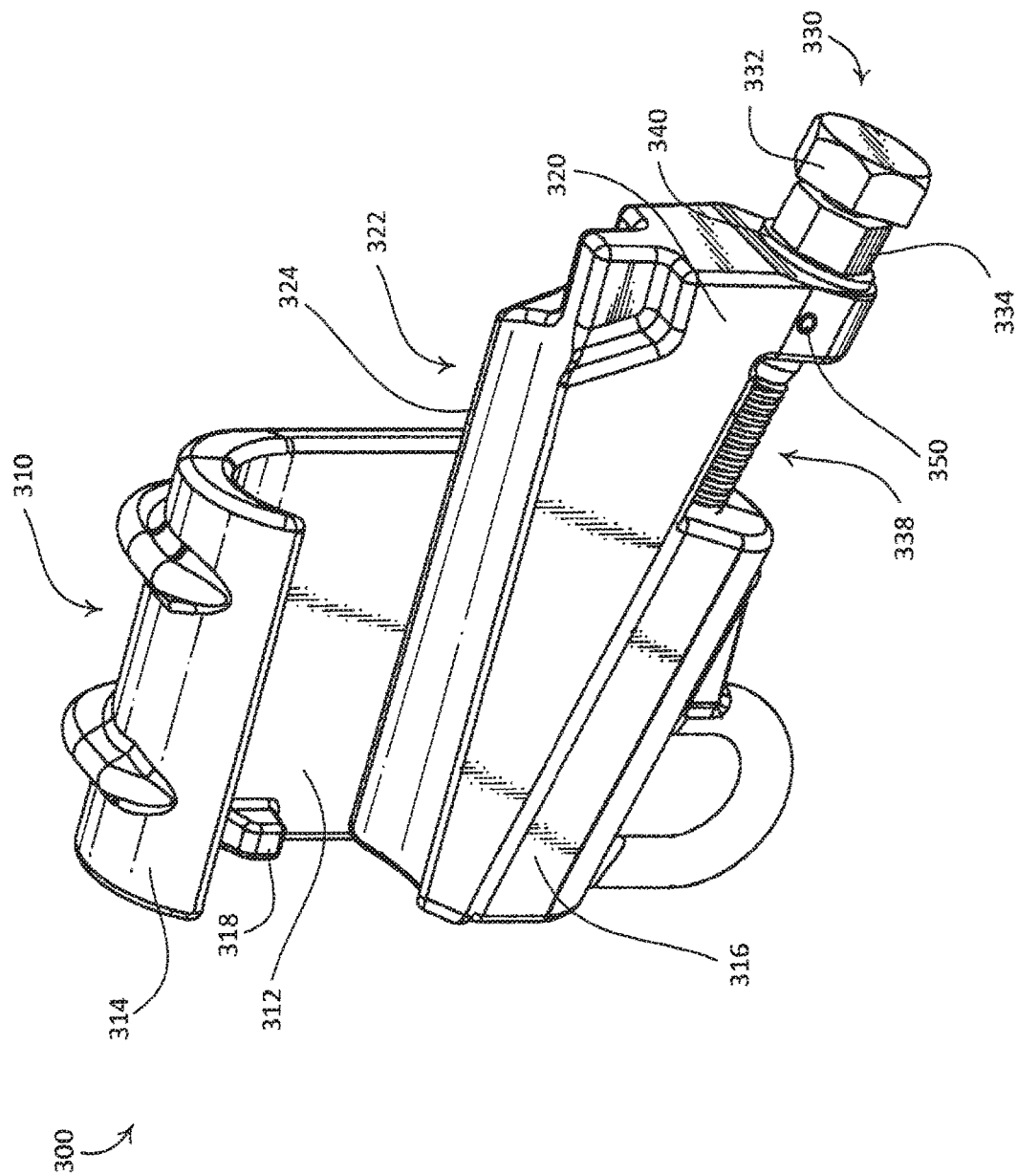
FIG. 3A is an isometric view of another example wedge assembly installed within an electrical connector.
Figure 3C:
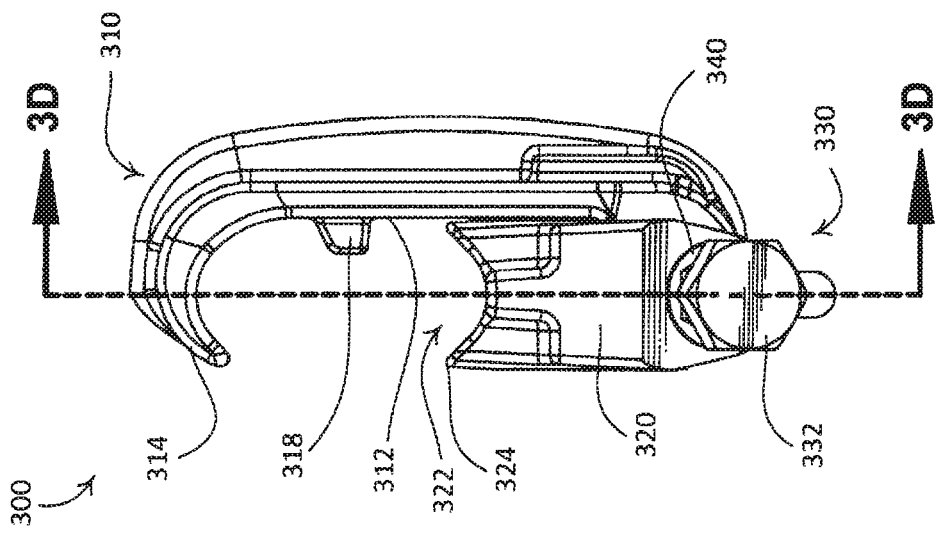
FIG. 3C is a side view of the electrical connector shown in FIG. 3A.
Figure 3B:
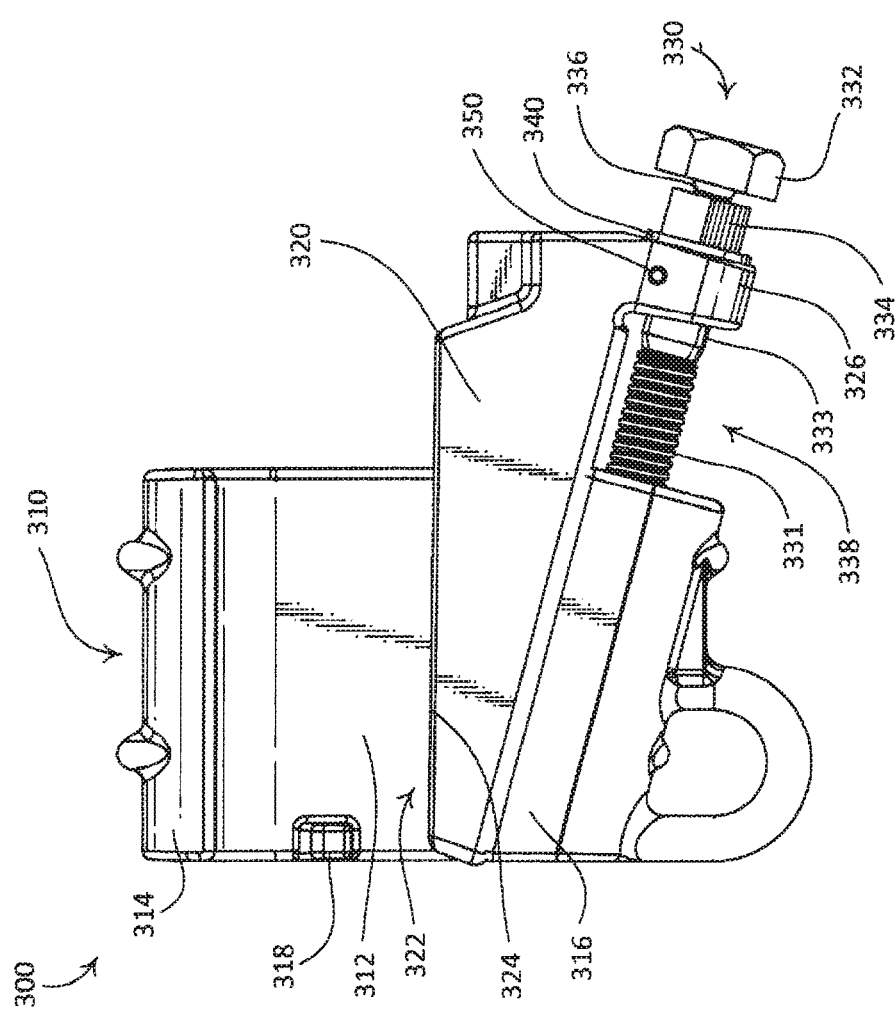
FIG. 3B is a front view of the electrical connector shown in FIG. 3A.
Figure 3D:
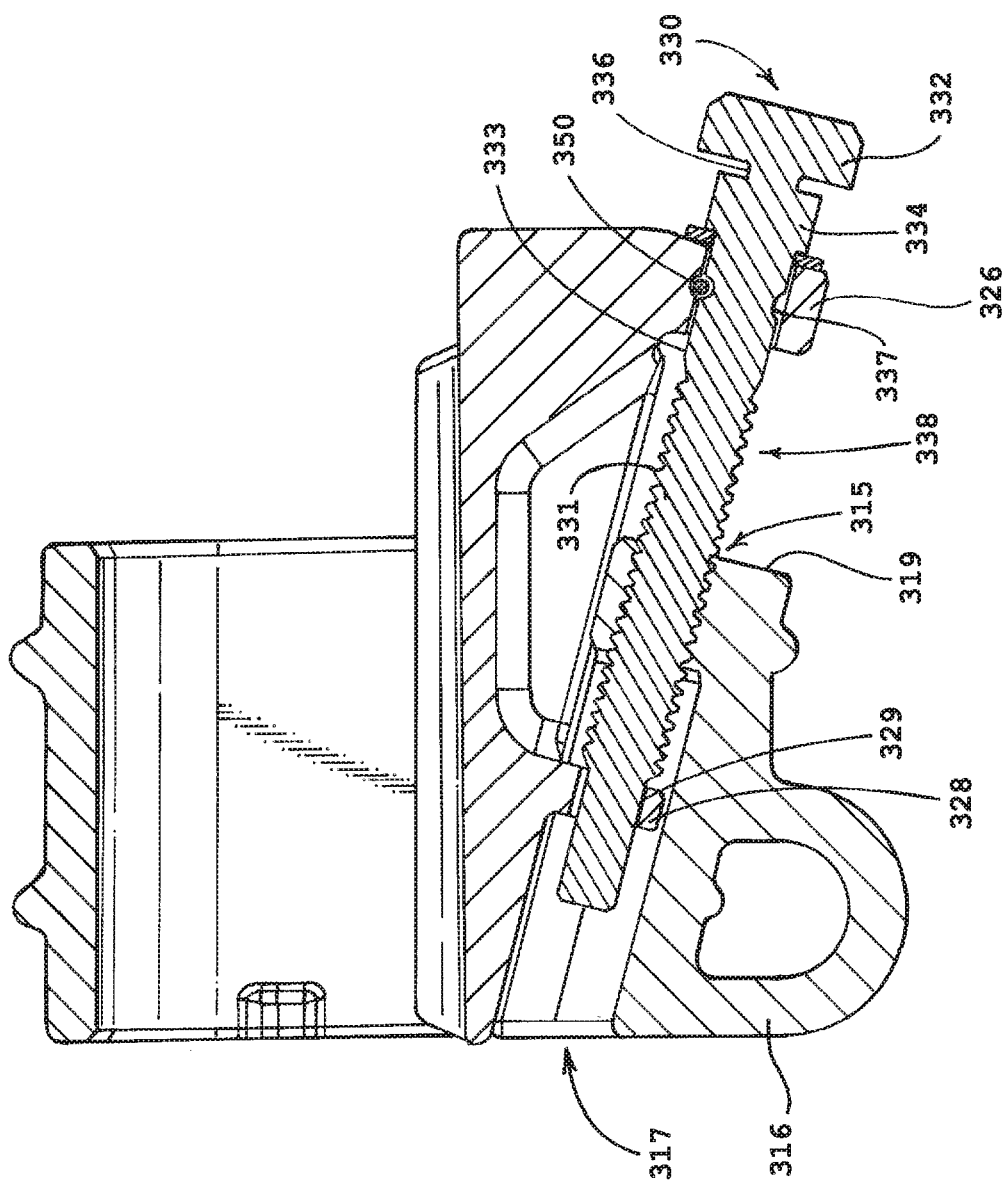
FIG. 3D is a cross-section view of the electrical connector shown in FIG. 3C taken along line 3D-3D.
Figure 3E:
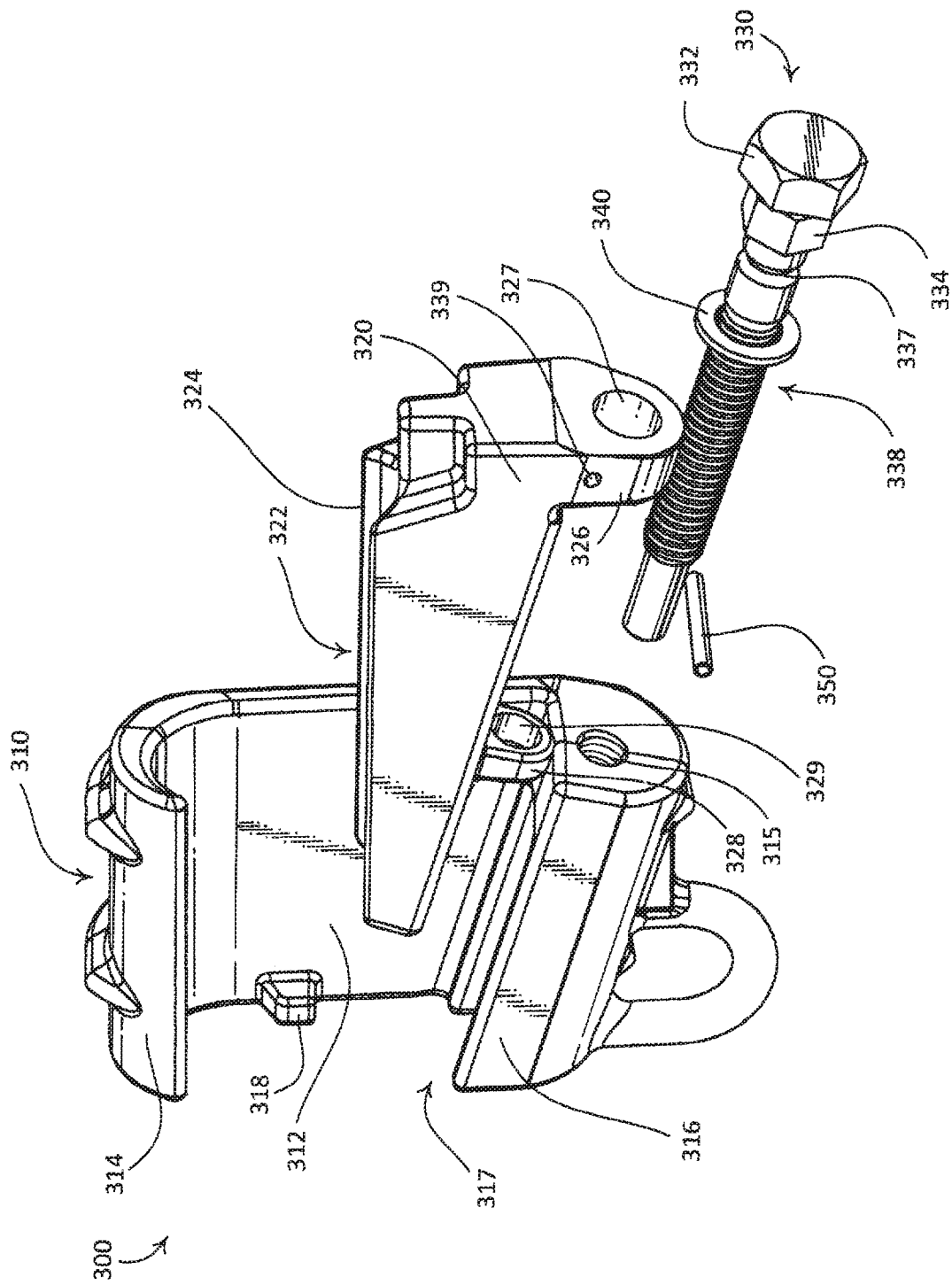
FIG. 3E is an exploded view of the electrical connector shown in FIG. 3A.

The pin 350 may be configured to retain the bolt 330 within the wedge 320. For example, the pin 350 may be inserted into the hole 339 when the wedge 220 is in its proper position and sufficient pressure is being placed on the conductors so as to provide a proper connection. The pin 350 may be configured to be retained within the hole 339. When inserted into the hole 339, the pin 350 may be configured to prevent rotation of the bolt 330, for example, with respect to the second tab 326. The pin 350 may be configured to be removed such that the bolt 330 can be removed from the wedge 320. When the pin 350 is removed from the hole 339, the bolt 330 may be removed from the wedge 320. For example, the lower head 334 may be driven (e.g., counter-clockwise) to remove the bolt 330 from the wedge 320. Although the groove 337 may define a width that is approximately equal to a diameter of the pin 350 (e.g., as shown in FIG. 3D), it should be appreciated that the groove 337 may be substantially wider than the diameter of the pin 350 such that the electrical connector is configured to receive distribution connectors of various gauge and/or thickness.

The wedge 320, the bolt 330, and/or the pin 350 may be configured to be reused, for example, after being installed and removed from the electrical connector 300. For example, when the wedge 320, the bolt 330, and the pin 350 are removed from the electrical connector 300, they may be reinstalled in the electrical connector 300 or another electrical connector.

Figure 4A:
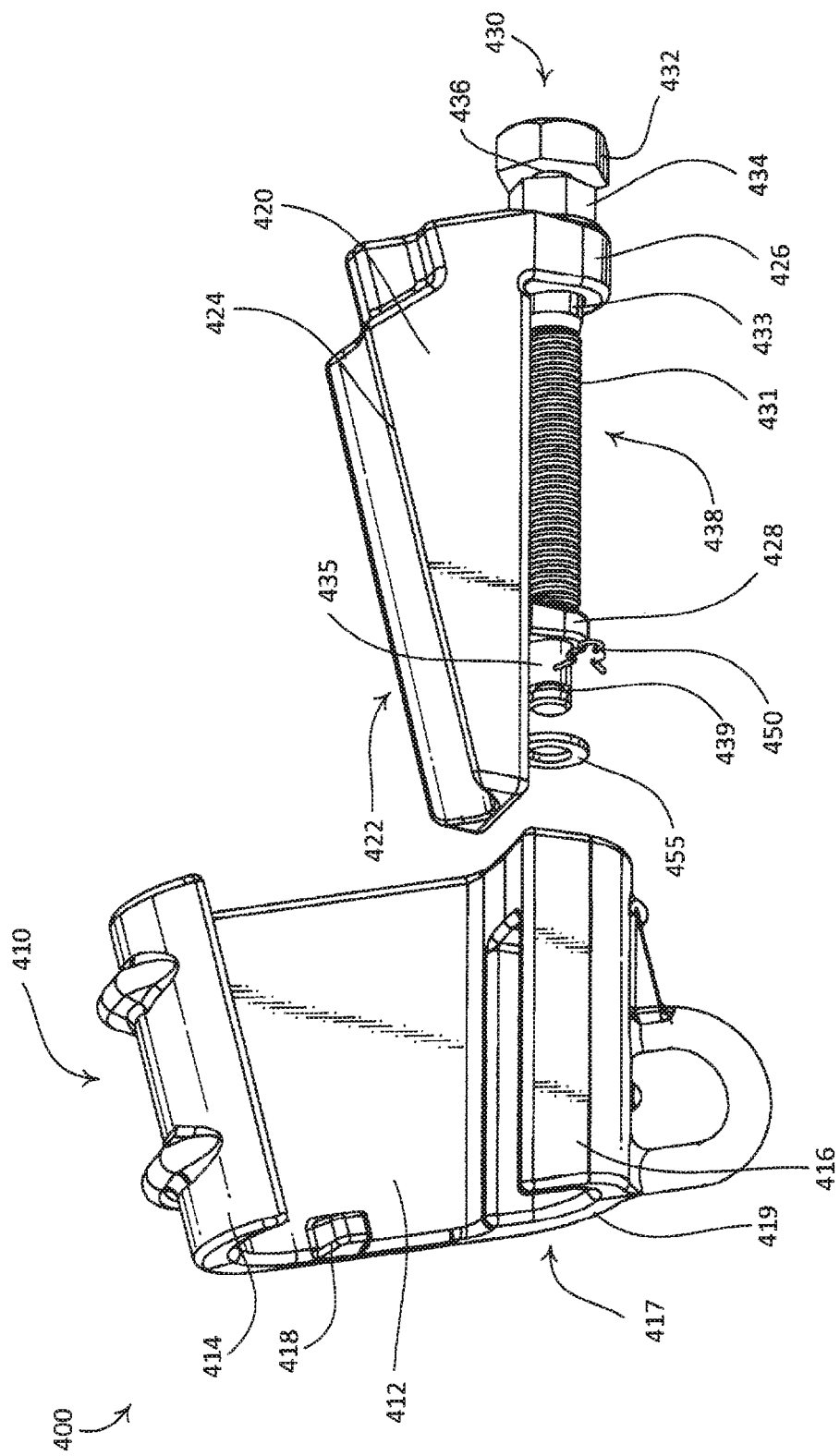
FIG. 4A is a partially exploded view of another example wedge assembly installed within an electrical connector.
Figure 4B:
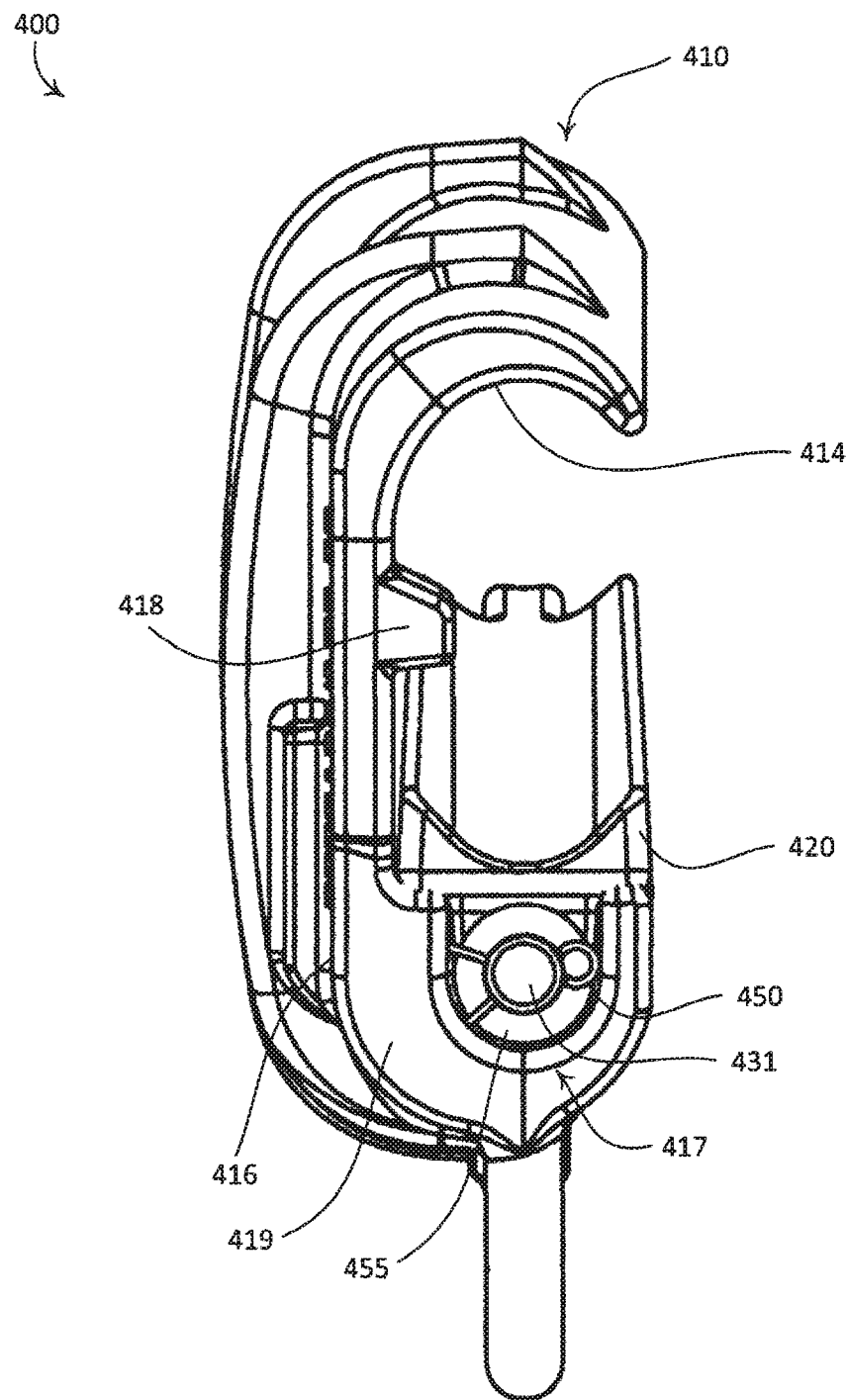
FIG. 4B is a side view of the electrical connector shown in FIG. 4A.
Figure 4C:
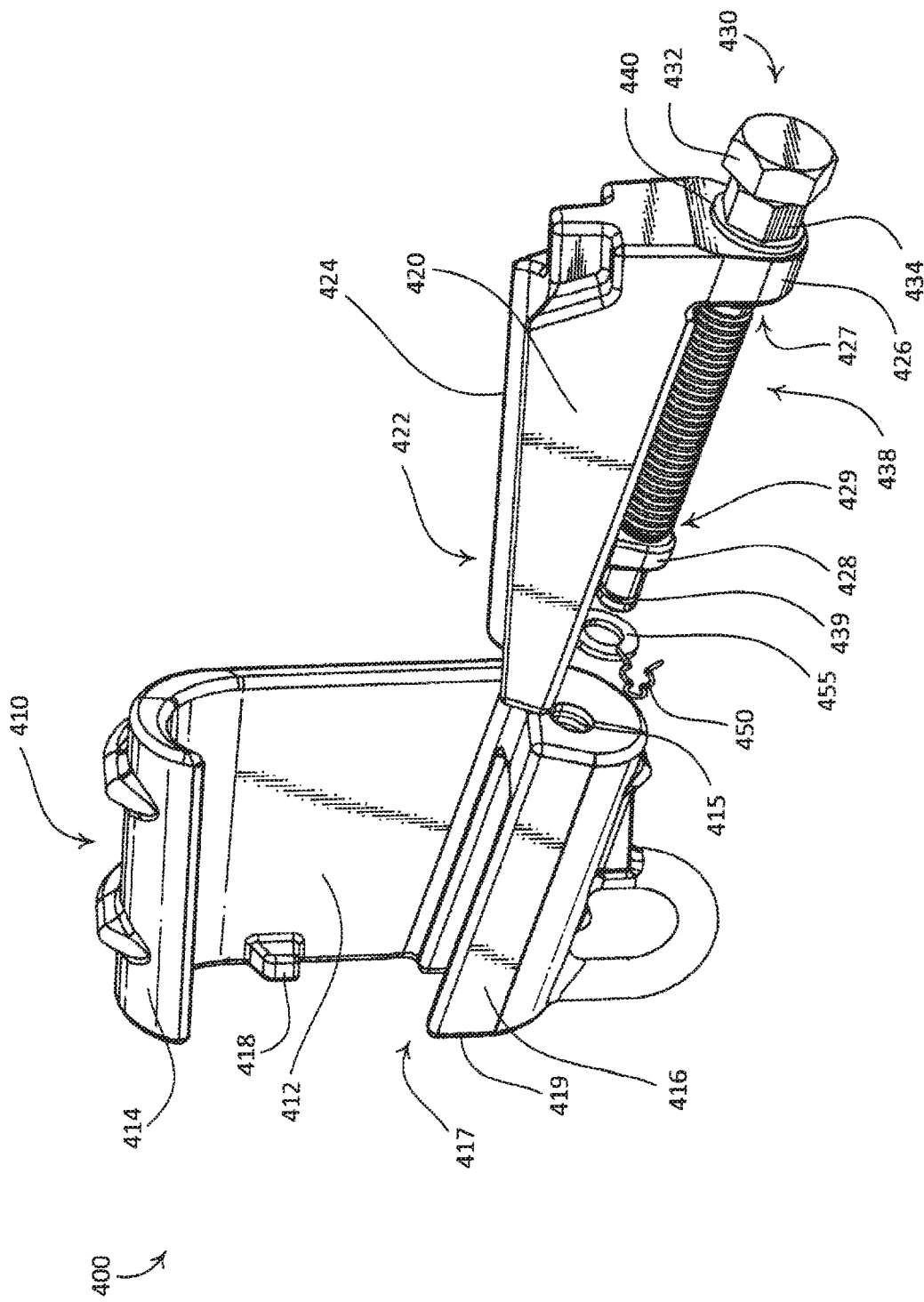
FIG. 4C is an exploded view of the electrical connector shown in FIG. 4A.
Figure 5A:
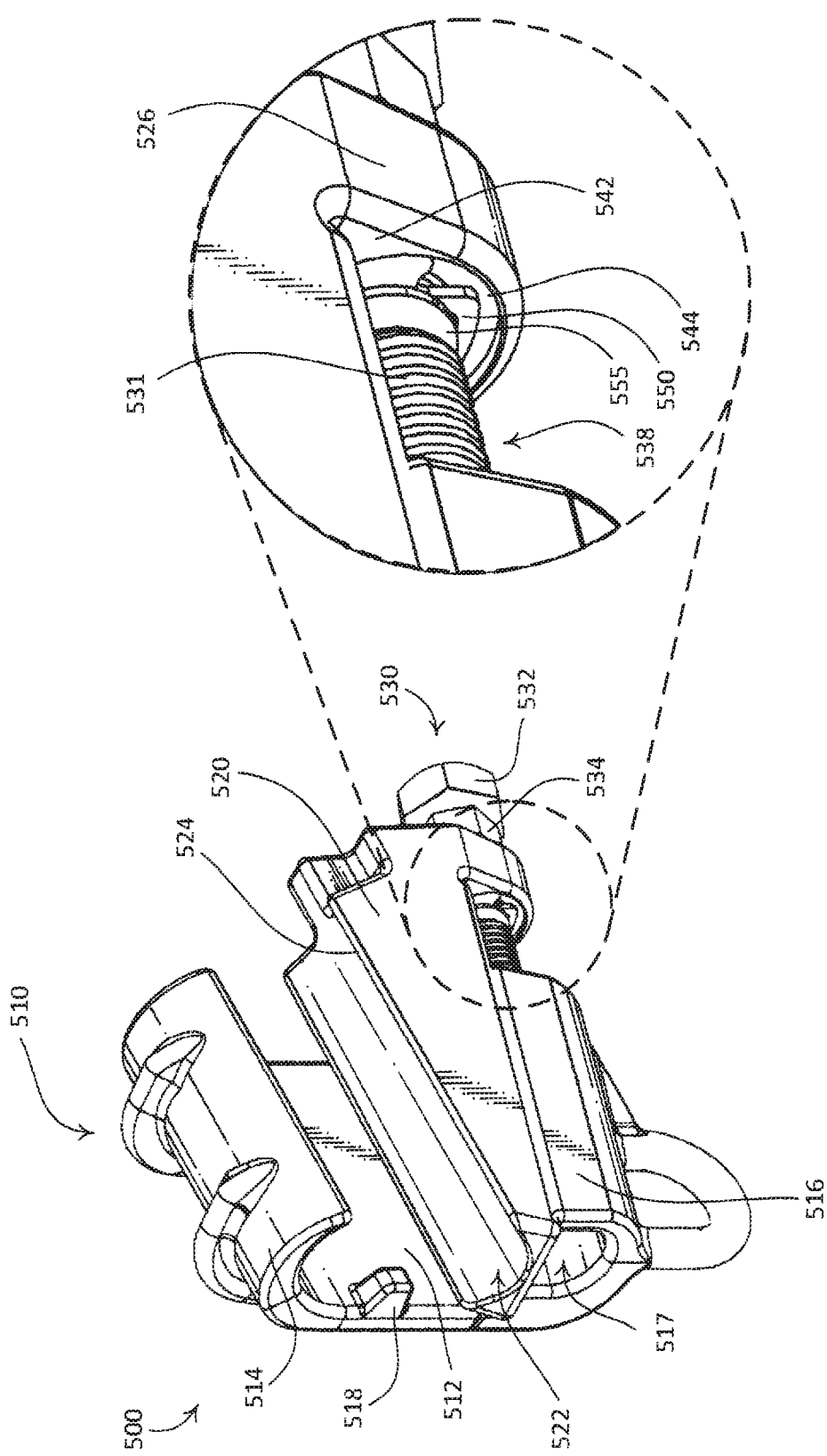
FIG. 5A is an isometric detail view of another example wedge assembly installed within an electrical connector.
Figure 5C:
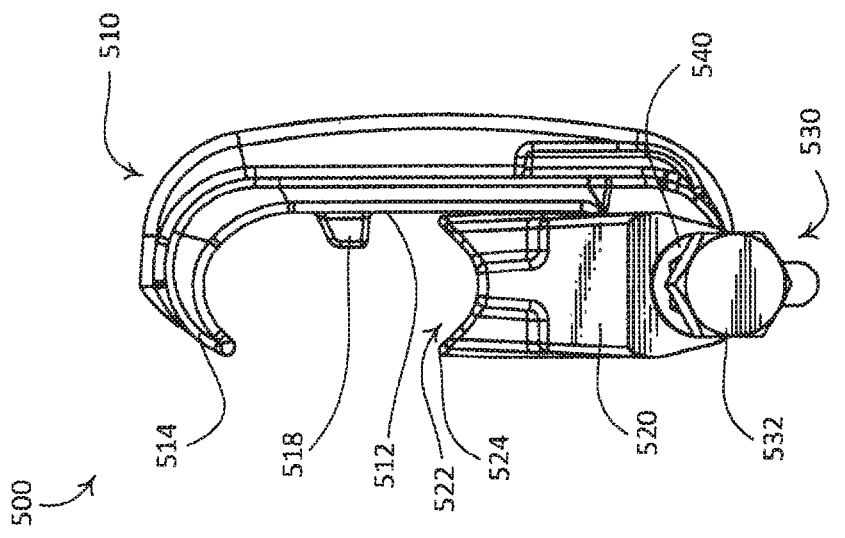
FIG. 5C is side view of the electrical connector shown in FIG. 5A.
Figure 5B:
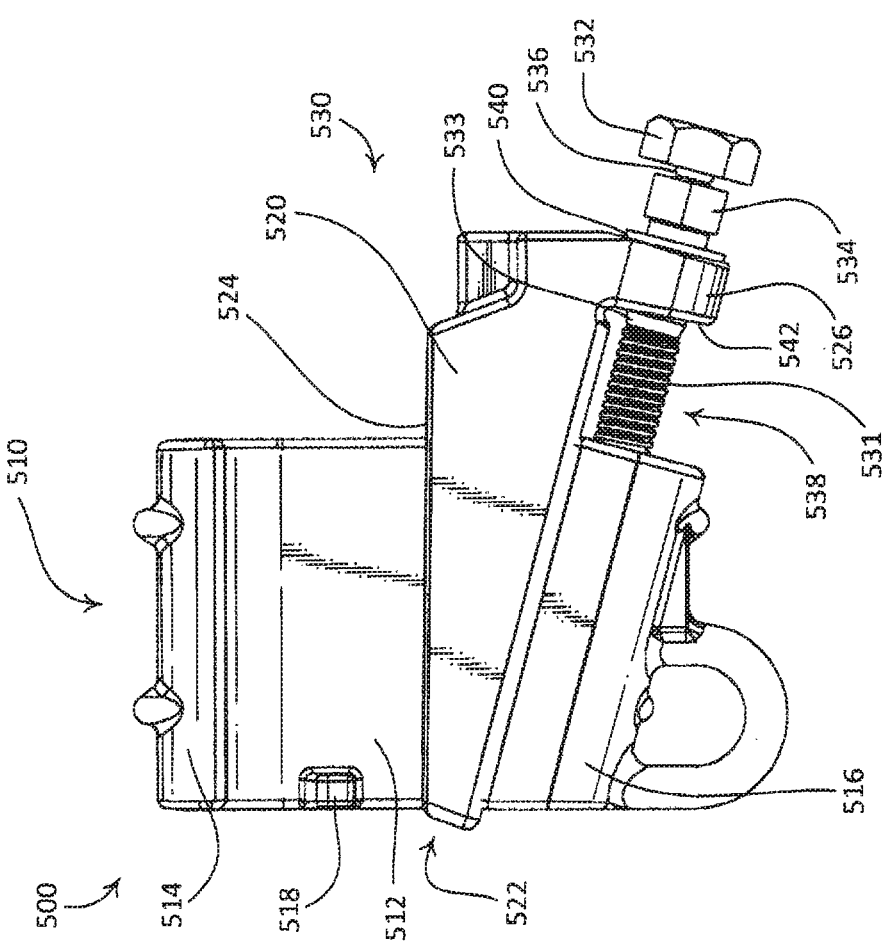
FIG. 5B is a front view of the electrical connector shown in FIG. 5A.
Figure 5E:
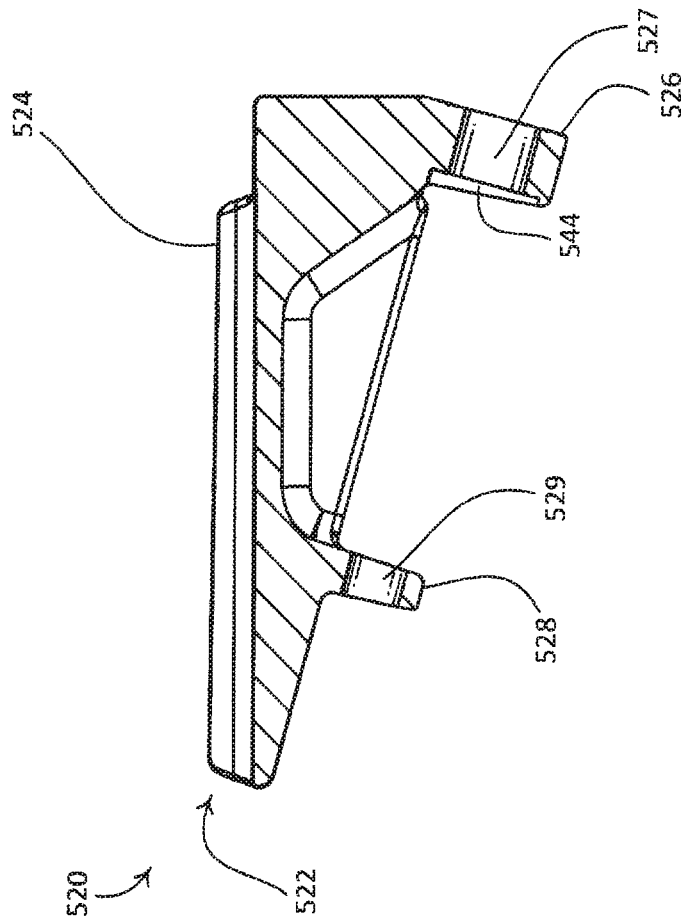
FIG. 5E is a cross-section view of the example wedge assembly shown in FIG. 5D taken along line 5E-5E.
Figure 5D:
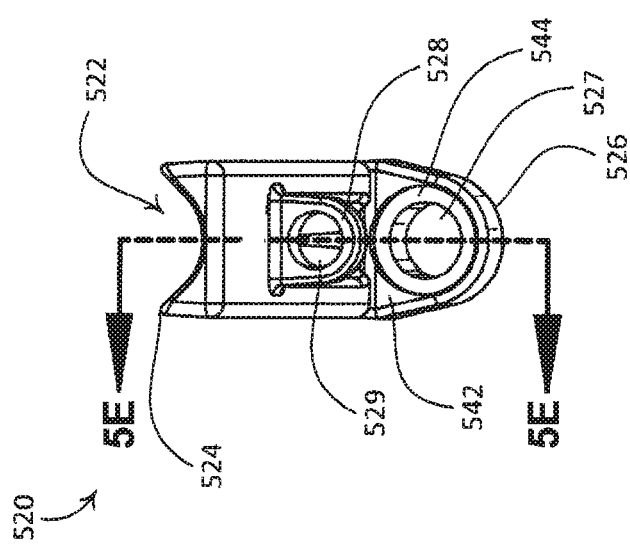
FIG. 5D is a side view of the example wedge assembly shown in FIG. 5A.
Figure 5F:
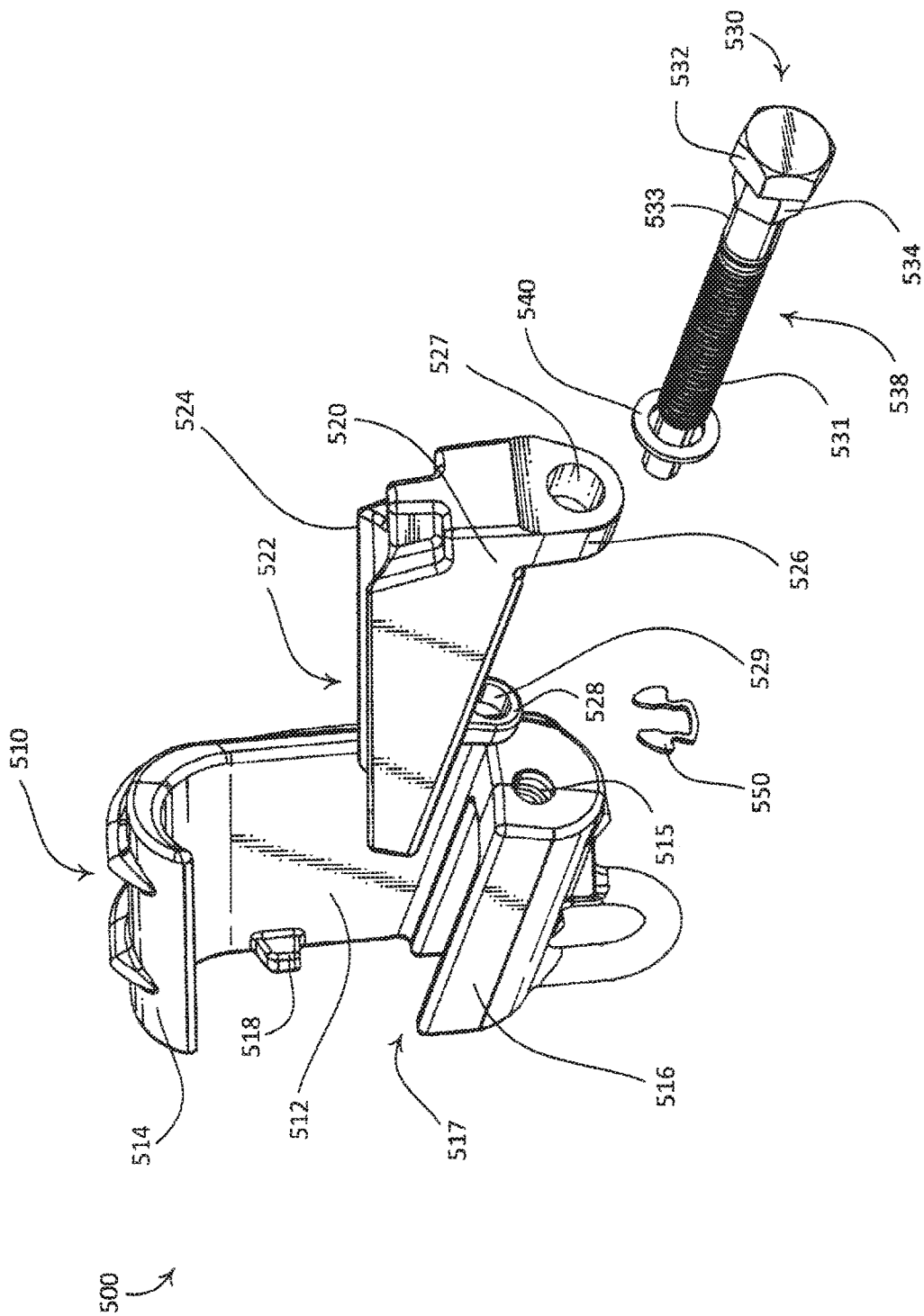
FIG. 5F is an exploded view of the electrical connector shown in FIG. 5A.
Figure 6B:
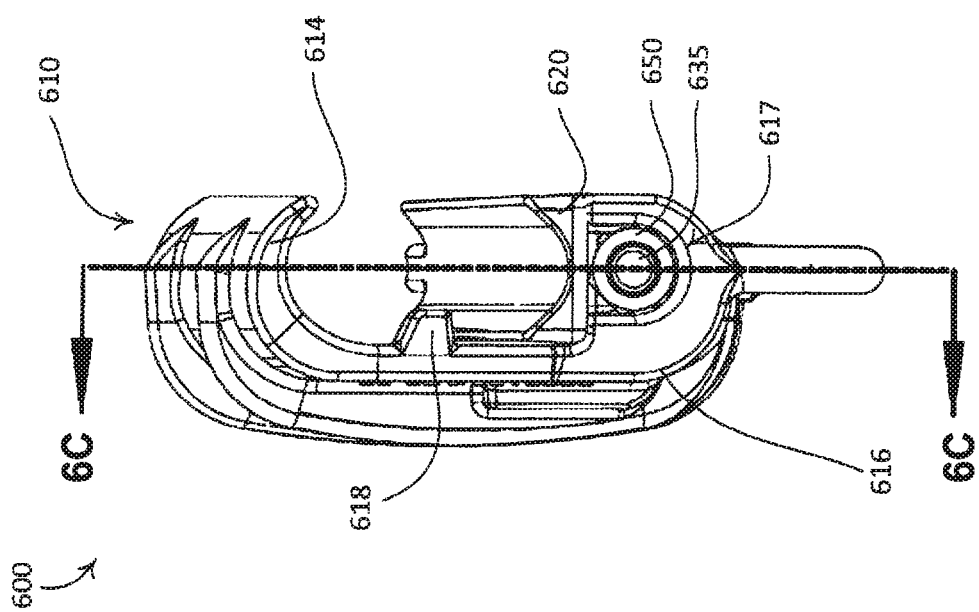
FIG. 6B is side view of the electrical connector shown in FIG. 6A.
Figure 6A:
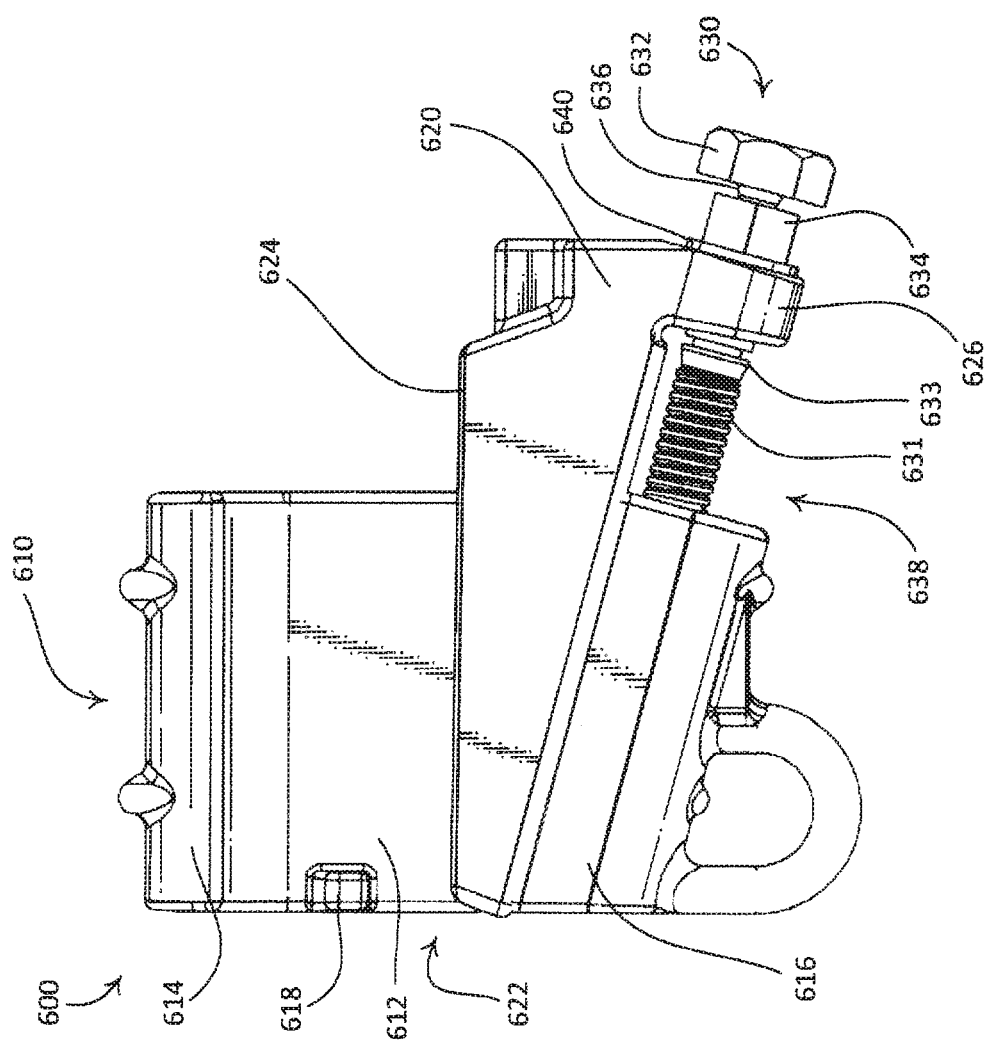
FIG. 6A is front view of another example wedge assembly installed within an electrical connector.
Figure 6C:
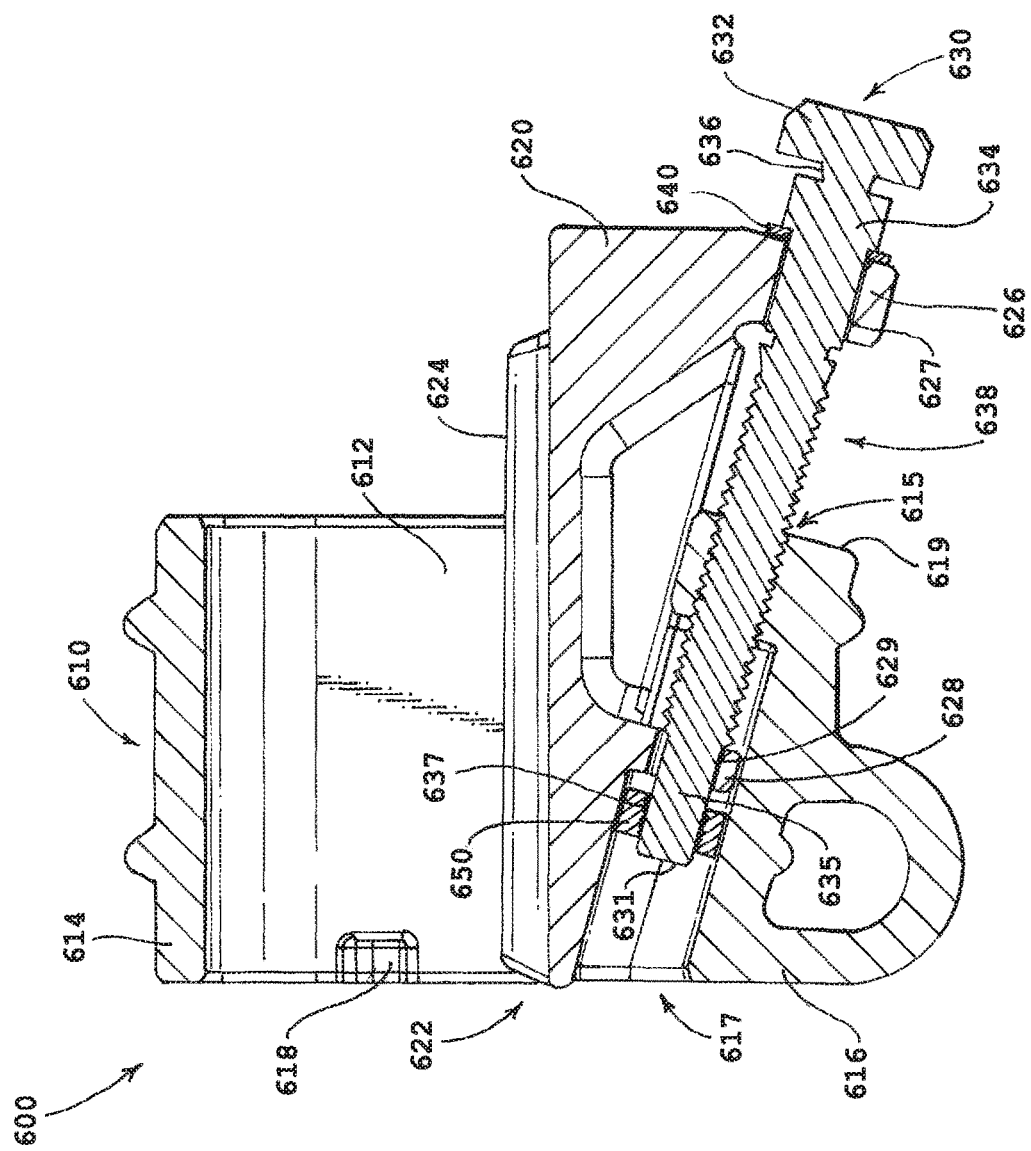
FIG. 6C is a cross-section view of the electrical connector shown in FIG. 6B taken along line 6C-6C.
Figure 6D:
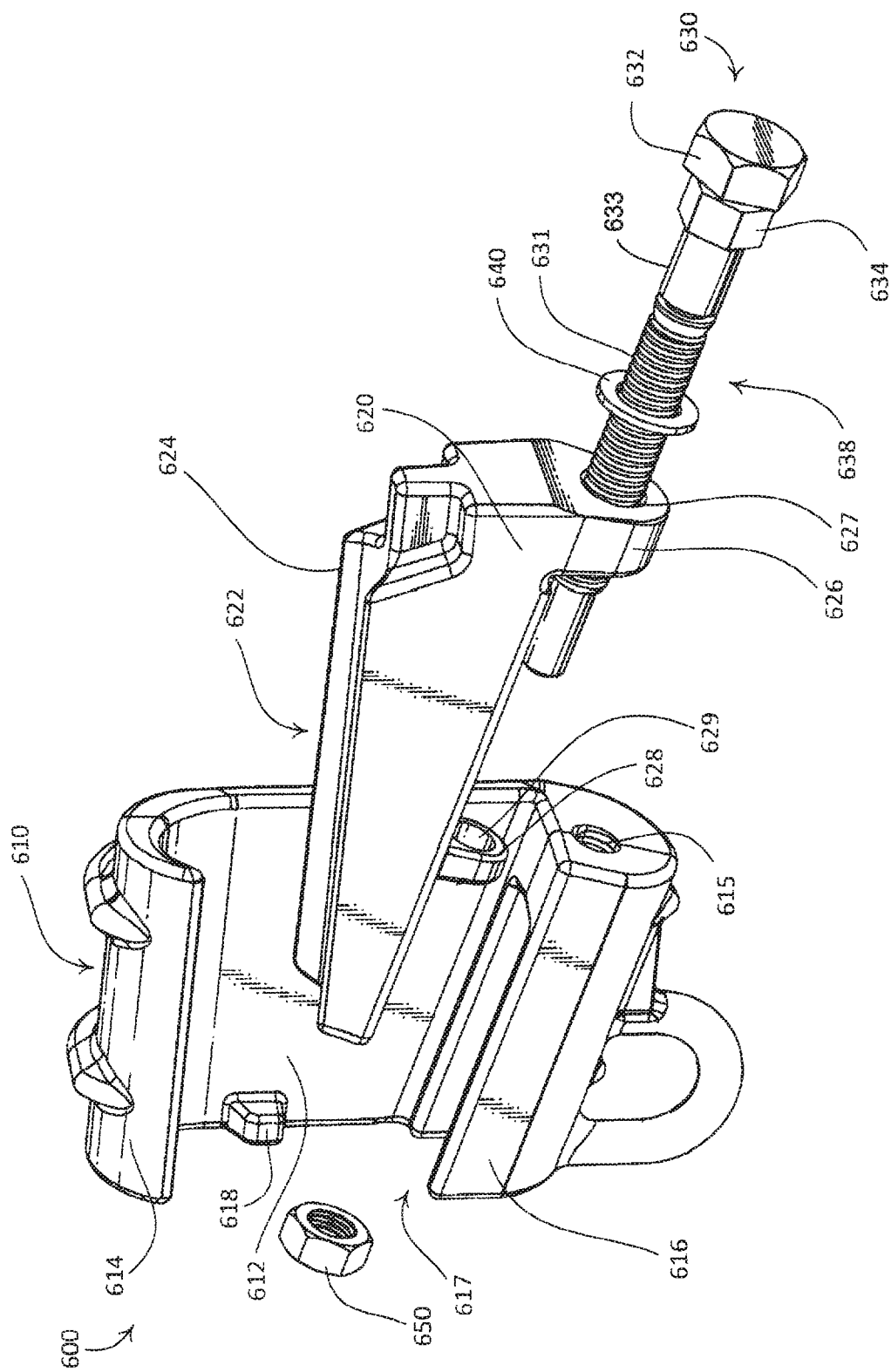
FIG. 6D is an exploded view of the electrical connector shown in FIG. 6A.
Figure 7A:
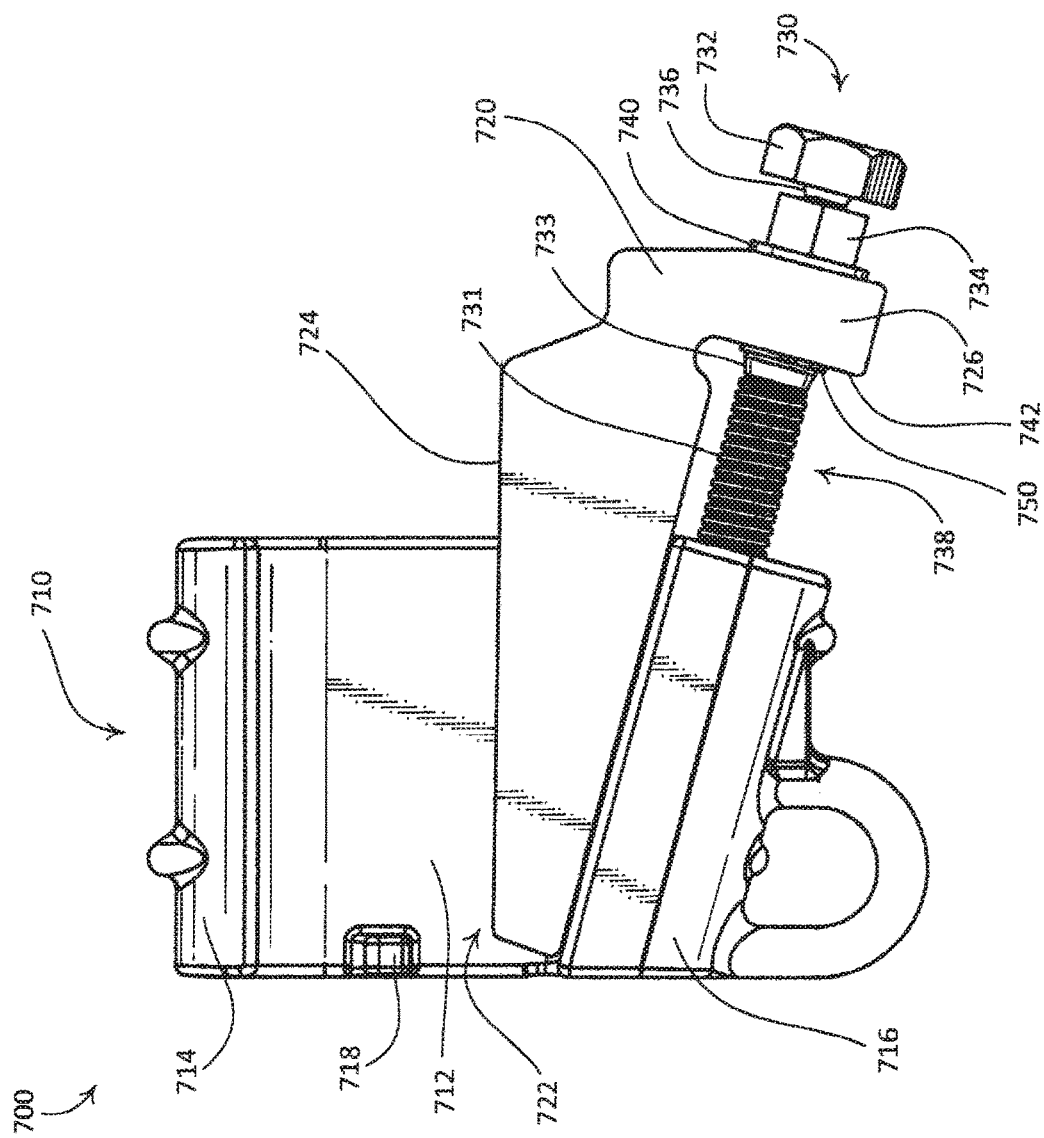
FIG. 7A is a front view of another example wedge assembly installed within an electrical connector.
Figure 7C:
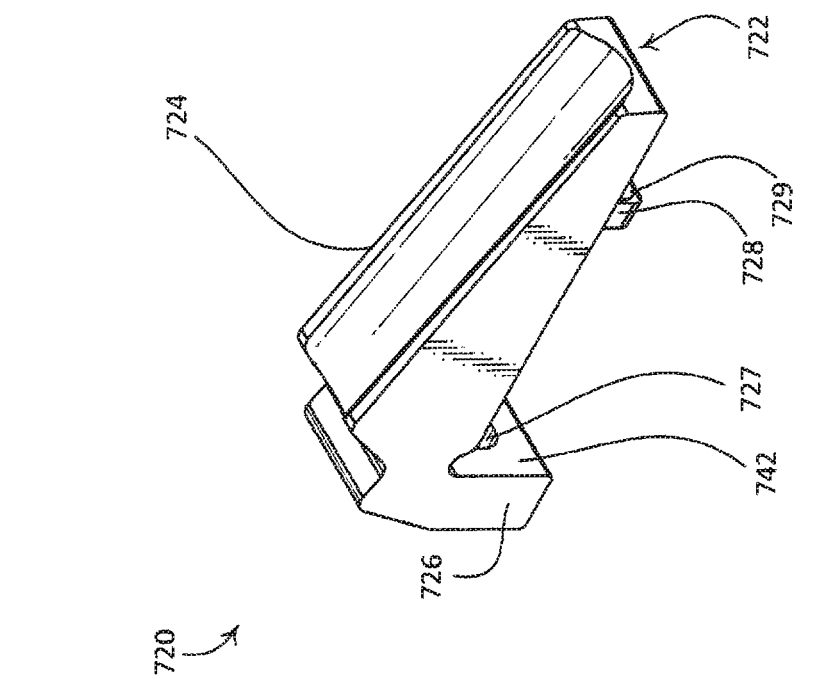
FIG. 7C is an isometric view of the example wedge assembly shown in FIG. 7A.
Figure 7B:
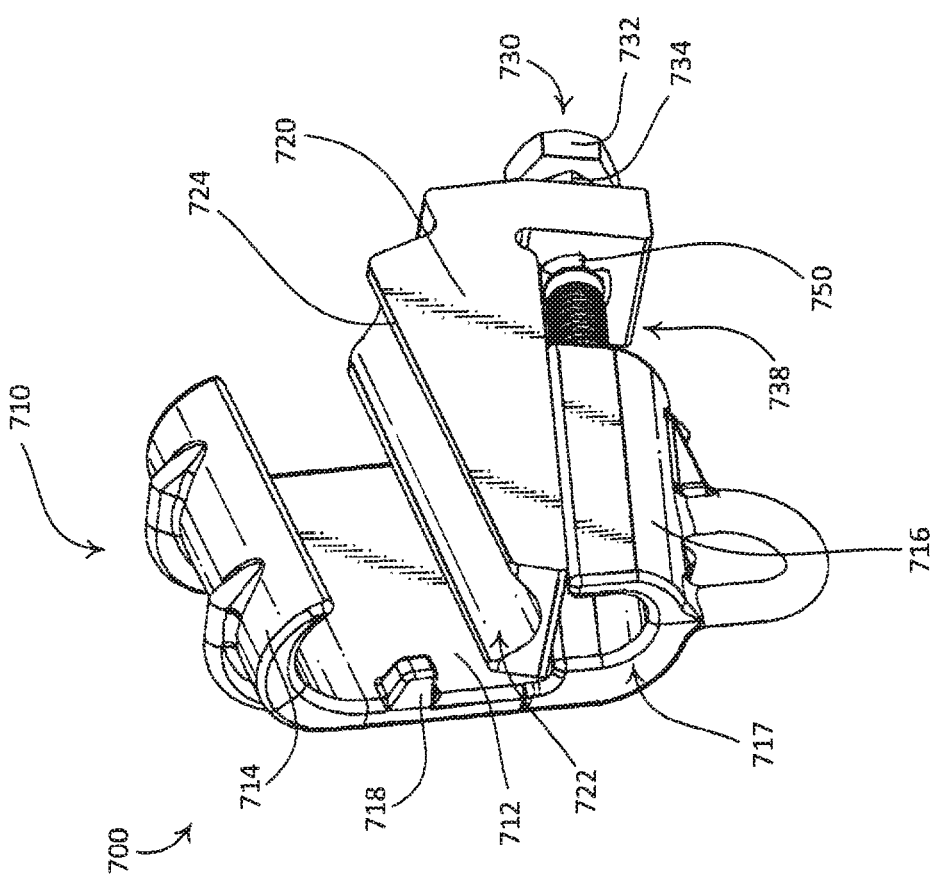
FIG. 7B is an isometric view of the electrical connector shown in FIG. 7A.
Figure 7D:
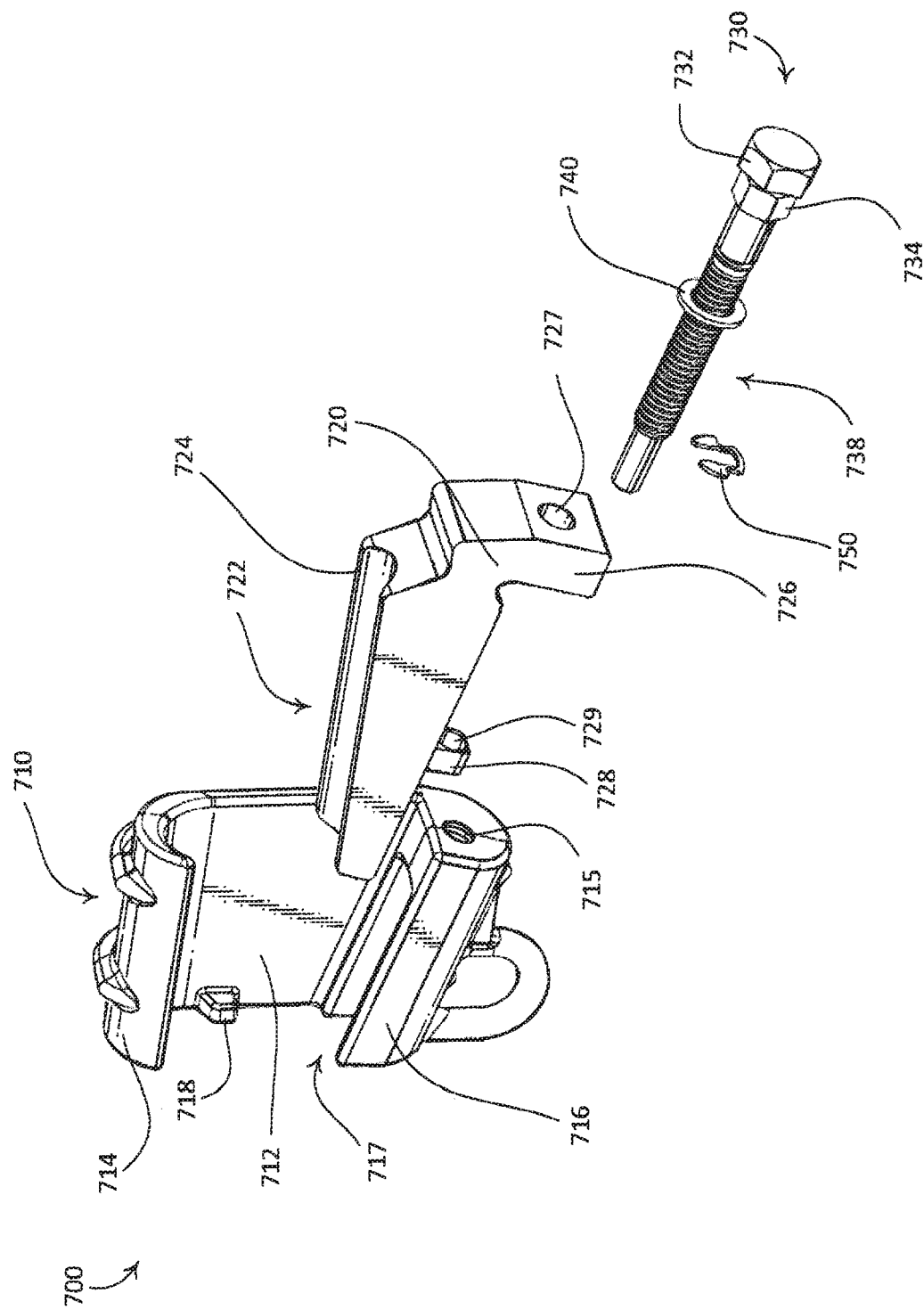
FIG. 7D is an exploded view of the electrical connector shown in FIG. 7A.

FIGS. 4A-4C depict another example electrical connector 400 (e.g., such as the electrical connectors 100, 200, 300). The electrical connector 400 may include a body member 410, a wedge 420, and a bolt 430. The bolt 430 may be a bolt assembly (e.g., such as a shear bolt assembly). The electrical connector 400 may be configured to electrically and mechanically connect a main conductor (e.g., such as a transmission conductor, not shown) to a tap conductor (e.g., such as a distribution conductor, not shown). The electrical connector 400 may include a conductor interface insert (not shown) configured to be located between the main conductor and the tap conductor within the electrical connector 400.

The body member 410 may be substantially C-shaped. For example, the body member 410 may have a rear wall 412, a curved top portion 414 and a curved bottom portion 416. The curved top portion 414 may be configured to receive the distribution connector. For example, the curved top portion 414 of the electrical connector 400 may fit partially around the main conductor. The curved bottom portion 416 may be configured to receive the wedge 420. The rear wall 412 may be substantially flat, for example, between the curved top portion 414 and the curved bottom portion 416. The rear wall 412 may define a stop 418 that extends away from the rear wall 412.

The wedge 420 may be a wedge assembly. The wedge 420 may include a recess 422 along an elongated upper surface 424. The recess 422 may be configured to receive the distribution conductor and/or the transmission conductor. For example, the recess 422 may cooperate with a bottom surface of the tap conductor. The wedge 420 may be received within the curved bottom portion 416 of the body member 410. For example, the wedge 420 may define a first tab 428. The first tab 428 may extend (e.g., downwardly) from the wedge 420. The first tab 428 may define an aperture 429 passing therethrough. The aperture 429 may be threaded. The aperture 429 may be configured to receive the bolt 430 (e.g., a distal end of the bolt 430). The aperture 429 may define threads that are complementary to the threads of the bolt 430. The wedge 420 may be configured to be driven by the bolt 430. The curved bottom portion 416 may define a cavity 417. The cavity 417 may be configured to receive the first tab 428. For example, the cavity 417 may receive the first tab 428 as the wedge 420 is driven by the bolt 430.

The wedge 420 may define a second tab 426. The second tab 426 may extend (e.g., downwardly) from the wedge 420. The second tab 426 may define an aperture 427 passing therethrough. The aperture 427 may be threaded. The aperture 427 may be configured to receive the bolt 430. The aperture 427 may define threads that are complementary to the threads of the bolt 430.

The body member 410 may define a hole 415 configured to receive the bolt 430. The hole 415 may be defined through the curved bottom portion 416 of the body member 410. The hole 415 may be threaded. For example, the hole 415 may define threads that are complementary to the threads of the bolt 430.

The electrical connector 400 may be configured to secure (e.g., releasably secure) the bolt 430 therein. The electrical connector 400 may be configured to enable removal of the bolt 430 from the body member 410 and the wedge 420.

The bolt 430 may define an upper head 432, a lower head 434, a shear section 436, and a shank 438. The shank 438 may define a threaded portion 431 and a non-threaded portion 433. The bolt 430 may be received by the aperture 427 and the hole 415. For example, the shank 438 of the bolt 430 may be received by the aperture 427 and the hole 415. The bolt 430 may be configured to drive the wedge 420 into the electrical connector 400. The bolt 430 may be configured to be driven at the upper head 432. As torque is applied to the upper head 432, the bolt 430 may rotate as the threaded portion 431 engages complementary threads (e.g., in the aperture 427 and/or the hole 415). When the applied torque exceeds a threshold torque, the shear section 436 may shear such that the upper head 432 is mechanically decoupled from the shank 438 (e.g., the threaded portion 431) of the bolt 430. For example, when the shear section 436 shears, the upper head 432 may no longer drive the threaded portion 431 of the bolt 430. When the shear section 436 shears, the bolt 430 may captively secure the upper head 432 thereto. For example, the bolt 430 may be configured such that the upper head 432 remains coupled to the bolt 430 when the shear section 436 has sheared. A washer 440 may be received by the shank 438 such that when installed, the washer 440 is in contact with the wedge 420 and the lower head 434.

When the bolt 430 is rotated in a clockwise direction, the bolt 430 may be threaded into the hole 415 of the body member 410 and the lower head 434 may apply a force upon the second tab 426 such that the entire wedge 420 is moved within the body member 410. For example, the wedge 420 may be moved within the curved bottom portion 416 of the body member 410. When the wedge 420 is moved within the body member 410, the upper surface 424 of the wedge 420 may move (e.g., upwardly) toward the curved top portion 414. When the bolt 430 is rotated in a counter-clockwise direction, the wedge 420 may move away from the body member 410. When the wedge 420 is moved away from the body member 410, the upper surface 424 of the wedge 420 may move (e.g., downwardly) away from the curved top portion 414. The threaded portion 431 may be configured with a predetermined amount (e.g., length) of threads. The predetermined amount of threads may be configured such that the bolt 430 spins freely when the wedge 420 is extracted (e.g., fully extracted) from the body member 410.

The electrical connector 400 may be configured such that it is assembled without the conductor interface insert (not shown). The bolt 430 may be in a position such that the wedge 420 is substantially withdrawn from the body member 410. The electrical connector 400 may be suspended from a main conductor by resting the curved top portion 414 of the body member 410 around the main conductor. A tap conductor may be laid across the upper surface 424 of the wedge 420. The electrical conductor 400 includes a conductor interface insert (not shown). The conductor interface insert may be positioned between the transmission and tap conductors (not shown), for example, outside of the body member 410. The conductor interface insert may be moved toward the interior of the body member 410, for example, using the conductors as a guide. The conductor interface insert may be moved until a leading surface of the conductor interface insert contacts the stop 418.

With the conductor interface insert in place, the bolt 430 may be rotated such that the wedge 420 is moved toward the interior of the body member 410. The bolt 430 may be rotated via the upper head 432. As the wedge 420 is moved into the interior of the body member 410, the recess 422 may be moved into contact with the tap conductor which in turn is forced against the conductor interface insert. The conductor interface insert may be forced into contact with the main conductor which in turn is forced into contact with the curved top portion 414 of the body member 410. The bolt 430 (e.g., the shear section 436) may be configured to shear at a threshold torque. For example, the threshold torque may be determined such that it corresponds to the wedge 420 being in its proper position and sufficient pressure being placed on the conductors so as to provide a proper connection. The bolt 430 may shear at the shear section 436. The shear section 436 may be located between the upper head 432 and the lower head 434.

The electrical connector 400 may be configured to retain the bolt 430. For example, the electrical connector 400 may include a retainer 450 (e.g., such as a retaining clip). The retainer 450 may be a part of the wedge 420 (e.g., wedge assembly). In the exemplary embodiment shown, the retainer 450 is a retaining clip such that the retainer 450 may also be referred to as the retaining clip 450. The retaining clip 450 may be a hitch pin, hitch clip, or a similar clip. The bolt 430 may define a groove 439. For example, an end portion 435 (e.g., distal from the upper head 432) may define the groove 439. The groove 439 may extend around a circumference of the bolt 430. The groove 439 may define a portion of the bolt 430, between the end portion 435 and the threaded portion 431 of the shank 438, having a reduced cross-section. The groove 439 of the bolt 430 may be configured to receive the retaining clip 450. The bolt 430 may be configured to receive a second washer 455, for example between the retaining clip 450 and the first tab 428. The retaining clip 450 may be configured to deform (e.g., expand slightly) when pressed into engagement with the groove 439. The retaining clip 450 may be configured to be removably secured about the groove 439 of the bolt 430. For example, the wedge 420 and the body member 410 may receive the bolt 430. The groove 439 may be accessible when the bolt 430 is driven such that the end portion 435 of the bolt 430 extends beyond a rear side 419 of the body member 410. The retaining clip 450 and/or the second washer 455 may be installed on the groove 439 when the end portion 435 of the bolt 430 extends beyond the rear side 419 of the body member 410. When the retaining clip 450 and/or the second washer 455 are installed on the end portion 435 of the bolt 430, the bolt 430 may be rotated such that the wedge 420 moves away from the body member 410, for example, so that the conductor(s) can be installed within the electrical connector 400.

The retaining clip 450 may be configured to retain the bolt 430 within the wedge 420. When the bolt 430 is received by the wedge 420 and body member 410, the retaining clip 450 may be configured to retain the bolt 430 within the body member 410. For example, the retaining clip 450 may engage the groove 439 when the wedge 420 is in its proper position and sufficient pressure is being placed on the conductors so as to provide a proper connection. When the bolt 430 is rotated for removal, the retaining clip 450 may abut the first tab 428 such that further rotation (e.g., removal) of the bolt 430 is prevented. The retaining clip 450 may be configured to be retained on the bolt 430. When installed on the groove 439, the retaining clip 450 may be configured to prevent removal of the bolt 430 from the body member 410 and/or the wedge 420. The retaining clip 450 may be configured to be removed such that the bolt 430 can be removed from the wedge 420. When the retaining clip 450 is removed from the groove 439, the bolt 430 may be removed from the body member 410 and/or the wedge 420. For example, the lower head 434 may be driven (e.g., counter-clockwise) to remove the bolt 430 from the wedge 420. Although the groove 439 may define a width that is approximately equal to a diameter of the retaining clip 450 (e.g., as shown in FIG. 4A), it should be appreciated that the groove 439 may be substantially wider than the diameter of the retaining clip 450 such that the electrical connector is configured to receive distribution connectors of various gauge and/or thickness.

The wedge 420, the bolt 430, and/or the retaining clip 450 may be configured to be reused, for example, after being installed and removed from the electrical connector 400. For example, when the wedge 420, the bolt 430, and the retaining clip 450 are removed from the electrical connector 400, they may be reinstalled in the electrical connector 400 or another electrical connector.

FIGS. 5A-5F depict another example electrical connector 500 (e.g., such as the electrical connectors 100, 200, 300, 400). The electrical connector 500 may include a body member 510, a wedge 520, and a bolt 530. The bolt 530 may be a bolt assembly (e.g., such as a shear bolt assembly). The electrical connector 500 may be configured to electrically and mechanically connect a main conductor (e.g., such as a transmission conductor, not shown) to a tap conductor (e.g., such as a distribution conductor, not shown). The electrical connector 500 may include a conductor interface insert (not shown) configured to be located between the main conductor and the tap conductor (not shown) within the electrical connector 500.

The body member 510 may be substantially C-shaped. For example, the body member 510 may have a rear wall 512, a curved top portion 514 and a curved bottom portion 516. The curved top portion 514 may be configured to receive the distribution connector. For example, the curved top portion 514 of the electrical connector 500 may fit partially around the main conductor. The curved bottom portion 516 may be configured to receive the wedge 520. The rear wall 512 may be substantially flat, for example, between the curved top portion 514 and the curved bottom portion 516. The rear wall 512 may define a stop 518 that extends away from the rear wall 512.

The wedge 520 may be a wedge assembly. The wedge 520 may include a recess 522 along an elongated upper surface 524. The recess 522 may be configured to receive the distribution conductor and/or the transmission conductor. For example, the recess 522 may cooperate with a bottom surface of the tap conductor. The wedge 520 may be received within the curved bottom portion 516 of the body member 510. For example, the wedge 520 may define a first tab 528. The first tab 528 may extend (e.g., downwardly) from the wedge 520. The first tab 528 may define an aperture 529 passing therethrough. The aperture 529 may be threaded. The aperture 529 may be configured to receive the bolt 530 (e.g., a distal end of the bolt 530). The aperture 529 may define threads that are complementary to the threads of the bolt 530. The wedge 520 may be configured to be driven by the bolt 530. The curved bottom portion 516 may define a cavity 517. The cavity 517 may be configured to receive the first tab 528. For example, the cavity 517 may receive the first tab 528 as the wedge 520 is driven by the bolt 530.

The wedge 520 may define a second tab 526. The second tab 526 may extend (e.g., downwardly) from the wedge 520. The second tab 526 may define an aperture 527 passing therethrough. The aperture 527 may be threaded. The aperture 527 may be configured to receive the bolt 530. The aperture 527 may define threads that are complementary to the threads of the bolt 530.

The body member 510 may define a hole 515 configured to receive the bolt 530. The hole 515 may be defined through the curved bottom portion 516 of the body member 510. The hole 515 may be threaded. For example, the hole 515 may define threads that are complementary to the threads of the bolt 530.

The electrical connector 500 may be configured to secure (e.g., releasably secure) the bolt 530 therein. The electrical connector 500 may be configured to enable removal of the bolt 530 from the body member 510 and the wedge 520.

The bolt 530 may define an upper head 532, a lower head 534, a shear section 436, and a shank 538. The shank 538 may include a threaded portion 531 and a non-threaded portion 533. The bolt 530 may be received by the aperture 527 and the hole 515. For example, the shank 538 of the bolt 530 may be received by the aperture 527 and the hole 515. The bolt 530 may be configured to drive the wedge 520 into the electrical connector 500. The bolt 530 may be configured to be driven at the upper head 532. As torque is applied to the upper head 532, the bolt 530 may rotate as the threaded portion 531 engages complementary threads (e.g., in the aperture 527 and/or the hole 515). When the applied torque exceeds a threshold torque, the shear section 536 may shear such that the upper head 532 is mechanically decoupled from the shank 538 (e.g., the threaded portion 531) of the bolt 530. For example, when the shear section 536 shears, the upper head 532 may no longer drive the threaded portion 531 of the bolt 530. When the shear section 536 shears, the bolt 530 may captively secure the upper head 532 thereto. For example, the bolt 530 may be configured such that the upper head 532 remains coupled to the bolt 530 when the shear section 536 has sheared. A washer 540 may be received by the shank 538 such that when installed, the washer 540 is in contact with the wedge 520 and the lower head 534.

When the bolt 530 is rotated in a clockwise direction, the bolt 530 may be threaded into the hole 515 of the body member 510 and the lower head 534 may apply a force upon the second tab 526 such that the entire wedge 520 is moved within the body member 510. For example, the wedge 520 may be moved within the curved bottom portion 516 of the body member 510. When the wedge 520 is moved within the body member 510, the upper surface 524 of the wedge 520 may move (e.g., upwardly) toward the curved top portion 514. When the bolt 530 is rotated in a counter-clockwise direction, the wedge 520 may move away from the body member 510. When the wedge 520 is moved away from the body member 510, the upper surface 524 of the wedge 520 may move (e.g., downwardly) away from the curved top portion 514. The threaded portion 531 may be configured with a predetermined amount (e.g., length) of threads. The predetermined amount of threads may be configured such that the bolt 530 spins freely when the wedge 520 is extracted (e.g., fully extracted) from the body member 510.

The electrical connector 500 may be configured such that it is assembled without the conductor interface insert (not shown). The bolt 530 may be in a position such that the wedge 520 is substantially withdrawn from the body member 510. The electrical connector 500 may be suspended from a main conductor by resting the curved top portion 514 of the body member 510 around the main conductor. A tap conductor may be laid across the upper surface 524 of the wedge 520. The conductor interface insert may be positioned between the transmission and tap conductors, for example, outside of the body member 510. The conductor interface insert may be moved toward the interior of the body member 510, for example, using the conductors as a guide. The conductor interface insert may be moved until a leading surface of the conductor interface insert contacts the stop 518.

With the conductor interface insert in place, the bolt 530 may be rotated such that the wedge 520 is moved toward the interior of the body member 510. The bolt 530 may be rotated via the upper head 532. As the wedge 520 is moved into the interior of the body member 510, the recess 522 may be moved into contact with the tap conductor which in turn is forced against the conductor interface insert. The conductor interface insert may be forced into contact with the main conductor which in turn is forced into contact with the curved top portion 514 of the body member 510. The bolt 530 (e.g., the shear section 536) may be configured to shear at a threshold torque. For example, the threshold torque may be determined such that it corresponds to the wedge 520 being in its proper position and sufficient pressure being placed on the conductors so as to provide a proper connection. The bolt 530 may shear at the shear section 536. The shear section 536 may be located between the upper head 532 and the lower head 534.

The electrical connector 500 may be configured to retain the bolt 530. For example, the electrical connector 500 may include a retainer 550 (e.g., such as a retaining clip). The retainer 550 may be a part of the wedge 520 (e.g., wedge assembly). In the exemplary embodiment shown, the retainer 550 is a retaining clip such that the retainer 550 may also be referred to as the retaining clip 550. The retaining clip 550 may be an e-clip, a lock washer, and/or a similar clip. The bolt 530 may be configured to receive the retaining clip 550. The bolt 530 may be configured to receive a second washer 555, for example between the retaining clip 550 and the first tab 528. A rear surface 542 of the second tab 526 may define a cavity 544. The cavity 544 may be configured to receive (e.g., captively receive) the retaining clip 550. The retaining clip 550 may be pressed into engagement with the cavity 544, for example, when the bolt 530 is driven into the body member 510.

The retaining clip 550 may be configured to retain the bolt 530 within the wedge 520. When the bolt 530 is received by the wedge 520 and body member 510, the retaining clip 550 may be configured to retain the bolt 530 within the body member 510. For example, the retaining clip 550 may engage the cavity 544 when the wedge 520 is in its proper position and sufficient pressure is being placed on the conductors so as to provide a proper connection. When installed on the bolt 530, the retaining clip 550 may be configured to prevent removal of the bolt 530 from the body member 510 and/or the wedge 520. The retaining clip 550 may be configured to be removed such that the bolt 530 can be removed from the wedge 520. When the retaining clip 550 is removed from the bolt 530, the bolt 530 may be removed from the body member 510 and/or the wedge 520. For example, the lower head 534 may be driven (e.g., counter-clockwise) to remove the bolt 530 from the wedge 720.

The wedge 520, the bolt 530, and/or the retaining clip 550 may be configured to be reused, for example, after being installed and removed from the electrical connector 500. For example, when the wedge 520, the bolt 530, and the retaining clip 550 are removed from the electrical connector 500, they may be reinstalled in the electrical connector 500 or another electrical connector.

FIGS. 6A-6D depict another example electrical connector 600 (e.g., such as the electrical connectors 100, 200, 300, 400, 500). The electrical connector 600 may include a body member 610, a wedge 620, and a bolt 630. The bolt 630 may be a bolt assembly (e.g., such as a shear bolt assembly). The electrical connector 600 may be configured to electrically and mechanically connect a main conductor (e.g., such as a transmission conductor, not shown) to a tap conductor (e.g., such as a distribution conductor, not shown). The electrical connector 600 may include a conductor interface insert (not shown) configured to be located between the main conductor and the tap conductor within the electrical connector 600.

The body member 610 may be substantially C-shaped. For example, the body member 610 may have a rear wall 612, a curved top portion 614 and a curved bottom portion 616. The curved top portion 614 may be configured to receive the distribution connector. For example, the curved top portion 614 of the electrical connector 600 may fit partially around the main conductor. The curved bottom portion 616 may be configured to receive the wedge 620. The rear wall 612 may be substantially flat, for example, between the curved top portion 614 and the curved bottom portion 616. The rear wall 612 may define a stop 618 that extends away from the rear wall 612.

The wedge 620 may be a wedge assembly. The wedge 620 may include a recess 622 along an elongated upper surface 624. The recess 622 may be configured to receive the distribution conductor and/or the transmission conductor. For example, the recess 622 may cooperate with a bottom surface of the tap conductor. The wedge 620 may be received within the curved bottom portion 616 of the body member 610. For example, the wedge 620 may define a first tab 628. The first tab 628 may extend (e.g., downwardly) from the wedge 620. The first tab 628 may define an aperture 629 passing therethrough. The aperture 629 may be threaded. The aperture 629 may be configured to receive the bolt 630 (e.g., a distal end of the bolt 630). The aperture 629 may define threads that are complementary to the threads of the bolt 630. The wedge 620 may be configured to be driven by the bolt 630. The curved bottom portion 616 may define a cavity 617. The cavity 617 may be configured to receive the first tab 628. For example, the cavity 617 may receive the first tab 628 as the wedge 620 is driven by the bolt 630.

The wedge 620 may define a second tab 626. The second tab 626 may extend (e.g., downwardly) from the wedge 620. The second tab 626 may define an aperture 627 passing therethrough. The aperture 627 may be threaded. The aperture 627 may be configured to receive the bolt 630. The aperture 627 may define threads that are complementary to the threads of the bolt 530.

The body member 610 may define a hole 615 configured to receive the bolt 630. The hole 615 may be defined through the curved bottom portion 616 of the body member 610. For example, the hole 615 may extend from the front surface 619 defined by the bottom member 610. The hole 615 may be threaded. For example, the hole 615 may define threads that are complementary to the threads of the bolt 630.

The electrical connector 600 may be configured to secure (e.g., releasably secure) the bolt 630 therein. The electrical connector 600 may be configured to enable removal of the bolt 630 from the body member 610 and the wedge 620.

The bolt 630 may define an upper head 632, a lower head 634, a shear section 636, and a shank 638. The shank 638 may include a threaded portion 631 and a non-threaded portion 633. The bolt 630 may be received by the aperture 627 and the hole 615. For example, the shank 638 of the bolt 630 may be received by the aperture 627 and the hole 615. The bolt 630 may be configured to drive the wedge 620 into the electrical connector 600. The bolt 630 may be configured to be driven at the upper head 632. As torque is applied to the upper head 632, the bolt 630 may rotate as the threaded portion 631 engages complementary threads (e.g., in the aperture 627 and/or the hole 615). When the applied torque exceeds a threshold torque, the shear section 636 may shear such that the upper head 632 is mechanically decoupled from the shank 638 (e.g., the threaded portion 631) of the bolt 630. For example, when the shear section 636 shears, the upper head 632 may no longer drive the threaded portion 631 of the bolt 630. When the shear section 636 shears, the bolt 630 may captively secure the upper head 632 thereto. For example, the bolt 630 may be configured such that the upper head 632 remains coupled to the bolt 630 when the shear section 636 has sheared. A washer 640 may be received by the shank 638 such that when installed, the washer 640 is in contact with the wedge 620 and the lower head 634.

When the bolt 630 is rotated in a clockwise direction, the bolt 630 may be threaded into the hole 615 of the body member 610 and the lower head 634 may apply a force upon the second tab 626 such that the entire wedge 620 is moved within the body member 610. For example, the wedge 620 may be moved within the curved bottom portion 616 of the body member 610. When the wedge 620 is moved within the body member 610, the upper surface 624 of the wedge 620 may move (e.g., upwardly) toward the curved top portion 614. When the bolt 630 is rotated in a counter-clockwise direction, the wedge 620 may move away from the body member 610. When the wedge 620 is moved away from the body member 610, the upper surface 624 of the wedge 620 may move (e.g., downwardly) away from the curved top portion 614. The threaded portion 631 may be configured with a predetermined amount (e.g., length) of threads. The predetermined amount of threads may be configured such that the bolt 630 spins freely when the wedge 620 is extracted (e.g., fully extracted) from the body member 610.

The electrical connector 600 may be configured such that it is assembled without the conductor interface insert (not shown). The bolt 630 may be in a position such that the wedge 620 is substantially withdrawn from the body member 610. The electrical connector 600 may be suspended from a main conductor by resting the curved top portion 614 of the body member 610 around the main conductor. A tap conductor may be laid across the upper surface 624 of the wedge 620. The conductor interface insert may be positioned between the transmission and tap conductors, for example, outside of the body member 610. The conductor interface insert may be moved toward the interior of the body member 610, for example, using the conductors as a guide. The conductor interface insert may be moved until a leading surface of the conductor interface insert contacts the stop 618.

With the conductors and/or the conductor interface insert in place, the bolt 630 may be rotated such that the wedge 620 is moved toward the interior of the body member 610. The bolt 630 may be rotated via the upper head 632. As the wedge 620 is moved into the interior of the body member 610, the recess 622 may be moved into contact with the tap conductor which in turn is forced against the conductor interface insert. The conductor interface insert may be forced into contact with the main conductor which in turn is forced into contact with the curved top portion 614 of the body member 610. The bolt 630 (e.g., the shear section 636) may be configured to shear at a threshold torque. When the bolt 630 shears, the upper head 632 may be operatively decoupled from the shank 638 such that the bolt 630 can no longer be driven by the upper head 632. The bolt 630 may be configured to retain the upper head 632 when the shear section 636 has sheared. For example, the threshold torque may be determined such that it corresponds to the wedge 620 being in its proper position and sufficient pressure being placed on the conductors so as to provide a proper connection. The bolt 630 may shear at the shear section 636. The shear section 636 may be located between the upper head 632 and the lower head 634.

The electrical connector 600 may be configured to retain the bolt 630. For example, the electrical connector 600 may include a retainer 650 (e.g., such as a retaining nut). The retainer 650 may be a part of the wedge 620 (e.g., wedge assembly). In the exemplary embodiment shown, the retainer 650 is a retaining nut such that the retainer 650 may also be referred to as the retaining nut 650. The retaining nut 650 may be hexagonal, for example. The bolt 630 may be configured to receive the retaining nut 650. For example, an end portion 635 of the bolt 630 may define threads 637. The end portion 635 may be distal from the upper head 632. The threads 637 of the end portion 635 may correspond to the threads of the retaining nut 650. The cavity 617 may be configured to receive the retaining nut 650. The retaining nut 650 may be sized based on the cavity 617. For example, the retaining nut 650 may be prevented from rotating when received by the cavity 617.

The retaining nut 650 may be configured to retain the bolt 630 within the wedge 620. When the bolt 630 is received by the wedge 620 and body member 610, the retaining nut 650 may be configured to retain the bolt 630 within the body member 610. When installed on the bolt 630, the retaining nut 650 may be configured to prevent removal of the bolt 630 from the body member 610 and/or the wedge 620. The retaining nut 650 may be configured to be removed such that the bolt 630 can be removed from the wedge 620. When the retaining nut 650 is removed from the bolt 630, the bolt 630 may be removed from the body member 610 and/or the wedge 520.

The wedge 620, the bolt 630, and/or the retaining nut 650 may be configured to be reused, for example, after being installed and removed from the electrical connector 600. For example, when the wedge 620, the bolt 630, and the retaining nut 650 are removed from the electrical connector 600, they may be reinstalled in the electrical connector 600 or another electrical connector.

FIGS. 7A-7D depict another example electrical connector 700 (e.g., such as the electrical connectors 100, 200, 300, 400, 500, 600). The electrical connector 700 may include a body member 710, a wedge 720, and a bolt 730. The bolt 730 may be a bolt assembly (e.g., such as a shear bolt assembly). The electrical connector 700 may be configured to electrically and mechanically connect a main conductor (e.g., such as a transmission conductor, not shown) to a tap conductor (e.g., such as a distribution conductor, not shown). The electrical connector 700 may include a conductor interface insert (not shown) configured to be located between the main conductor and the tap conductor within the electrical connector 700.

The body member 710 may be substantially C-shaped. For example, the body member 710 may have a rear wall 712, a curved top portion 714 and a curved bottom portion 716. The curved top portion 714 may be configured to receive the distribution connector. For example, the curved top portion 714 of the electrical connector 700 may fit partially around the main conductor. The curved bottom portion 716 may be configured to receive the wedge 720. The rear wall 712 may be substantially flat, for example, between the curved top portion 714 and the curved bottom portion 716. The rear wall 712 may define a stop 718 that extends away from the rear wall 712.

The wedge 720 may be a wedge assembly. The wedge 720 may be a solid extruded component (e.g., made from aluminum). The wedge 720 may include a recess 722 along an elongated upper surface 724. The recess 722 may be configured to receive the distribution conductor and/or the transmission conductor. For example, the recess 722 may cooperate with a bottom surface of the tap conductor. The wedge 720 may be received within the curved bottom portion 716 of the body member 710. For example, the wedge 720 may define a first tab 728. The first tab 728 may extend (e.g., downwardly) from the wedge 720. The first tab 728 may define an aperture 729 passing therethrough. The aperture 729 may be threaded. The aperture 729 may be configured to receive the bolt 730 (e.g., a distal end of the bolt 730). The aperture 729 may define threads that are complementary to the threads of the bolt 730. The wedge 720 may be configured to be driven by the bolt 730. The curved bottom portion 716 may define a cavity 717. The cavity 717 may be configured to receive the first tab 728. For example, the cavity 717 may receive the first tab 728 as the wedge 720 is driven by the bolt 730.

The wedge 720 may define a second tab 726. The second tab 726 may extend (e.g., downwardly) from the wedge 720. The second tab 726 may define an aperture 727 passing therethrough. The aperture 727 may be threaded. The aperture 727 may be configured to receive the bolt 730. The aperture 727 may define threads that are complementary to the threads of the bolt 730. The recess 722 may slope (e.g., downward) from the second tab 726 toward the first tab 728.

The body member 710 may define a hole 715 configured to receive the bolt 730. The hole 715 may be defined through the curved bottom portion 716 of the body member 710. The hole 715 may be threaded. For example, the hole 715 may define threads that are complementary to the threads of the bolt 730.

The electrical connector 700 may be configured to secure (e.g., releasably secure) the bolt 730 therein. The electrical connector 700 may be configured to enable removal of the bolt 730 from the body member 710 and the wedge 720.

The bolt 730 may define an upper head 732, a lower head 734, a shear section 736, and a shank 738. The shank 738 may include a threaded portion 731 and a non-threaded portion 733. The bolt 730 may be received by the aperture 727 and the hole 715. For example, the shank 738 of the bolt 730 may be received by the aperture 727 and the hole 715. The bolt 730 may be configured to drive the wedge 720 into the electrical connector 700. The bolt 730 may be configured to be driven at the upper head 732. As torque is applied to the upper head 732, the bolt 730 may rotate as the threaded portion 731 engages complementary threads (e.g., in the aperture 727 and/or the hole 715). When the applied torque exceeds a threshold torque, the shear section 736 may shear such that the upper head 732 is mechanically decoupled from the shank 738 (e.g., the threaded portion 731) of the bolt 730. For example, when the shear section 736 shears, the upper head 732 may no longer drive the threaded portion 731 of the bolt 730. When the shear section 736 shears, the bolt 730 may captively secure the upper head 732 thereto. For example, the bolt 730 may be configured such that the upper head 732 remains coupled to the bolt 730 when the shear section 736 has sheared. A washer 740 may be received by the shank 738 such that when installed, the washer 740 is in contact with the wedge 720 and the lower head 734.

When the bolt 730 is rotated in a clockwise direction, the bolt 730 may be threaded into the hole 715 of the body member 710 and the lower head 734 may apply a force upon the second tab 726 such that the entire wedge 720 is moved within the body member 710. For example, the wedge 720 may be moved within the curved bottom portion 716 of the body member 710. When the wedge 720 is moved within the body member 710, the upper surface 724 of the wedge 720 may move (e.g., upwardly) toward the curved top portion 714. When the bolt 730 is rotated in a counter-clockwise direction, the wedge 720 may move away from the body member 710. When the wedge 720 is moved away from the body member 710, the upper surface 724 of the wedge 720 may move (e.g., downwardly) away from the curved top portion 714. The threaded portion 731 may be configured with a predetermined amount (e.g., length) of threads. The predetermined amount of threads may be configured such that the bolt 730 spins freely when the wedge 720 is extracted (e.g., fully extracted) from the body member 710.

The electrical connector 700 may be configured such that it is assembled without the conductor interface insert (not shown). The bolt 730 may be in a position such that the wedge 720 is substantially withdrawn from the body member 710. The electrical connector 700 may be suspended from a main conductor by resting the curved top portion 714 of the body member 710 around the main conductor. A tap conductor may be laid across the upper surface 724 of the wedge 720. The conductor interface insert may be positioned between the transmission and tap conductors, for example, outside of the body member 710. The conductor interface insert may be moved toward the interior of the body member 710, for example, using the conductors as a guide. The conductor interface insert may be moved until a leading surface of the conductor interface insert contacts the stop 718.

With the conductor interface insert in place, the bolt 730 may be rotated such that the wedge 720 is moved toward the interior of the body member 710. The bolt 730 may be rotated via the upper head 732. As the wedge 720 is moved into the interior of the body member 710, the recess 722 may be moved into contact with the tap conductor which in turn is forced against the conductor interface insert. The conductor interface insert may be forced into contact with the main conductor which in turn is forced into contact with the curved top portion 714 of the body member 710. The bolt 730 (e.g., the shear section 736) may be configured to shear at a threshold torque. For example, the threshold torque may be determined such that it corresponds to the wedge 720 being in its proper position and sufficient pressure being placed on the conductors so as to provide a proper connection. The bolt 730 may shear at the shear section 736. The shear section 736 may be located between the upper head 732 and the lower head 734.

The electrical connector 700 may be configured to retain the bolt 730. For example, the electrical connector 700 may include a retainer 750 (e.g., such as a retaining clip). The retainer 750 may be a part of the wedge 720 (e.g., wedge assembly). In the exemplary embodiment shown, the retainer 750 is a retaining clip such that the retainer 750 may also be referred to as the retaining clip 750. The retaining clip 750 may be an e-clip, a lock washer, and/or a similar clip. The retaining clip 750 may be configured to provide a predetermined maximum pullout strength. The bolt 730 may be configured to receive the retaining clip 750. A rear surface 742 of the second tab 726 may be configured to receive the retaining clip 750. The retaining clip 750 may be pressed into engagement with the rear surface 742, for example, when the bolt 730 is driven into the body member 710. For example, the threads of the bolt 730 may pull the retaining clip 750 into engagement with the rear surface 742 as the bolt 730 is rotated (e.g., clockwise).

The retaining clip 750 may be configured to retain the bolt 730 within the wedge 720. When the bolt 730 is received by the wedge 720 and body member 710, the retaining clip 750 may be configured to retain the bolt 730 within the body member 710. For example, the retaining clip 750 may engage the second tab 726 when the wedge 720 is in its proper position and sufficient pressure is being placed on the conductors so as to provide a proper connection. When installed on the bolt 730, the retaining clip 750 may be configured to prevent removal of the bolt 730 from the body member 710 and/or the wedge 720. The retaining clip 750 may be configured to be removed such that the bolt 730 can be removed from the wedge 720. For example, the lower head 734 may be driven (e.g., counter-clockwise) to remove the bolt 730 from the wedge 720. When the retaining clip 750 is removed from the bolt 730, the bolt 730 may be removed from the body member 710 and/or the wedge 720.

The wedge 720, the bolt 730, and/or the retaining clip 750 may be configured to be reused, for example, after being installed and removed from the electrical connector 700. For example, when the wedge 720, the bolt 730, and the retaining clip 750 are removed from the electrical connector 700, they may be reinstalled in the electrical connector 700 or another electrical connector.

FIGS. 8A-8D depict another example electrical connector 800 (e.g., such as the electrical connectors 100, 200, 300, 400, 500, 600, 700). The electrical connector 800 may include a body member 810, a wedge 820, and a bolt 830. The bolt 830 may be a bolt assembly (e.g., such as a shear bolt assembly). The electrical connector 800 may be configured to electrically and mechanically connect a main conductor (e.g., such as a transmission conductor, not shown) to a tap conductor (e.g., such as a distribution conductor, not shown). The electrical connector 800 may include a conductor interface insert (not shown) configured to be located between the main conductor and the tap conductor within the electrical connector 800.

The body member 810 may be substantially C-shaped. For example, the body member 810 may have a rear wall 812, a curved top portion 814 and a curved bottom portion 816. The curved top portion 814 may be configured to receive the distribution connector. For example, the curved top portion 814 of the electrical connector 800 may fit partially around the main conductor. The curved bottom portion 816 may be configured to receive the wedge 820. The rear wall 812 may be substantially flat, for example, between the curved top portion 814 and the curved bottom portion 816. The rear wall 812 may define a stop 818 that extends away from the rear wall 812.

The wedge 820 may be a wedge assembly. The wedge 820 may include a recess 822 along an elongated upper surface 824. The recess 822 may be configured to receive the distribution conductor and/or the transmission conductor. For example, the recess 822 may cooperate with a bottom surface of the tap conductor. The wedge 820 may be received within the curved bottom portion 816 of the body member 810. For example, the wedge 820 may define a first tab 828. The first tab 828 may extend (e.g., downwardly) from the wedge 820. The first tab 828 may define an aperture 829 passing therethrough. The aperture 829 may be threaded. The aperture 829 may be configured to receive the bolt 830 (e.g., a distal end of the bolt 830). The aperture 829 may define threads that are complementary to the threads of the bolt 830. The wedge 820 may be configured to be driven by the bolt 830. The curved bottom portion 816 may define a cavity 817. The cavity 817 may be configured to receive the first tab 828. For example, the cavity 817 may receive the first tab 828 as the wedge 820 is driven by the bolt 830.

The wedge 820 may define a second tab 826. The second tab 826 may extend (e.g., downwardly) from the wedge 820. The second tab 826 may define an aperture 827 passing therethrough. The aperture 827 may be threaded. The aperture 827 may be configured to receive the bolt 830. The aperture 827 may define threads that are complementary to the threads of the bolt 830. The recess 822 may slope (e.g., downward) from the second tab 826 toward the first tab 828. The wedge 820 may define a notch 844. The notch 844 may be proximate to the second tab 826. For example, the notch 844 may begin at a rear surface 842 of the second tab 826.

The body member 810 may define a hole 815 configured to receive the bolt 830. The hole 815 may be defined through the curved bottom portion 816 of the body member 810. The hole 815 may be threaded. For example, the hole 815 may define threads that are complementary to the threads of the bolt 830.

The electrical connector 800 may be configured to secure (e.g., releasably secure) the bolt 830 therein. The electrical connector 800 may be configured to enable removal of the bolt 830 from the body member 810 and the wedge 820.

The bolt 830 may define an upper head 832, a lower head 834, a shear section 836, and a shank 838. The shank 838 may define a threaded portion 831 and a non-threaded portion 833. The non-threaded portion 833 may be a shoulder of the bolt 830. The bolt 830 may be received by the aperture 827 and the hole 815. For example, the shank 838 of the bolt 830 may be received by the aperture 827 and the hole 815. The bolt 830 may be configured to drive the wedge 820 into the electrical connector 800. The bolt 830 may be configured to be driven at the upper head 832. As torque is applied to the upper head 832, the bolt 830 may rotate as the threaded portion 831 engages complementary threads. When the applied torque exceeds a threshold torque, the shear section 836 may shear such that the upper head 832 is mechanically decoupled from the shank 838 (e.g., the threaded portion 831) of the bolt 830. For example, when the shear section 836 shears, the upper head 832 may no longer drive the threaded portion 831 of the bolt 830. When the shear section 836 shears, the bolt 830 may captively secure the upper head 832 thereto. For example, the bolt 830 may be configured such that the upper head 832 remains coupled to the bolt 830 when the shear section 836 has sheared. A washer (not shown) may be received by the shank 838 such that when installed, the washer is in contact with the wedge 820 and the lower head 834.

When the bolt 830 is rotated in a clockwise direction, the bolt 830 may be threaded into the hole 815 of the body member 810 and the lower head 834 may apply a force upon the second tab 826 such that the entire wedge 820 is moved within the body member 810. For example, the wedge 820 may be moved within the curved bottom portion 816 of the body member 810. When the wedge 820 is moved within the body member 810, the upper surface 824 of the wedge 820 may move (e.g., upwardly) toward the curved top portion 814. When the bolt 830 is rotated in a counter-clockwise direction, the wedge 820 may move away from the body member 810. When the wedge 820 is moved away from the body member 810, the upper surface 824 of the wedge 820 may move (e.g., downwardly) away from the curved top portion 814. The threaded portion 831 may be configured with a predetermined amount (e.g., length) of threads. The predetermined amount of threads may be configured such that the bolt 830 spins freely when the wedge 820 is extracted (e.g., fully extracted) from the body member 810.

The electrical connector 800 may be configured such that it is assembled without the conductor interface insert (not shown). The bolt 830 may be in a position such that the wedge 820 is substantially withdrawn from the body member 810. The electrical connector 800 may be suspended from a main conductor by resting the curved top portion 814 of the body member 810 around the main conductor. A tap conductor may be laid across the upper surface 824 of the wedge 820. The conductor interface insert may be positioned between the transmission and tap conductors, for example, outside of the body member 810. The conductor interface insert may be moved toward the interior of the body member 810, for example, using the conductors as a guide. The conductor interface insert may be moved until a leading surface of the conductor interface insert contacts the stop 818.

With the conductor interface insert in place, the bolt 830 may be rotated such that the wedge 820 is moved toward the interior of the body member 810. The bolt 830 may be rotated via the upper head 832. As the wedge 820 is moved into the interior of the body member 810, the recess 822 may be moved into contact with the tap conductor which in turn is forced against the conductor interface insert. The conductor interface insert may be forced into contact with the main conductor which in turn is forced into contact with the curved top portion 814 of the body member 810. The bolt 830 (e.g., the shear section 836) may be configured to shear at a threshold torque. For example, the threshold torque may be determined such that it corresponds to the wedge 820 being in its proper position and sufficient pressure being placed on the conductors so as to provide a proper connection. The bolt 830 may shear at the shear section 836. The shear section 836 may be located between the upper head 832 and the lower head 834.

Figure 8A:
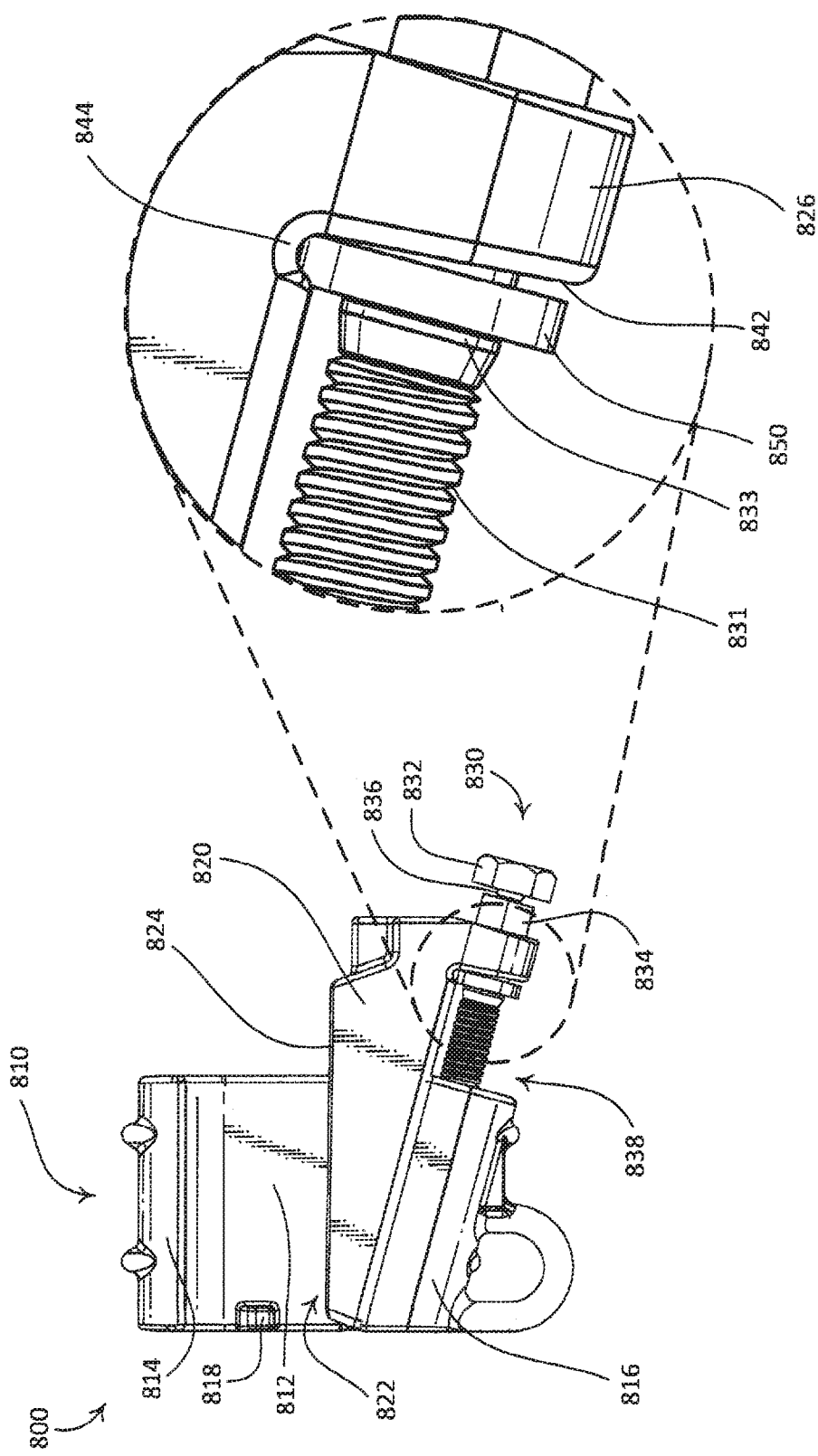
FIG. 8A is a side detail view of another example wedge assembly installed within an electrical connector.
Figure 8C:
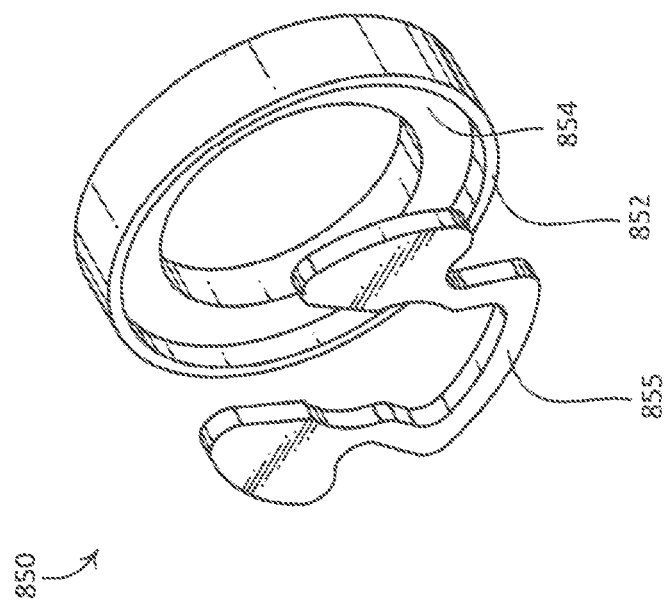
FIG. 8C is an exploded view of the example retainer used in the electrical connector shown in FIG. 8A.
Figure 8B:
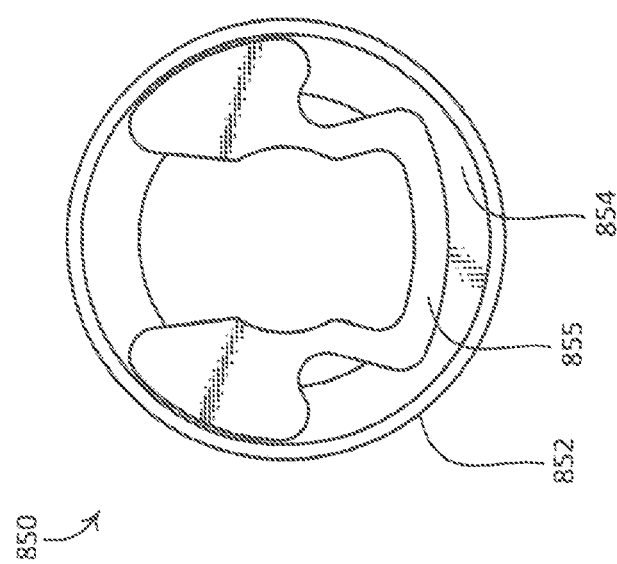
FIG. 8B is a front view of an example retainer used in the electrical connector shown in FIG. 8A.
Figure 8D:
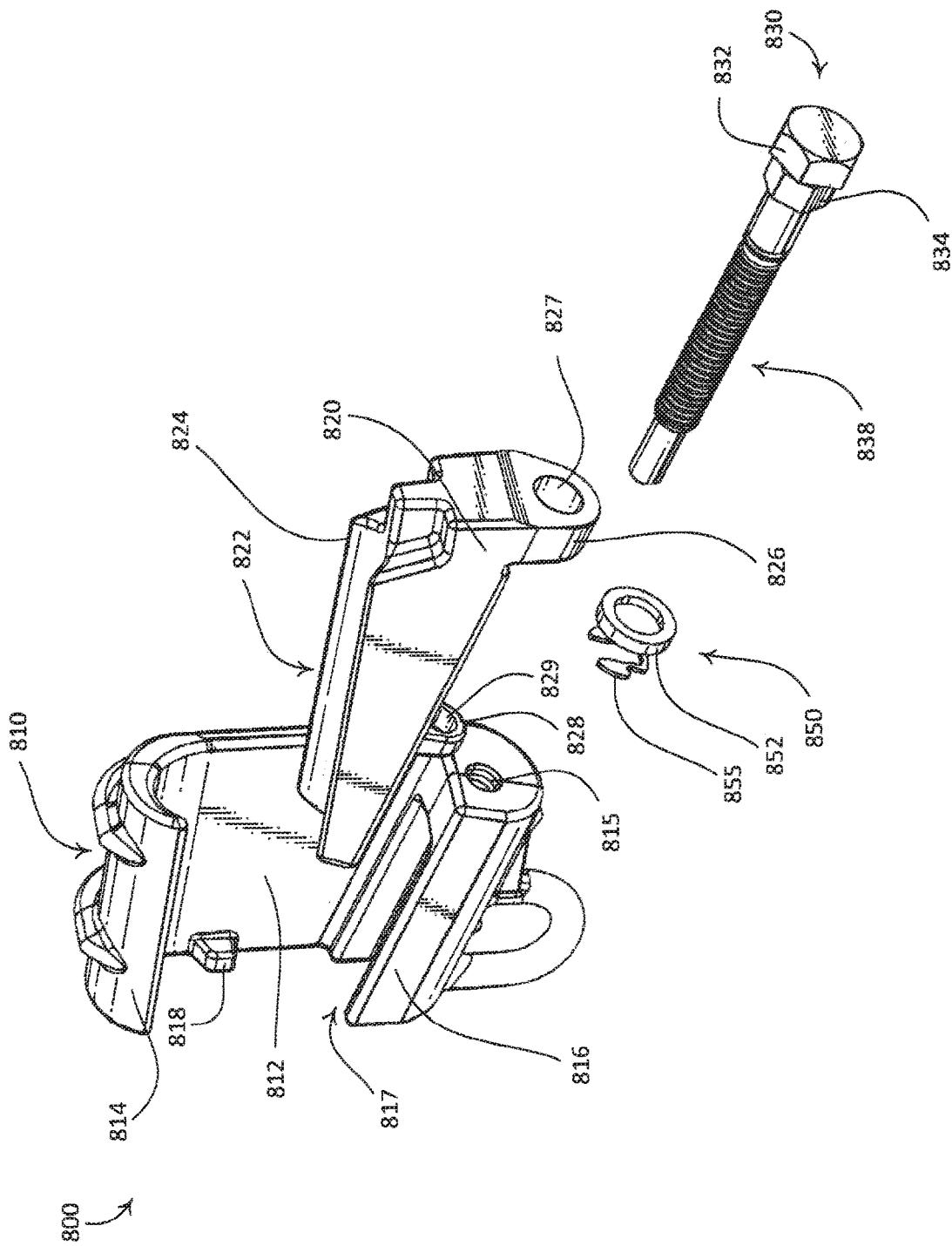
FIG. 8D is an exploded view of the electrical connector shown in FIG. 8A.

The electrical connector 800 may be configured to retain the bolt 830. For example, the electrical connector 800 may include a retainer 850 (e.g., such as a retainer assembly). The retainer 850 may be a part of the wedge 820 (e.g., wedge assembly). In the exemplary embodiment shown, the retainer 850 is a retainer assembly such that the retainer 850 may also be referred to as the retainer assembly 850. The retainer assembly 850 may include a washer 852 and a retaining clip 855. The washer 852 may define a counter bore 854. The counter bore 854 may be configured to receive the retaining clip 855. For example, the retaining clip 855 may be counter sunk within the washer 852. The retaining clip 855 may be an e-clip, a lock washer, and/or a similar clip. The retainer assembly 850 may be configured to provide a predetermined maximum pullout strength. The bolt 830 may be configured to receive the retainer assembly 850. The notch 844 may be configured to receive (e.g., captively engage) the retainer assembly 850. The retainer assembly 850 may be pressed into engagement with the rear surface 842, for example, when the bolt 830 is driven into the body member 810. For example, the threads of the bolt 830 may pull the retainer assembly 850 into engagement with the rear surface 842 as the bolt 830 is rotated (e.g., clockwise). Although the retaining clip 855 may be removed from the washer 852 as shown in FIG. 8C, it should be appreciated that the retaining clip 855 and the washer 852 may alternatively be assembled as a single component.

The retainer assembly 850 may be configured to retain the bolt 830 within the wedge 820. When the bolt 830 is received by the wedge 820 and body member 810, the retainer assembly 850 may be configured to retain the bolt 830 within the body member 810. For example, the retainer assembly 850 may engage the notch 844 and/or the rear surface 842 when the wedge 820 is in its proper position and sufficient pressure is being placed on the conductors so as to provide a proper connection. When installed on the bolt 830, the retainer assembly 850 may be configured to prevent removal of the bolt 830 from the body member 810 and/or the wedge 820. The retainer assembly 850 may be configured to be removed such that the bolt 830 can be removed from the wedge 820. When the retainer assembly 850 is removed from the bolt 830, the bolt 830 may be removed from the body member 810 and/or the wedge 820. For example, the lower head 834 may be driven (e.g., counter-clockwise) to remove the bolt 830 from the wedge 820.

The wedge 820, the bolt 830, and/or the retainer assembly 850 may be configured to be reused, for example, after being installed and removed from the electrical connector 800. For example, when the wedge 820, the bolt 830, and the retainer assembly 850 are removed from the electrical connector 800, they may be reinstalled in the electrical connector 800 or another electrical connector.

Figure 9A:
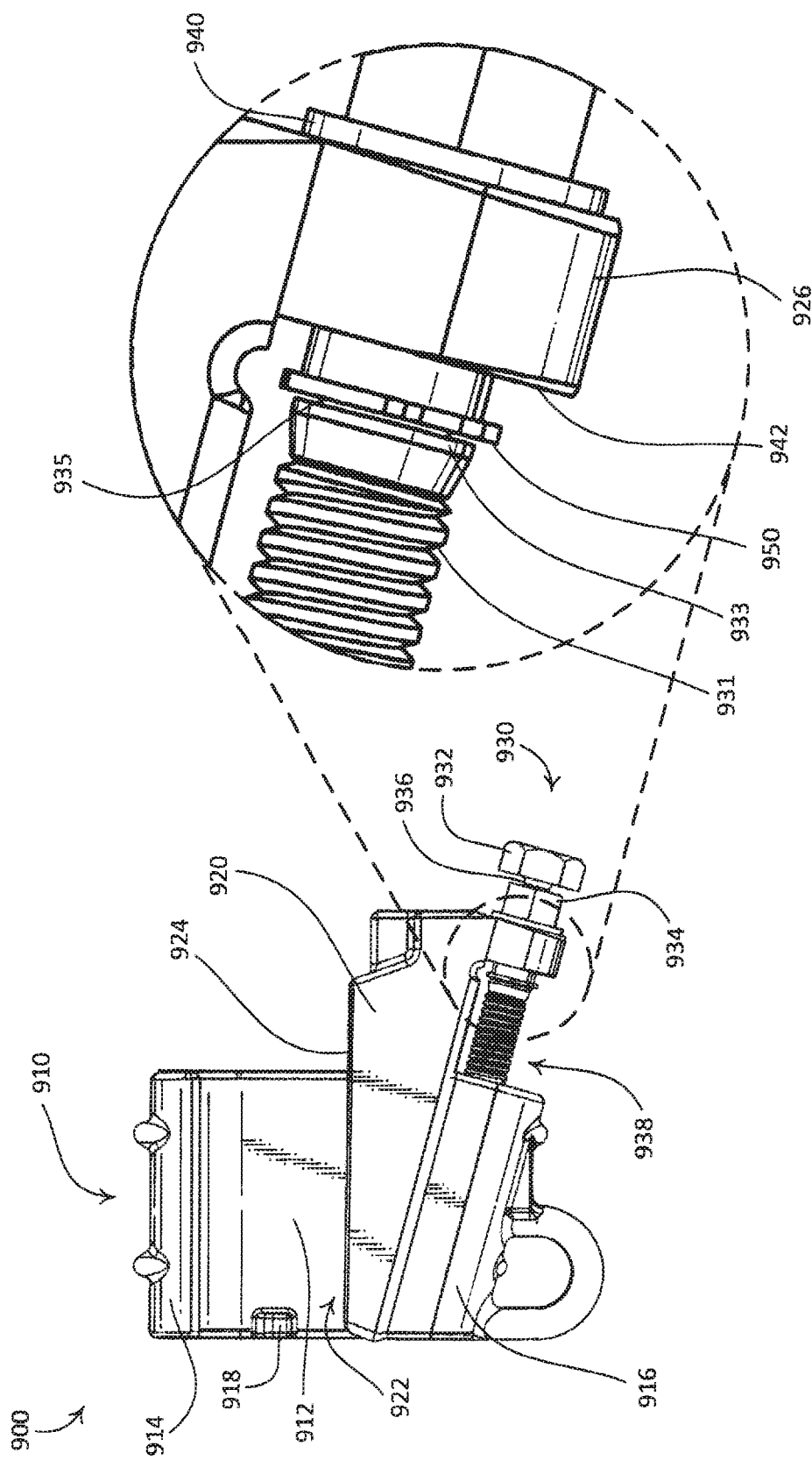
FIG. 9A is a side detail view of another example wedge assembly installed within an electrical connector.
Figure 9B:
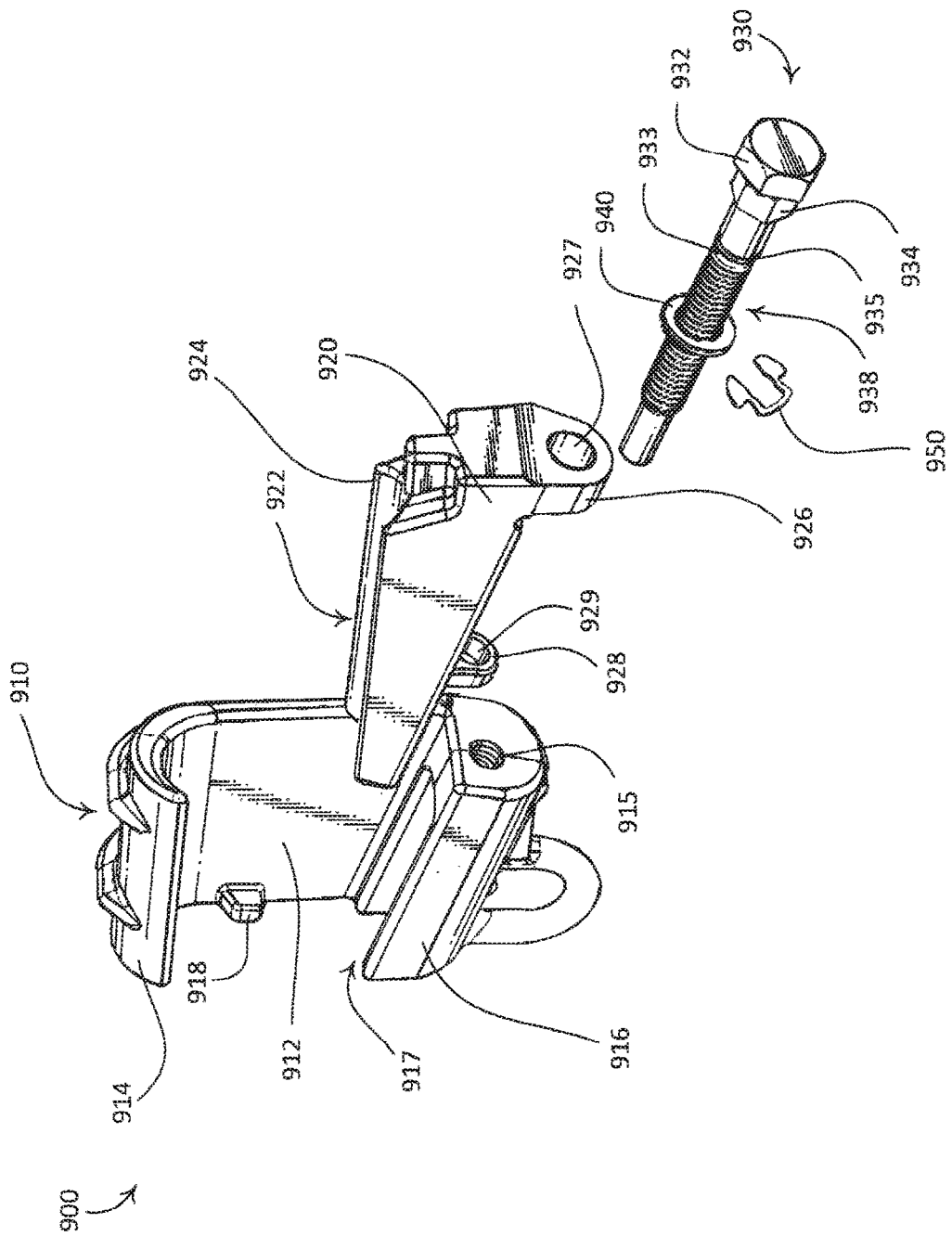
FIG. 9B is an exploded view of the electrical connector shown in FIG. 9A.

FIGS. 9A and 9B depict another example electrical connector 900 (e.g., such as the electrical connectors 100, 200, 300, 400, 500, 600, 700, 800). The electrical connector 900 may include a body member 910, a wedge 920, and a bolt 930. The bolt 930 may be a bolt assembly (e.g., such as a shear bolt assembly). The electrical connector 900 may be configured to electrically and mechanically connect a main conductor (e.g., such as a transmission conductor, not shown) to a tap conductor (e.g., such as a distribution conductor, not shown). The electrical connector 900 may include a conductor interface insert (not shown) configured to be located between the main conductor and the tap conductor within the electrical connector 900.

The body member 910 may be substantially C-shaped. For example, the body member 910 may have a rear wall 912, a curved top portion 914 and a curved bottom portion 916. The curved top portion 914 may be configured to receive the distribution connector. For example, the curved top portion 914 of the electrical connector 900 may fit partially around the main conductor. The curved bottom portion 916 may be configured to receive the wedge 920. The rear wall 912 may be substantially flat, for example, between the curved top portion 914 and the curved bottom portion 916. The rear wall 912 may define a stop 918 that extends away from the rear wall 912.

The wedge 920 may be a wedge assembly. The wedge 920 may include a recess 922 along an elongated upper surface 924. The recess 922 may be configured to receive the distribution conductor and/or the transmission conductor. For example, the recess 922 may cooperate with a bottom surface of the tap conductor. The wedge 920 may be received within the curved bottom portion 916 of the body member 910. For example, the wedge 920 may define a first tab 928. The first tab 928 may extend (e.g., downwardly) from the wedge 920. The first tab 928 may define an aperture 929 passing therethrough. The aperture 929 may be threaded. The aperture 929 may be configured to receive the bolt 930 (e.g., a distal end of the bolt 930). The aperture 929 may define threads that are complementary to the threads of the bolt 930. The wedge 920 may be configured to be driven by the bolt 930. The curved bottom portion 916 may define a cavity 917. The cavity 917 may be configured to receive the first tab 928. For example, the cavity 917 may receive the first tab 928 as the wedge 920 is driven by the bolt 930.

The wedge 920 may define a second tab 926. The second tab 926 may extend (e.g., downwardly) from the wedge 920. The second tab 926 may define an aperture 927 passing therethrough. The aperture 927 may be threaded. The aperture 927 may be configured to receive the bolt 930. The aperture 927 may define threads that are complementary to the threads of the bolt 930. The recess 922 may slope (e.g., downward) from the second tab 926 toward the first tab 928. The wedge 920 may define a cavity (not shown), for example, on a rear surface 942.

The body member 910 may define a hole 915 configured to receive the bolt 930. The hole 915 may be defined through the curved bottom portion 916 of the body member 910. The hole 915 may be threaded. For example, the hole 915 may define threads that are complementary to the threads of the bolt 930.

The electrical connector 900 may be configured to secure (e.g., releasably secure) the bolt 930 therein. The electrical connector 900 may be configured to enable removal of the bolt 930 from the body member 910 and the wedge 920.

The bolt 930 may define an upper head 932, a lower head 934, a shear section 936, and a shank 938. The shank 938 may define a threaded portion 931 and a non-threaded portion 933. The non-threaded portion 933 may be a shoulder of the bolt 930. The bolt 930 may be received by the aperture 927 and the hole 915. For example, the shank 938 of the bolt 930 may be received by the aperture 927 and the hole 915. The bolt 930 may be configured to drive the wedge 920 into the electrical connector 900. The bolt 930 may be configured to be driven at the upper head 932. As torque is applied to the upper head 932, the bolt 930 may rotate as the threaded portion 931 engages complementary threads. When the applied torque exceeds a threshold torque, the shear section 936 may shear such that the upper head 932 is mechanically decoupled from the shank 938 (e.g., the threaded portion 931) of the bolt 930. For example, when the shear section 936 shears, the upper head 932 may no longer drive the threaded portion 931 of the bolt 930. When the shear section 936 shears, the bolt 930 may captively secure the upper head 932 thereto. For example, the bolt 930 may be configured such that the upper head 932 remains coupled to the bolt 930 when the shear section 936 has sheared.

The electrical connector 900 may include a washer 940. The washer 940 may be received by the shank 938 such that when installed, the washer 940 is in contact with the wedge 920 and the lower head 934. For example, the washer 940 may be configured to be installed between the wedge 920 and the lower head 934.

When the bolt 930 is rotated in a clockwise direction, the bolt 930 may be threaded into the hole 915 of the body member 910 and the lower head 934 may apply a force upon the second tab 926 such that the entire wedge 920 is moved within the body member 910. For example, the wedge 920 may be moved within the curved bottom portion 916 of the body member 910. When the wedge 920 is moved within the body member 910, the upper surface 924 of the wedge 920 may move (e.g., upwardly) toward the curved top portion 914. When the bolt 930 is rotated in a counter-clockwise direction, the wedge 920 may move away from the body member 910. When the wedge 920 is moved away from the body member 910, the upper surface 924 of the wedge 920 may move (e.g., downwardly) away from the curved top portion 914. The threaded portion 931 may be configured with a predetermined amount (e.g., length) of threads. The predetermined amount of threads may be configured such that the bolt 930 spins freely when the wedge 920 is extracted (e.g., fully extracted) from the body member 910.

The electrical connector 900 may be configured such that it is assembled without the conductor interface insert (not shown). The bolt 930 may be in a position such that the wedge 920 is substantially withdrawn from the body member 910. The electrical connector 900 may be suspended from a main conductor by resting the curved top portion 914 of the body member 910 around the main conductor. A tap conductor may be laid across the upper surface 924 of the wedge 920. The conductor interface insert may be positioned between the transmission and tap conductors, for example, outside of the body member 910. The conductor interface insert may be moved toward the interior of the body member 910, for example, using the conductors as a guide. The conductor interface insert may be moved until a leading surface of the conductor interface insert contacts the stop 918.

With the conductor interface insert in place, the bolt 930 may be rotated such that the wedge 920 is moved toward the interior of the body member 910. The bolt 930 may be rotated via the upper head 932. As the wedge 920 is moved into the interior of the body member 910, the recess 922 may be moved into contact with the tap conductor which in turn is forced against the conductor interface insert. The conductor interface insert may be forced into contact with the main conductor which in turn is forced into contact with the curved top portion 914 of the body member 910. The bolt 930 (e.g., the shear section 936) may be configured to shear at a threshold torque. For example, the threshold torque may be determined such that it corresponds to the wedge 920 being in its proper position and sufficient pressure being placed on the conductors so as to provide a proper connection. The bolt 930 may shear at the shear section 936. The shear section 936 may be located between the upper head 932 and the lower head 934.

The electrical connector 900 may be configured to retain the bolt 930. For example, the electrical connector 900 may include a retainer 950 (e.g., such as a retaining clip). The retainer 950 may be a part of the wedge 920 (e.g., wedge assembly). In the exemplary embodiment shown, the retainer 950 is a retaining clip such that the retainer 950 may also be referred to as the retaining clip 950. The retaining clip 950 may be a retaining ring, an e-clip, a lock washer, and/or a similar clip. The retaining clip 950 may be configured to provide a predetermined maximum pullout strength. The bolt 930 may be configured to receive the retaining clip 950. For example, the non-threaded portion 933 of the shank 938 may define a groove 935. The groove 935 may be configured to receive (e.g., captively receive) the retaining clip 950. The cavity may be configured to receive (e.g., captively engage) the retaining clip 950. The retaining clip 950 may be pressed into engagement with the rear surface 942, for example, when the bolt 930 is driven into the body member 910. For example, the threads of the bolt 930 may pull the retaining clip 950 into engagement with the cavity as the bolt 930 is rotated (e.g., clockwise).

The retaining clip 950 may be configured to retain the bolt 930 within the wedge 920. When the bolt 930 is received by the wedge 920 and body member 910, the retaining clip 950 may be configured to retain the bolt 930 within the body member 910. For example, the retaining clip 950 may engage the cavity and/or the rear surface 942 when the wedge 920 is in its proper position and sufficient pressure is being placed on the conductors so as to provide a proper connection. When installed on the bolt 930, the retaining clip 950 may be configured to prevent removal of the bolt 930 from the body member 910 and/or the wedge 920. The retaining clip 950 may be configured to be removed such that the bolt 930 can be removed from the wedge 920. When the retaining clip 950 is removed from the bolt 930, the bolt 930 may be removed from the body member 910 and/or the wedge 920. For example, the lower head 934 may be driven (e.g., counter-clockwise) to remove the bolt 930 from the wedge 920.

The wedge 920, the bolt 930, and/or the retaining clip 950 may be configured to be reused, for example, after being installed and removed from the electrical connector 900. For example, when the wedge 920, the bolt 930, and the retaining clip 950 are removed from the electrical connector 900, they may be reinstalled in the electrical connector 900 or another electrical connector.

Figure 10A:
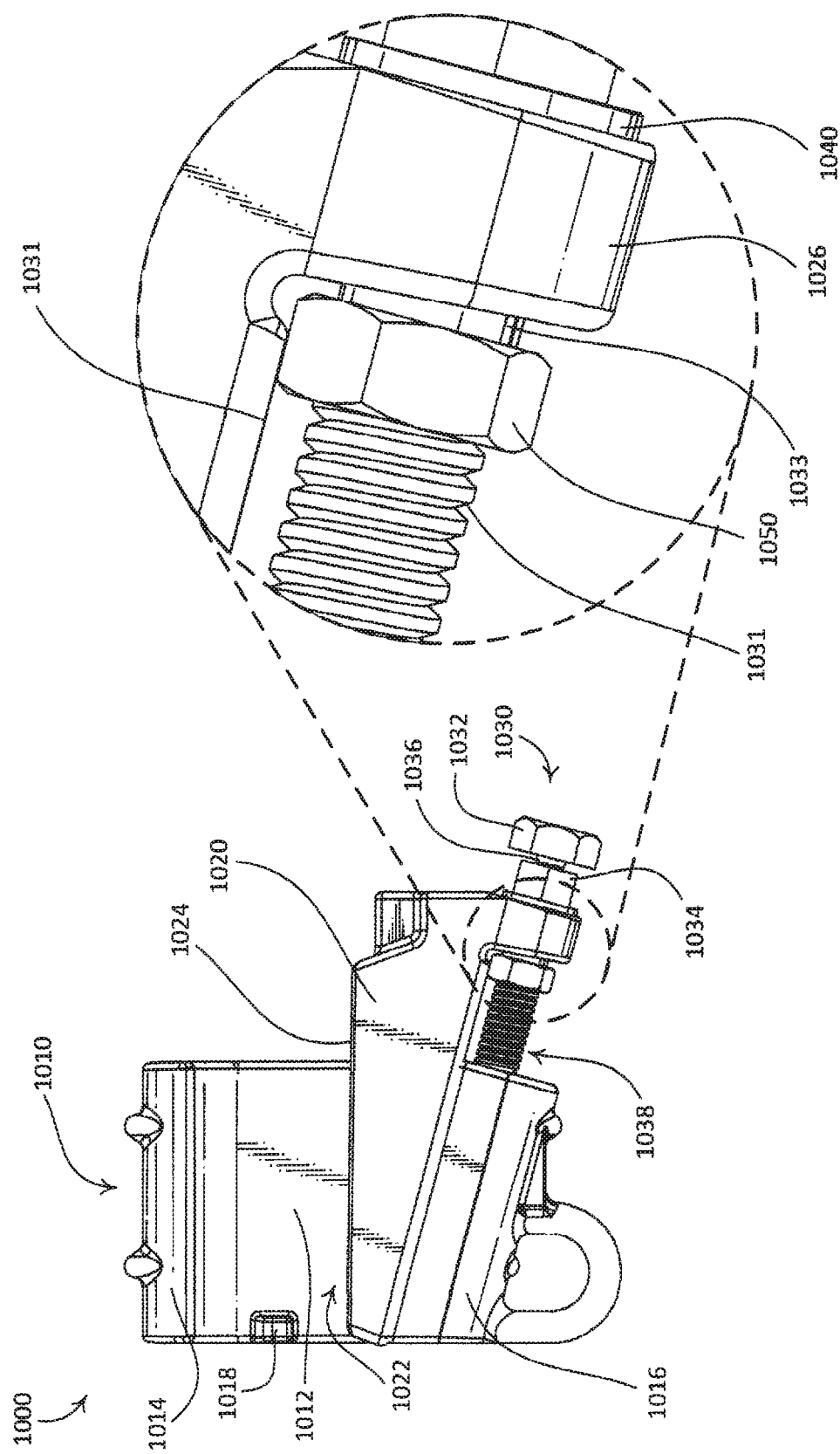
FIG. 10A is a side detail view of another example wedge assembly installed within an electrical connector.
Figure 10B:
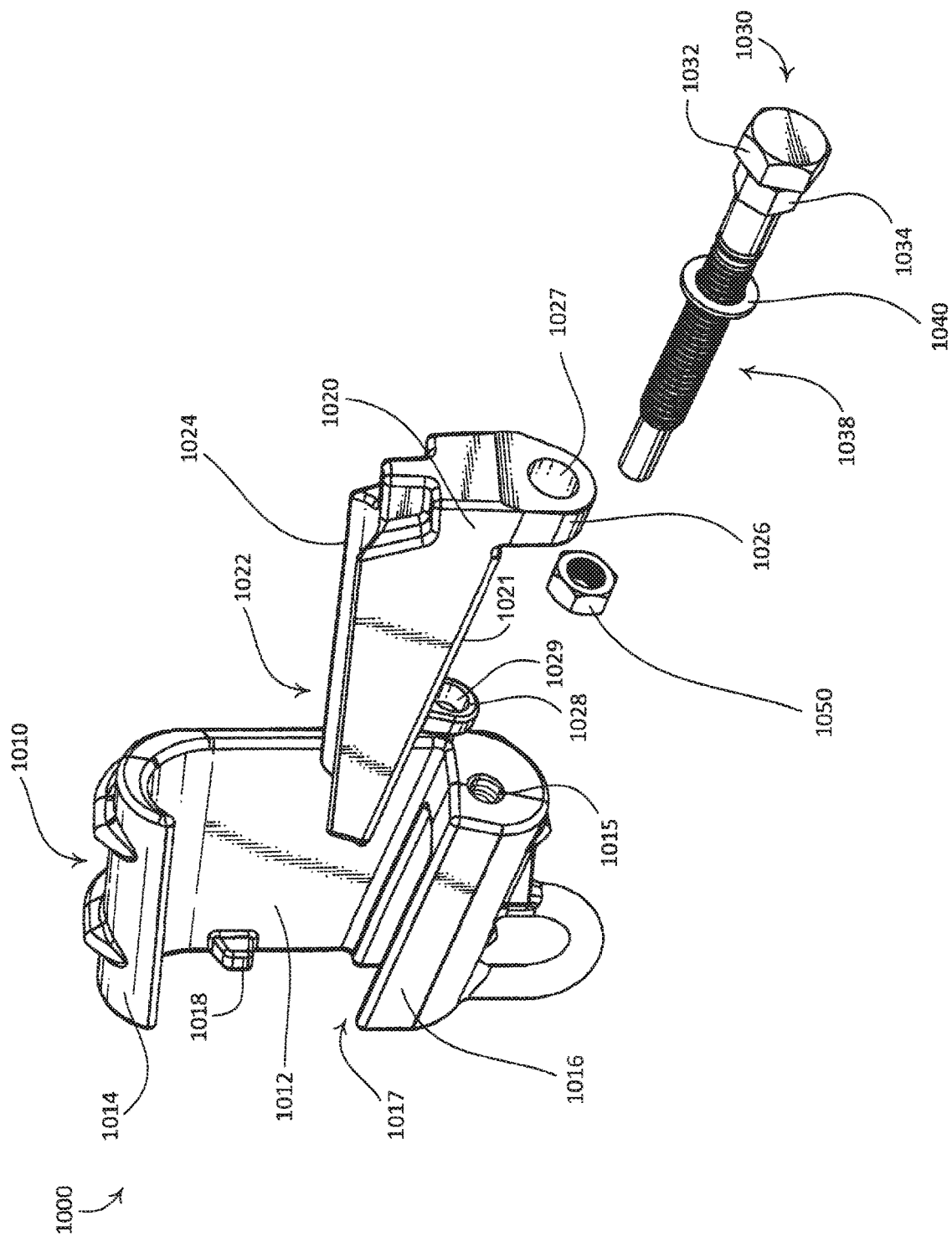
FIG. 10B is an exploded view of the electrical connector shown in FIG. 10A.

FIGS. 10A and 10B depict another example electrical connector 1000 (e.g., such as the electrical connectors 100, 200, 300, 400, 500, 600, 700, 800, 900). The electrical connector 1000 may include a body member 1010, a wedge 1020, and a bolt 1030. The bolt 1030 may be a bolt assembly (e.g., such as a shear bolt assembly). The electrical connector 1000 may be configured to electrically and mechanically connect a main conductor (e.g., such as a transmission conductor, not shown) to a tap conductor (e.g., such as a distribution conductor, not shown). The electrical connector 1000 may include a conductor interface insert (not shown) configured to be located between the main conductor and the tap conductor within the electrical connector 1000.

The body member 1010 may be substantially C-shaped. For example, the body member 1010 may have a rear wall 1012, a curved top portion 1014 and a curved bottom portion 1016. The curved top portion 1014 may be configured to receive the distribution connector. For example, the curved top portion 1014 of the electrical connector 1000 may fit partially around the main conductor. The curved bottom portion 1016 may be configured to receive the wedge 1020. The rear wall 1012 may be substantially flat, for example, between the curved top portion 1014 and the curved bottom portion 1016. The rear wall 1012 may define a stop 1018 that extends away from the rear wall 1012.

The wedge 1020 may be a wedge assembly. The wedge 1020 may include a recess 1022 along an elongated upper surface 1024. The recess 1022 may be configured to receive the distribution conductor and/or the transmission conductor. For example, the recess 1022 may cooperate with a bottom surface of the tap conductor. The wedge 1020 may be received within the curved bottom portion 1016 of the body member 1010. For example, the wedge 1020 may define a first tab 1028. The first tab 1028 may extend (e.g., downwardly) from the wedge 1020. The first tab 1028 may define an aperture 1029 passing therethrough. The aperture 1029 may be threaded. The aperture 1029 may be configured to receive the bolt 1030 (e.g., a distal end of the bolt 1030). The aperture 1029 may define threads that are complementary to the threads of the bolt 1030. The wedge 1020 may be configured to be driven by the bolt 1030. The curved bottom portion 1016 may define a cavity 1017. The cavity 1017 may be configured to receive the first tab 1028. For example, the cavity 1017 may receive the first tab 1028 as the wedge 1020 is driven by the bolt 1030.

The wedge 1020 may define a second tab 1026. The second tab 1026 may extend (e.g., downwardly) from the wedge 1020. The second tab 1026 may define an aperture 1027 passing therethrough. The aperture 1027 may be threaded. The aperture 1027 may be configured to receive the bolt 1030. The aperture 1027 may define threads that are complementary to the threads of the bolt 1030.

The body member 1010 may define a hole 1015 configured to receive the bolt 1030. The hole 1015 may be defined through the curved bottom portion 1016 of the body member 1010. The hole 1015 may be threaded. For example, the hole 1015 may define threads that are complementary to the threads of the bolt 1030.

The electrical connector 1000 may be configured to secure (e.g., releasably secure) the bolt 1030 therein. The electrical connector 1000 may be configured to enable removal of the bolt 1030 from the body member 1010 and the wedge 1020.

The bolt 1030 may define an upper head 1032, a lower head 1034, a shear section 1036, and a shank 1038. The shank 1038 may define a threaded portion 1031 and a non-threaded portion 1033. The bolt 1030 may be received by the aperture 1027 and the hole 1015. For example, the shank 1038 of the bolt 1030 may be received by the aperture 1027 and the hole 1015. A washer 1040 may be received by the shank 1038 such that when installed, the washer 1040 is in contact with the wedge 1020 and the lower head 1034. The bolt 1030 may be configured to drive the wedge 1020 into the electrical connector 1000. The bolt 1030 may be configured to be driven at the upper head 1032. As torque is applied to the upper head 1032, the bolt 1030 may rotate as the threaded portion 1031 engages complementary threads. When the applied torque exceeds a threshold torque, the shear section 1036 may shear such that the upper head 1032 is mechanically decoupled from the shank 1038 (e.g., the threaded portion 1031) of the bolt 1030. For example, when the shear section 1036 shears, the upper head 1032 may no longer drive the threaded portion 1031 of the bolt 1030. When the shear section 1036 shears, the bolt 1030 may captively secure the upper head 1032 thereto. For example, the bolt 1030 may be configured such that the upper head 1032 remains coupled to the bolt 1030 when the shear section 1036 has sheared.

When the bolt 1030 is rotated in a clockwise direction, the bolt 1030 may be threaded into the hole 1015 of the body member 1010 and the lower head 1034 may apply a force upon the second tab 1026 such that the entire wedge 1020 is moved within the body member 1010. For example, the wedge 1020 may be moved within the curved bottom portion 1016 of the body member 1010. When the wedge 1020 is moved within the body member 1010, the upper surface 1024 of the wedge 1020 may move (e.g., upwardly) toward the curved top portion 1014. When the bolt 1030 is rotated in a counter-clockwise direction, the wedge 1020 may move away from the body member 1010. When the wedge 1020 is moved away from the body member 1010, the upper surface 1024 of the wedge 1020 may move (e.g., downwardly) away from the curved top portion 1014. The threaded portion 1031 may be configured with a predetermined amount (e.g., length) of threads. The predetermined amount of threads may be configured such that the bolt 1030 spins freely when the wedge 1020 is extracted (e.g., fully extracted) from the body member 1010.

The electrical connector 1000 may be configured such that it is assembled without the conductor interface insert (not shown). The bolt 1030 may be in a position such that the wedge 1020 is substantially withdrawn from the body member 1010. The electrical connector 1000 may be suspended from a main conductor by resting the curved top portion 1014 of the body member 1010 around the main conductor. A tap conductor may be laid across the upper surface 1024 of the wedge 1020. The conductor interface insert may be positioned between the transmission and tap conductors, for example, outside of the body member 1010. The conductor interface insert may be moved toward the interior of the body member 1010, for example, using the conductors as a guide. The conductor interface insert may be moved until a leading surface of the conductor interface insert contacts the stop 1018.

With the conductors and/or the conductor interface insert in place, the bolt 1030 may be rotated such that the wedge 1020 is moved toward the interior of the body member 1010. The bolt 1030 may be rotated via the upper head 1032. As the wedge 1020 is moved into the interior of the body member 1010, the recess 1022 may be moved into contact with the tap conductor which in turn is forced against the conductor interface insert. The conductor interface insert may be forced into contact with the main conductor which in turn is forced into contact with the curved top portion 1014 of the body member 1010. The bolt 1030 (e.g., the shear section 1036) may be configured to shear at a threshold torque. When the bolt 1030 shears, the upper head 1032 may be operatively decoupled from the shank 1038 such that the bolt 1030 can no longer be driven by the upper head 1032. The bolt 1030 may be configured to retain the upper head 1032 when the shear section 1036 has sheared. For example, the threshold torque may be determined such that it corresponds to the wedge 1020 being in its proper position and sufficient pressure being placed on the conductors so as to provide a proper connection. The bolt 1030 may shear at the shear section 1036. The shear section 1036 may be located between the upper head 1032 and the lower head 1034.

The electrical connector 1000 may be configured to retain the bolt 1030. For example, the electrical connector 1000 may include a retainer 1050 (e.g., such as a retaining nut). The retainer 1050 may be a part of the wedge 1020 (e.g., wedge assembly). In the exemplary embodiment shown, the retainer 1050 is a retaining nut such that the retainer 1050 may also be referred to as the retaining nut 1050. The retaining nut 1050 may be hexagonal, for example. The bolt 1030 may be configured to receive the retaining nut 1050. For example, the threaded portion 1031 of the shank 1038 may be configured to receive the retaining nut 1050. The retaining nut 1050 may be received between the second tab 1026 and the curved bottom portion 1016 of the body member 1010. The retaining nut 1050 may engage a lower surface 1021 of the wedge 1020. The lower surface 1021 may prevent the retaining nut 1050 from rotating when the bolt 1030 is installed through the first tab 1028, the second tab 1026, and the body member 1010. For example, the retaining nut 1050 may abut the lower surface 1021 as the bolt 1030 is driven such that the retaining nut 1050 is threaded onto the bolt 1030.

The retaining nut 1050 may be configured to retain the bolt 1030 within the wedge 1020. When installed on the bolt 1030, the retaining nut 1050 may be configured to prevent removal of the bolt 1030 from the body member 1010 and/or the wedge 1020. The retaining nut 1050 may be configured to be removed such that the bolt 1030 can be removed from the wedge 1020. When the retaining nut 1050 is removed from the bolt 1030, the bolt 1030 may be removed from the body member 1010 and/or the wedge 1020. For example, the lower head 1034 may be driven (e.g., counter-clockwise) to remove the bolt 1030 from the wedge 1020.

The wedge 1020, the bolt 1030, and/or the retaining nut 1050 may be configured to be reused, for example, after being installed and removed from the electrical connector 1000. For example, when the wedge 1020, the bolt 1030, and the retaining nut 1050 are removed from the electrical connector 1000, they may be reinstalled in the electrical connector 1000 or another electrical connector.

It should be appreciated that two or more of the retainers described herein may be used together in a wedge and/or electrical connector. Stated differently, a wedge and/or electrical connector may include two or more of the retainers described herein.

What is claimed is:

1. A wedge assembly comprising:
a recess defined along an elongated upper surface of the wedge assembly, the recess configured to receive a main conductor or a tap conductor when the wedge assembly is installed in an electrical connector;
a first tab extending from the wedge assembly in a direction away from elongated upper surface, the first tab configured to be received by a cavity defined in a bottom portion of a body member of the electrical connector, and the first tab defining a first aperture therethrough configured to receive a bolt of the electrical connector;
a second tab defining a second aperture therethrough configured to receive the bolt of the electrical connector, wherein a front surface of the second tab is configured to abut a head of the bolt when the bolt is received by the first tab and the second tab; and
a retainer configured to be releasably secured to the bolt at a point between the first tab and the second tab and to interact with a rear surface of the second tab to prevent the bolt from being removed from the wedge assembly.

2. The wedge assembly of claim 1, wherein the retainer comprises a pin.

3. The wedge assembly of claim 1, wherein the retainer comprises a retaining clip.

4. The wedge assembly of claim 3, wherein the retaining clip is configured to contact the rear surface of the second tab when the bolt is moved in the direction of the second tab such that when the retaining clip contacts the rear surface of the second tab removal of the bolt from the wedge assembly is prevented.

5. The wedge assembly of claim 1, wherein the retainer comprises a retaining nut configured to contact the rear surface of the second tab when the bolt is moved in the direction of the second tab such that when the retaining nut contacts the rear surface of the second tab removal of the bolt from the wedge assembly is prevented.

6. The wedge assembly of claim 1, wherein the retainer is a retainer assembly comprising a washer and a retaining clip.

7. A wedge assembly comprising:
a bolt;
a wedge having a recess defined along an elongated upper surface of the wedge, the recess configured to receive a main conductor or a tap conductor when the wedge assembly is installed in an electrical connector;
a first tab extending from the wedge in a direction away from elongated upper surface, the first tab being configured to be received by a cavity defined in a bottom portion of a body member of the electrical connector, and the first tab having a first aperture configured to receive the bolt;
a second tab having a second aperture configured to receive the bolt, wherein a front surface of the second tab is configured to abut a head of the bolt when the bolt is received by the first tab and the second tab; and
a retainer configured to be releasably secured to the bolt at a point between the first tab and the second tab and to interact with a rear surface of the second tab to prevent the bolt from being removed from the wedge assembly.

8. The wedge assembly of claim 7, wherein the retainer comprises a pin, and wherein the bolt has a hole positioned on the bolt at a point between the first tab and the second tab, the bolt hole being configured to receive the pin such that the pin can contact the rear surface of the second tab to prevent removal of the bolt from the wedge assembly.

9. The wedge assembly of claim 8, wherein the pin is a press-fit pin.

10. The wedge assembly of claim 7, wherein the retainer comprises a retaining clip.

11. The wedge assembly of claim 10, wherein the retaining clip is configured to contact the rear surface of the second tab when the bolt is moved in the direction of the second tab such that when the retaining clip contacts the rear surface of the second tab removal of the bolt from the wedge assembly is prevented.

12. The wedge assembly of claim 7, wherein the retainer comprises a retaining nut configured to contact the rear surface of the second tab when the bolt is moved in the direction of the second tab such that when the retaining nut contacts the rear surface of the second tab removal of the bolt from the wedge assembly is prevented.

13. The wedge assembly of claim 7, wherein the bolt comprises a captive shear bolt.

14. An electrical connector adapted to electrically connect a main conductor to a tap conductor, the electrical connector comprising:
a body member having a curved top wall, a rear wall and a bottom portion defining a cavity;
a wedge assembly configured to be received by the body member, the wedge assembly including:
a recess defined along an elongated upper surface of the wedge assembly, the recess configured to receive the tap conductor;
a first tab extending from the wedge assembly in a direction away from the elongated upper surface, the first tab configured to be received by the cavity, and the first tab having a first aperture;
a second tab defining a second aperture; and
a retainer;
a bolt configured to be rotated to drive the wedge assembly into the body member to enable an electrical connection between the main conductor and the tap conductor, wherein a head of the bolt is configured to contact a front surface of the second tab when the bolt is received by the first tab and the second tab, and wherein the first aperture and the second aperture are configured to receive the bolt; and
wherein the retainer is configured to be releasably secured to the bolt at a point between the first tab and the second tab and to interact with a rear surface of the second tab to prevent the bolt from being removed from the wedge assembly.

15. The electrical connector of claim 14, wherein the bolt is a captive shear bolt configured to shear when driven at a threshold torque, and wherein the captive shear bolt is configured to retain a sheared portion of the captive shear bolt when the captive shear bolt has sheared.

16. The electrical connector of claim 14, wherein the retainer comprises a pin, and wherein the bolt has a hole positioned on the bolt at a point between the first tab and the second tab, the bolt hole being configured to receive the pin such that the pin can contact the rear surface of the second tab to prevent removal of the bolt from the wedge assembly.

17. The electrical connector of claim 16, wherein the pin is a press-fit pin.

18. The electrical connector of claim 14, wherein the retainer comprises a retaining clip.

19. The electrical connector of claim 18, wherein the retaining clip is configured to contact the rear surface of the second tab when the bolt is moved in the direction of the second tab such that when the retaining clip contacts the rear surface of the second tab removal of the bolt from the wedge assembly is prevented.

20. The electrical connector of claim 14, wherein the retainer comprises a retaining nut configured to contact the rear surface of the second tab when the bolt is moved in the direction of the second tab such that when the retaining nut contacts the rear surface of the second tab removal of the bolt from the wedge assembly is prevented.

* * * * *